(12) United States Patent
Castriota

(10) Patent No.: US 12,304,360 B2
(45) Date of Patent: May 20, 2025

(54) DEVICES, SYSTEMS, AND METHODS FOR AUTOMOTIVE SEATS AND AUTOMOTIVE SEAT ARRANGEMENTS

(71) Applicant: Via Fortuna, LLC, Wilmington, DE (US)

(72) Inventor: Jason Castriota, Stamford, CT (US)

(73) Assignee: Via Fortuna, LLC, Wilmington, DE (US)

( * ) Notice: Subject to any disclaimer, the term of this patent is extended or adjusted under 35 U.S.C. 154(b) by 0 days.

(21) Appl. No.: 18/771,721

(22) Filed: Jul. 12, 2024

(65) Prior Publication Data
US 2025/0018836 A1    Jan. 16, 2025

Related U.S. Application Data

(60) Provisional application No. 63/526,953, filed on Jul. 14, 2023.

(51) Int. Cl.
*B60N 2/02* (2006.01)
*B60N 2/00* (2006.01)
(Continued)

(52) U.S. Cl.
CPC ......... *B60N 2/0292* (2013.01); *B60N 2/0025* (2023.08); *B60N 2/01* (2013.01);
(Continued)

(58) Field of Classification Search
CPC ............ B60N 2/0292; B60N 2002/684; B60N 2/643; B60N 2/01
See application file for complete search history.

(56) References Cited

U.S. PATENT DOCUMENTS

| | | | |
|---|---|---|---|
| 8,924,086 B2 | 12/2014 | Thomas | |
| 2010/0171346 A1* | 7/2010 | Laframboise | ......... B29C 66/742 |
| | | | 297/284.6 |

(Continued)

FOREIGN PATENT DOCUMENTS

| | | | | |
|---|---|---|---|---|
| CA | 2636465 A1 * | 2/2009 | ............... | B60N 2/22 |
| DE | 102004017657 A1 * | 11/2004 | ............... | B60N 2/01 |

(Continued)

OTHER PUBLICATIONS

International Search Report dated Dec. 4, 2024 issued in International Application No. PCT/US2024/037842.

*Primary Examiner* — Timothy J Brindley
(74) *Attorney, Agent, or Firm* — TROUTMAN PEPPER LOCKE LLP; Christopher C. Close, Jr.; Aaron E. Johnston

(57) ABSTRACT

Disclosed embodiments include systems, devices, and methods for automotive seats for a vehicle, and seating arrangements within a vehicle. Disclosed embodiments include systems, devices, and methods for moving a vehicle seat between a first driving position and a second access position and moving the vehicle seat between the second access position and the first driving position. The driving position may be in the center of the vehicle and the access positions may be on either side of a vehicle. Disclosed embodiments include systems, devices, and methods for modular automotive seat assemblies comprising interchangeable portions in order to replace worn-out or damaged parts, or to change seat styles and configurations. Disclosed embodiments include systems, devices, and methods for automotive seating arrangements that allow for better line-of-sight for passengers.

20 Claims, 65 Drawing Sheets

(51) Int. Cl.
  *B60N 2/01* (2006.01)
  *B60N 2/06* (2006.01)
  *B60N 2/30* (2006.01)
  *B60N 2/64* (2006.01)
  *B60N 2/68* (2006.01)
(52) U.S. Cl.
  CPC ........... *B60N 2/0226* (2023.08); *B60N 2/062* (2013.01); *B60N 2/065* (2013.01); *B60N 2/3004* (2013.01); *B60N 2/643* (2013.01); *B60N 2/68* (2013.01)

(56) References Cited

U.S. PATENT DOCUMENTS

| | | |
|---|---|---|
| 2014/0217792 A1 | 8/2014 | Meyer |
| 2017/0057380 A1* | 3/2017 | Vikstrom ............. B60N 2/0705 |
| 2019/0106024 A1 | 4/2019 | Wellborn et al. |
| 2020/0290485 A1* | 9/2020 | Baccouche .......... B60N 2/0705 |
| 2020/0346565 A1* | 11/2020 | Li .......................... B60N 2/143 |
| 2021/0237627 A1 | 8/2021 | Lesbats et al. |
| 2021/0300212 A1* | 9/2021 | Ito ........................ B60N 2/3045 |
| 2022/0212572 A1 | 7/2022 | Hirata et al. |
| 2022/0314838 A1 | 10/2022 | D'Eramo et al. |
| 2023/0391229 A1* | 12/2023 | Gruener ................... B60N 2/34 |
| 2023/0406177 A1* | 12/2023 | Line ........................ B60N 2/68 |
| 2024/0034198 A1 | 2/2024 | Favaretto |
| 2024/0092240 A1* | 3/2024 | Kawamura .......... B60N 2/7005 |

FOREIGN PATENT DOCUMENTS

| | | | |
|---|---|---|---|
| DE | 102020110982 A1 | * 10/2021 | |
| DE | 102023107584 A1 | * 10/2023 | ............. B60N 2/686 |
| GB | 2548415 A | * 9/2017 | ........... B60N 2/6027 |
| WO | WO-2015065208 A1 | * 5/2015 | ......... B29C 45/0001 |

* cited by examiner

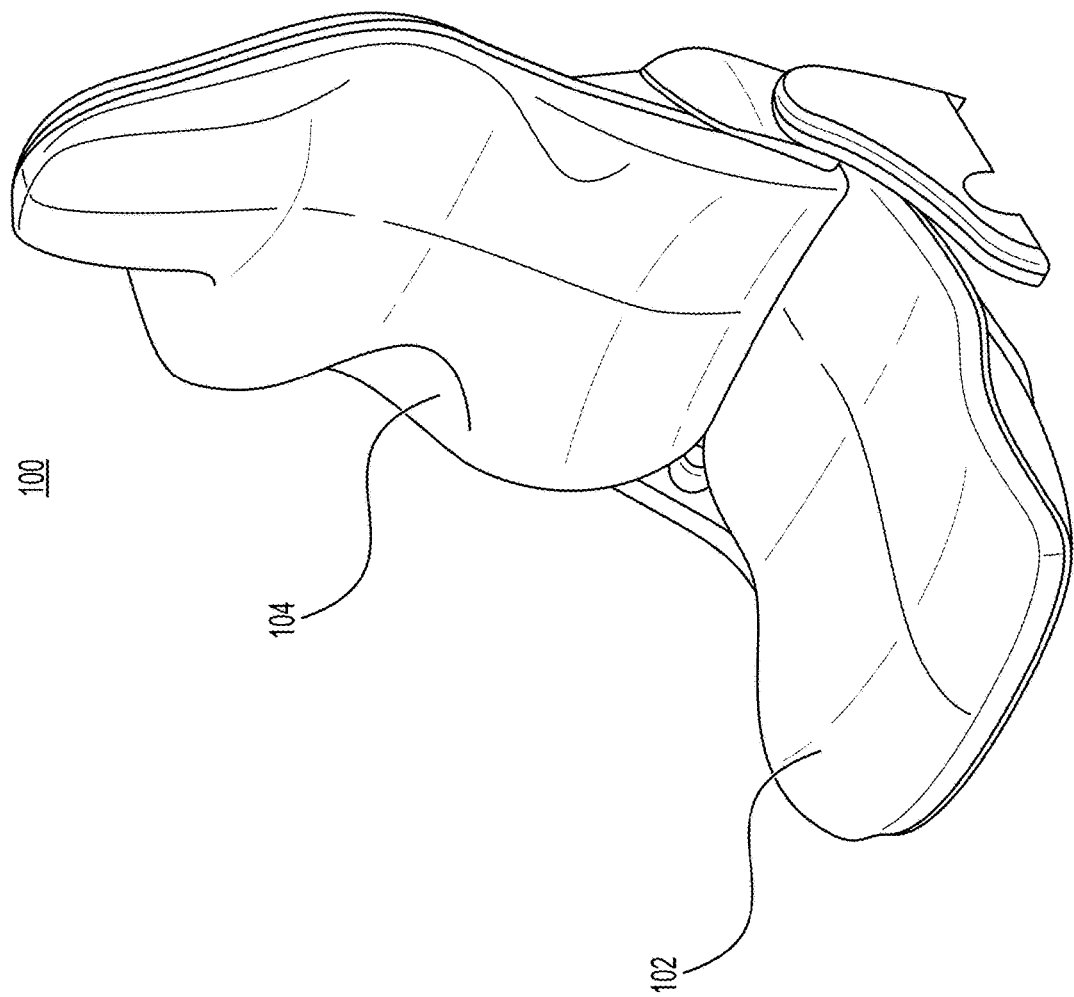

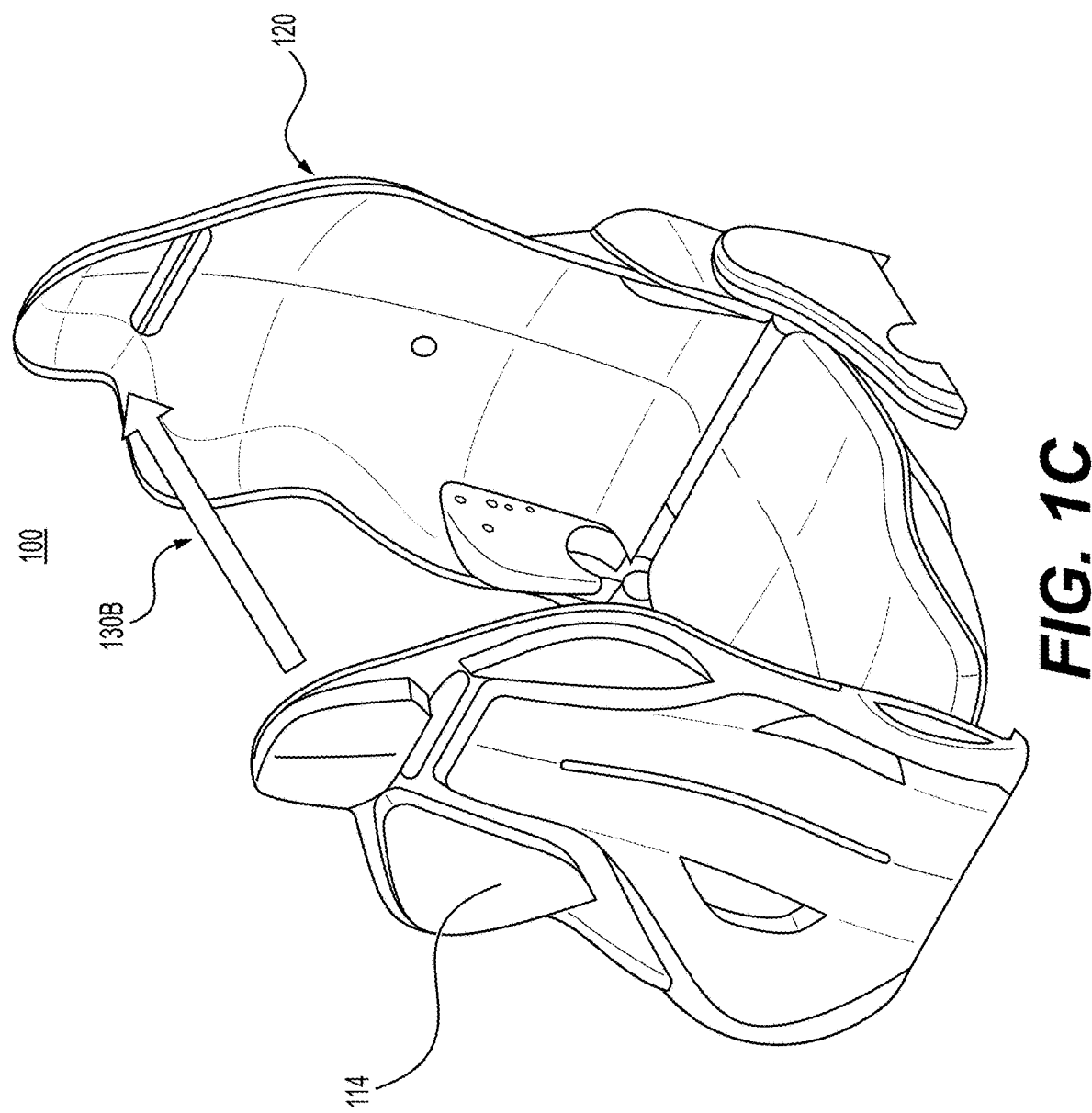

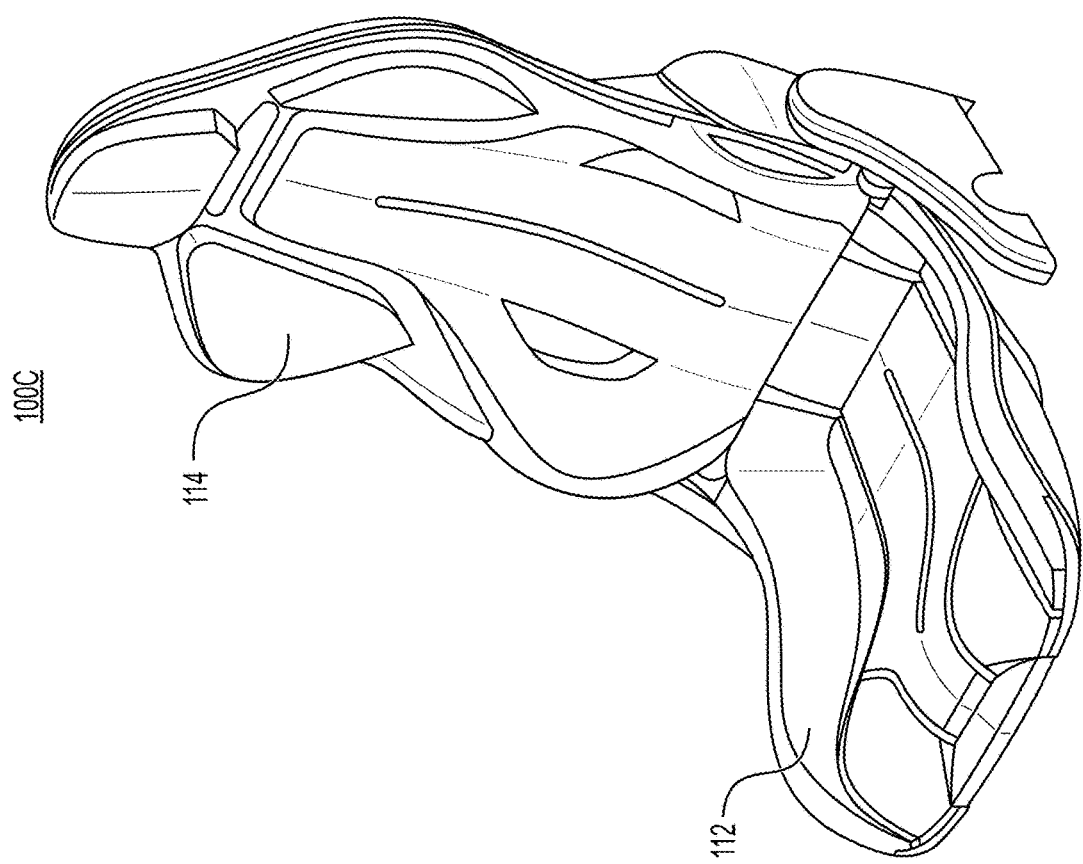

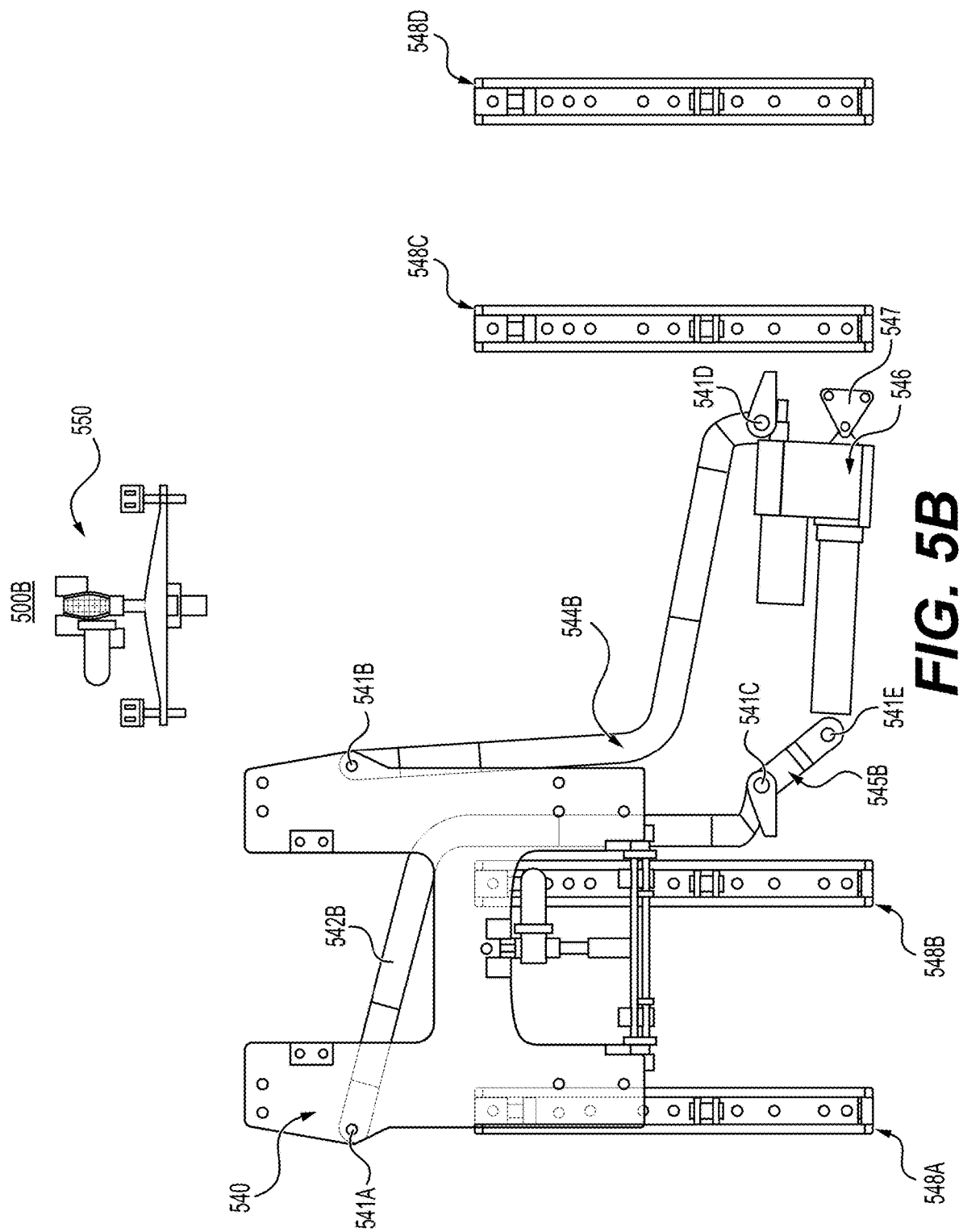

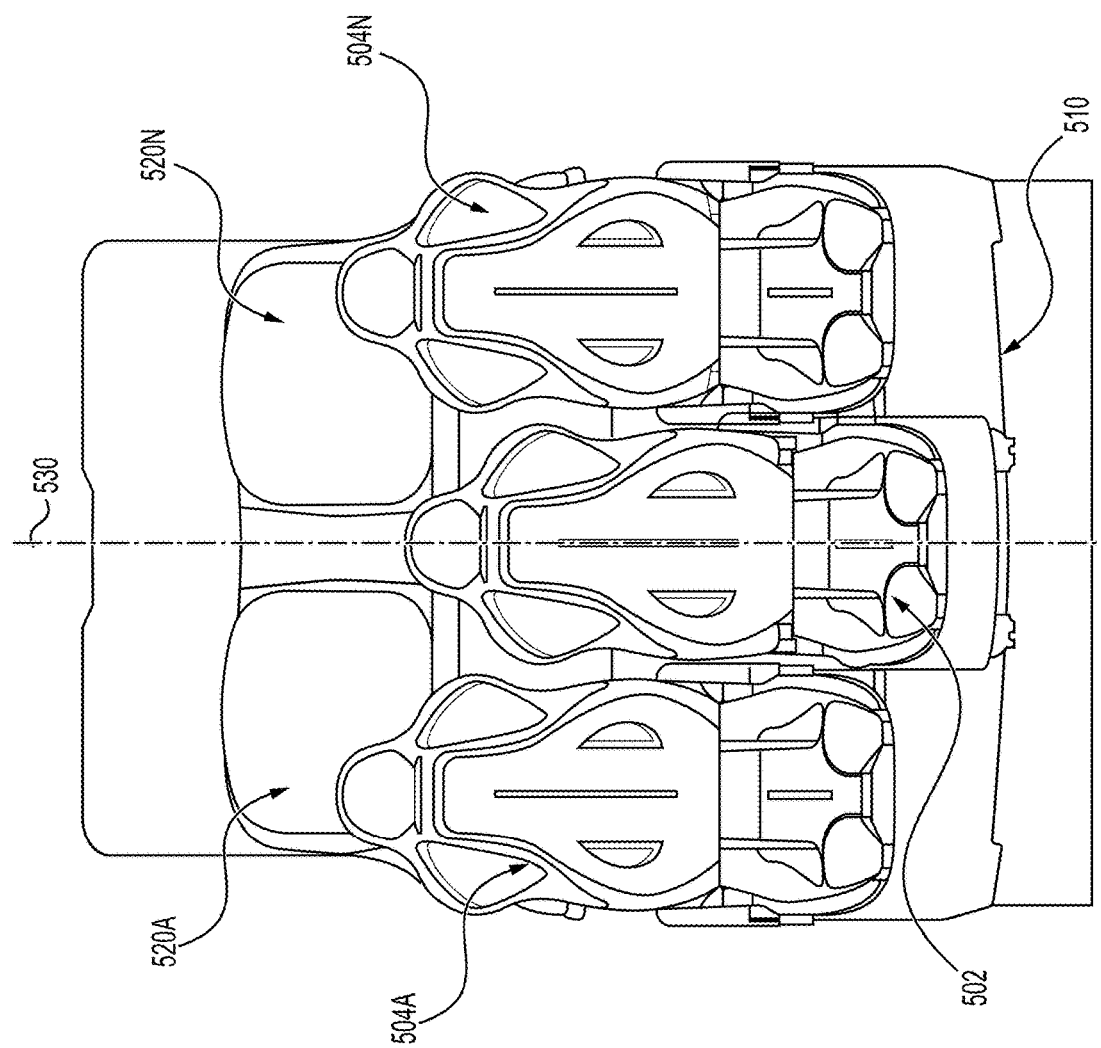

DEVICES, SYSTEMS, AND METHODS FOR AUTOMOTIVE SEATS AND AUTOMOTIVE SEAT ARRANGEMENTS

CROSS-REFERENCE TO RELATED APPLICATION

This Application claims the benefit of, and priority under 35 U.S.C. § 119(e) to, U.S. Provisional Patent Application No. 63/526,953, entitled "Devices, Systems, and Methods for Automotive Seats and Automotive Seat Arrangements," filed Jul. 14, 2023, the contents of which are hereby incorporated by reference herein in their entirety as if fully set forth below.

FIELD

The disclosed technology relates to devices, systems, and methods for automotive seats and automotive seat arrangements. Specifically, this disclosed technology relates to automotive seats with exchangeable cushions and seat assemblies that are positioned to increase each occupant's line-of-sight.

BACKGROUND

Traditional automotive seats typically have been unalterable. Once the seat is produced and installed in the car at the factory, the user has no way to easily change the upholstery, style, or configuration of a seat assembly. Furthermore, many automotive seats lack the necessary configuration to give all passengers a good line of sight outside of the vehicle and capability of automatically moving for a desired function. Passengers at a diminished line of sight to the outside can experience motion sickness as they have no visual cues of how the vehicle is moving.

Accordingly, there is a need for improved devices, systems, and methods for automotive seats and automotive seat arrangements. Embodiments of the present disclosure are directed to this and other considerations.

SUMMARY

Disclosed embodiments may include an automotive seat system for a vehicle. The system may include a center seat assembly. The system may also include one or more center seat actuators functionally coupled to the center seat assembly to move the center seat assembly in one or more directions. Furthermore, the system may include one or more side seat assemblies each having a back portion and a cushion portion attached to the back portion at a hinge and moveable via a first cushion actuator. Additionally, the system may include one or more side seat actuators functionally coupled to the one or more side seat assemblies to move the side seat assemblies in one or more directions. The system may also include one or more processors, and memory in communication with the one or more processors and storing instructions that, when executed by the one or more processors, are configured to cause the system to: transmit a first signal to the first cushion actuator to move the cushion portion of at least one of the one or more side seat assemblies from an open position to a stowed position, transmit a second signal to the one or more side seat actuators to move at least one of the one or more side seat assemblies rearwardly, and transmit a third signal to the one or more center seat actuators to move the center seat assembly from a driving position to an access position in front of the one or more side seat assemblies.

Disclosed embodiments may include a method for moving an automotive seat. The method may include receiving a first request to move a center seat assembly from a driving position to an access position with the center seat assembly functionally coupled to one or more center seat actuators configured to move the center seat assembly in one or more directions. The method may also include directing a first side seat actuator to fold a lower portion of a side seat assembly from an occupant position to a stowed position. Furthermore, the method may include directing a second side seat actuator to move the side seat assembly rearward. Additionally, the method may include directing the center seat actuator to move the center seat assembly from a driving position to an access position in front of the side seat assembly.

Disclosed embodiments may include a seat movement method for a vehicle. The method may include folding a lower portion of a side seat assembly from an open position to a stowed position. The method may also include moving the side seat assembly rearward along one or more side seat rails. The method may additionally include undocking a center seat assembly. The method may further include moving the center seat assembly along one or more rails substantially perpendicular to a direction of motion of the vehicle from a driving position to an access position in front of the side seat assembly.

Disclosed embodiments may include an automotive seating system for a vehicle. The system may include one or more modular seat assemblies. The one or more modular assemblies may each include a frame configured to selectively secure portions of the respective seat assembly to the vehicle and to interchangeably support at least a first seat configuration and a second seat configuration, with the frame comprising an upper structural member and a lower structural member. The one or more modular assemblies may also include a first lower cushion of the first seat configuration readily attachable to and detachable from the lower structural member of the frame, with the first lower cushion being interchangeable with a second lower cushion of the second seat configuration. The one or more modular assemblies may further include a first back cushion of the first seat configuration readily attachable to and detachable from the upper structural member of the frame, with the first back cushion being interchangeable with a second back cushion of the second seat configuration.

Disclosed embodiments may include an automotive seat for a vehicle. The automotive seat may include a frame configured to selectively secure portions of the seat to the vehicle and to interchangeably support at least a first seat configuration and a second seat configuration, with the frame comprising an upper structural member and a lower structural member. The automotive seat may also include a first lower cushion of the first seat configuration readily attachable to and detachable from the lower structural member of the frame, with the first lower cushion being interchangeable with a second lower cushion of the second seat configuration. Furthermore, the automotive seat may also include a first back cushion of the first seat configuration readily attachable to and detachable from the upper structural member of the frame, with the first back cushion being interchangeable with a second back cushion of the second seat configuration.

Disclosed embodiments may include a method for changing a configuration of a modular automotive seat of a vehicle. The method may include detaching a first back cushion of a first seat configuration from a seat frame configured to selectively secure portions of the seat to the vehicle and to interchangeably support at least the first seat configuration and a second seat configuration. The method may also include attaching a second back cushion of the second seat configuration to the seat frame, with the second back cushion being interchangeable with the first back cushion of the first seat configuration. Furthermore, the method may include detaching a first lower cushion of the first seat configuration from the seat frame. Additionally, the method may include attaching a second lower cushion of the second seat configuration to the seat frame, with the second lower cushion being interchangeable with the first lower cushion of the first seat configuration.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings:

FIGS. 1A-1G are illustrations demonstrating a method for exchanging parts of automotive seats in accordance with certain embodiments of the disclosed technology.

DETAILED DESCRIPTION

Figure 1B:
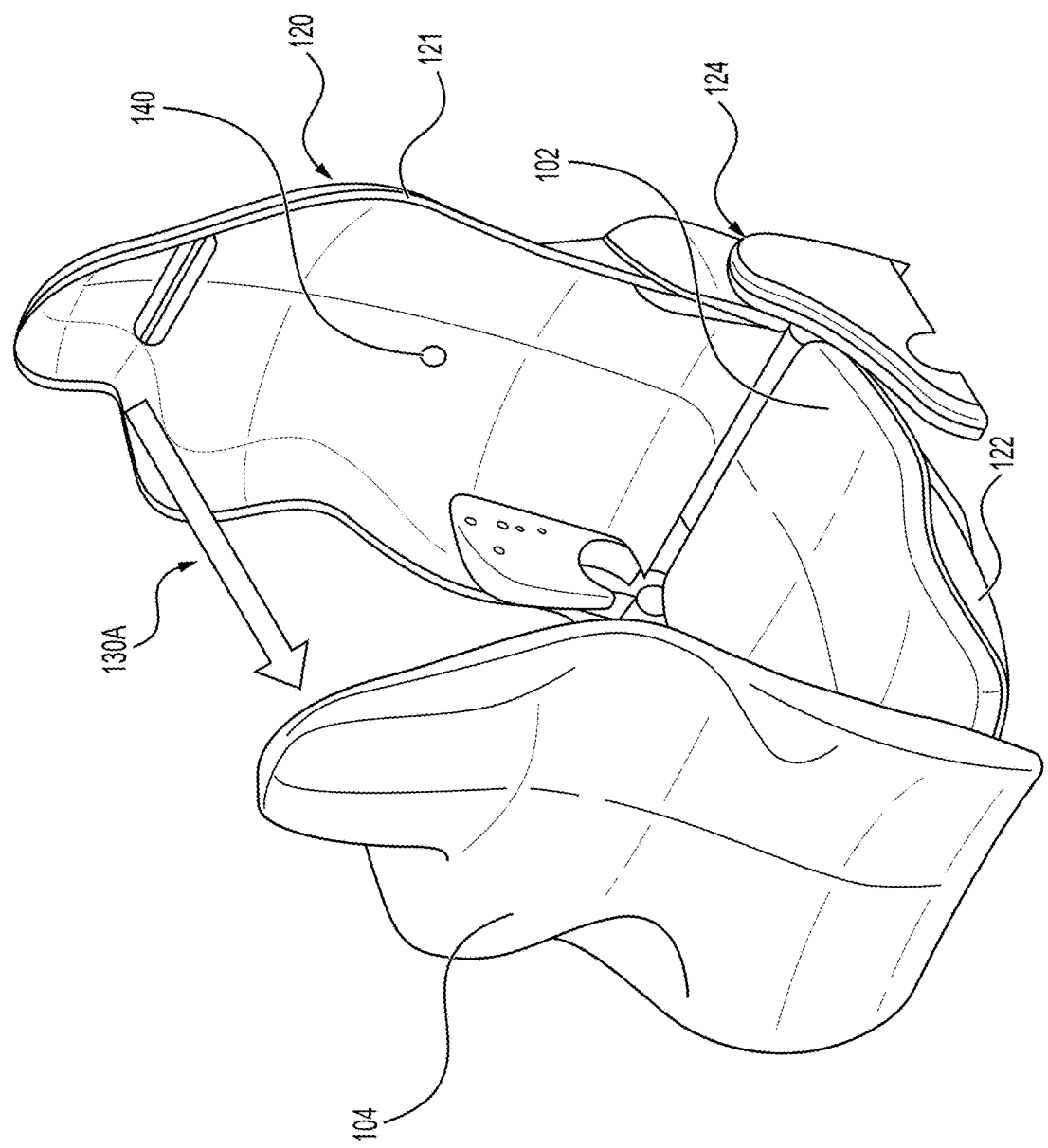

Although preferred exemplary embodiments of the disclosure are explained in detail, it is to be understood that other exemplary embodiments are contemplated. Accordingly, it is not intended that the disclosure is limited in its scope to the details of construction and arrangement of components set forth in the following description or illustrated in the drawings. The disclosure is capable of other exemplary embodiments and of being practiced or carried out in various ways. Also, in describing the preferred exemplary embodiments, specific terminology will be resorted to for the sake of clarity.

To facilitate an understanding of the principles and features of the present disclosure, various illustrative embodiments are explained below. The components, steps, and materials described hereinafter as making up various elements of the embodiments disclosed herein are intended to be illustrative and not restrictive. Many suitable components, steps, and materials that would perform the same or similar functions as the components, steps, and materials described herein are intended to be embraced within the scope of the disclosure. Such other components, steps, and materials not described herein can include, but are not limited to, similar components or steps that are developed after development of the embodiments disclosed herein.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

As used in the specification and the appended claims, the singular forms "a," "an" and "the" include plural referents unless the context clearly dictates otherwise.

Also, in describing the preferred exemplary embodiments, terminology will be resorted to for the sake of clarity. It is intended that each term contemplates its broadest meaning as understood by those skilled in the art and includes all technical equivalents which operate in a similar manner to accomplish a similar purpose.

Ranges can be expressed herein as from "about" or "approximately" one particular value and/or to "about" or "approximately" another particular value. When such a range is expressed, another exemplary embodiment includes from the one particular value and/or to the other particular value.

By "comprising" or "containing" or "including" is meant that at least the named compound, member, particle, or method step is present in the composition or article or method, but does not exclude the presence of other compounds, materials, particles, method steps, even if the other such compounds, material, particles, method steps have the same function as what is named.

Mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The materials described as making up the various members of the invention are intended to be illustrative and not restrictive. Many suitable materials that would perform the same or a similar function as the materials described herein are intended to be embraced within the scope of the invention. Such other materials not described herein can include, but are not limited to, for example, materials that are developed after the time of the development of the invention.

Reference will now be made in detail to example embodiments of the disclosed technology that are illustrated in the accompanying drawings and disclosed herein. Wherever convenient, the same reference numbers will be used throughout the drawings to refer to the same or like parts.

As used herein, "automotive seat assembly," "first seat assembly," and "seat assembly" may be used interchangeably.

FIGS. 1A-1G illustrate example configurations of at least one automotive seat assembly according to various embodiments of the present disclosure. In various embodiments, a seat assembly 100 (e.g., a first seat assembly and/or one or more additional seat assemblies) may be configured to be a first seat assembly within an automotive vehicle. As depicted in FIG. 1A, in various embodiments, the seat assembly 100 (e.g., a first seat assembly and/or one or more additional seat assemblies) may comprise at least a lower cushion 102 (e.g., first cushion portion, lower portion, lower cushion portion), a back cushion 104 (e.g., first back portion, upper cushion, upper cushion portion, back cushion portion), a frame 120 (FIG. 1B) comprising an upper structural member 121 (FIG. 1B) and a lower structural member 122 (FIG. 1B). In some embodiments, the lower structural member 122 of the frame 120 may support the lower cushion 102, and the upper structural member 121 of the frame 120 may support the upper cushion 104. In various embodiments, the lower cushion 102 may be disposed vertically beneath the back cushion 104 of the seat assembly. In various embodiments, the lower cushion 102 may be configured to at least partially support the weight of at least one occupant of the vehicle (e.g., when placed on top of lower structural member 122), such that the at least one occupant may be configured to sit on at least a portion of the lower cushion 102. In one or more embodiments, the lower cushion 102 (and the lower structural member 122) may move relative to the back cushion 104 (and upper structural member 121), such that a distalmost edge of the lower cushion 102 may move closer and/or further away from the back cushion. In one or more embodiments, back cushion 104, upper structural member 121, and/or back cushion 104 may be configured to adjust the angle at which the at least one occupant is sitting at.

In various embodiments, the lower cushion 102 and/or back cushion 104 may be selectively attached and/or detached from a frame 120 of the seat assembly (or the constituent parts of the frame, such as upper structural member 121 and lower structural member 120). As depicted in FIG. 1A, in various embodiments, the lower cushion 102 and/or the back cushion 104 may be made from foam with or without wire inserts, such that the foam may be wrapped in at least one sewn material. The at least one sewn material may be one or more of, for example: cloth, fabric, leather, plastic, suede, rubber, or a combination thereof. In various embodiments, the lower cushion 102 and/or the back cushion 104 may be selectively attached and/or detached from at least a portion of the frame 120. The selective attachment and/or detachment of the lower cushion 102 and/or the back cushion 104 may allow a user to selectively configure at least a portion of the interior of the vehicle. In various embodiments, the user may choose from one or more styles of a lower cushion and/or a back cushion to customize one or more seat assembly. In various embodiments, the user may choose a lower cushion 102 and/or a back cushion 104 comprising one or more of, for example: a comfort style, a sport style, a bucket style, a racing style, an outdoor style, or a combination thereof. In various embodiments, the one or more different styles may comprise one or more of: a different material, a different shape, a different color, a different size, or a combination thereof. In some embodiments, the different styles may be different configurations. In some embodiments, the lower cushion 102 and the back cushion 104 may be readily attachable to and detachable from the frame 120 (at e.g., lower structural member 122 or upper structural member 121). As used herein, "readily attachable and detachable" means that the seat cushions can be attached and detached without the use of tools. The attachment could be any suitable form, such as a quick release mechanism, clips, clamps, or sleeves that receive portions of the frame for example. It is contemplated that the seat cushions may be permanently attached, detachable, or readily attachable and detachable. Readily attachable and detachable means could also be one or more of a snap, screw, clip, adhesive tape, Velcro, tether, strap, clamp, snap-on, or zippers.

In various embodiments, a lower cushion 102, structural member 122, back cushion 104, and/or upper structural member 121 may be connected to at least one actuator (e.g., hydraulic actuator, mechanical actuator, etc.) and/or at least one motor, such that the at least one actuator and/or the at least one motor may assist with the movement of the seat assembly 100 within the vehicle. In one or more embodiments, the seat assembly 100 may further comprise one or more electrical switches/buttons (not explicitly shown) connected to at least one motor and/or at least one motorized bladder. The one or more switches/buttons may assist with the movement of a seat assembly 100 and/or adjust at least one bolster setting and/or at least one lumbar support setting of the seat assembly. In some embodiments, the seat assembly may further comprise a heating/cooling function, massage function, vibration function, and/or the like.

FIG. 1B illustrates an example seat assembly being selectively reconfigured in accordance with various embodiments of the present disclosure. For example, a seat assembly (e.g., a first seat assembly and/or one or more additional seat assemblies) may comprise frame 120, which may be a frame portion of a more extensive frame of the vehicle. The frame 120 may include a lower structural member 122 to support the seat, an upper structural member 121 to support the back, and one or more additional structural members. The frame 120 may include features that facilitate making at least a portion of back cushion 104 and/or lower cushion 102 of the seat assembly permanently attached, detachable, or readily attachable and detachable. In various embodiments, the frame 120 may be constructed from a high strength alloy and/or carbon fiber, such that, the frame 120 may be able to support the weight of one or more passenger, the lower cushion 102, and/or the back cushion 104. The frame 120 may be further configured (e.g., in size, shape, and material) to withstand the impact of an accident. In some embodiments, the frame 120 may be designed to meet crash-test standards with multiple different cushion choices. Frame 120 may be common to multiple different cushion styles. By using a common frame (e.g., frame 120) with multiple cushion styles, automakers can offer a variety of different seat options (e.g., different styles) without needing additional crash testing for each style.

In one or more embodiments, seat assembly 100 may further comprise at least one hinge 124. The at least one hinge may allow at least a portion of the lower cushion 102 and lower structural member 122 to at least partially move (e.g., at least a portion of the cushion portion may move upwardly from a seating position to a stowed position) relative to the back cushion 104 and upper structural member 121. In one or more embodiments, the at least one hinge 124 may move at least a portion of the lower cushion 102 and lower structural member 122 from a first position (e.g., seating position, depicted in FIG. 1B) to a second position such that a distal most edge of the lower cushion 102 moved towards a portion of the back cushion 104 and upper structural member 121. In some embodiments, the seat assembly 100 comprises two or more hinges 124, such that, a first hinge may be positioned on a first side of a lower cushion 102 and lower structural member 122 and one or more additional hinges may be positioned linearly opposite of the first hinge on a second side of the lower cushion 102 and lower structural member 122. In some embodiments, the at least one hinge 124 may be connected to at least one hydraulic actuator and/or at least one motor configured to automatically and/or manually move at least a portion of the lower cushion 102 and lower structural member 122. The lower structural member 122 may be connected to the upper structural member 121 by the hinge 124.

FIGS. 1B-1F illustrate an exemplary method of selectively configuring at least one seat assembly in accordance with various embodiments of the present disclosure. In various embodiments, a user may selectively attach and/or detach at least one lower cushion 102 and/or at least one back cushion 104 from the frame 120 of a first seat assembly and/or one or more additional seat assemblies. In one or more embodiments, the at least one lower cushion 102 and/or the at least one back cushion 104 may comprise at least one attachment mechanism, respectively. In some embodiments, the at least one attachment mechanism of the at least one lower cushion 102 and/or the at least one back cushion 104 may be at least partially integrated within the at least one lower cushion 102 and/or the at least one back cushion 104. The at least one attachment mechanism of the at least one lower cushion 102 and/or at least one back portion may be one or more of: snap, screw, clip, bolt, adhesive tape, Velcro, tether, strap, clamp, snap-on, zipper, or a combination thereof. In various embodiments, the at least one lower cushion 102 and/or the at least one back cushion 104 may comprise a plurality of attachment mechanisms, such that the plurality of attachment mechanisms may be evenly and/or unevenly located on the at least one lower cushion 102 and/or the at least one back cushion 104. In various embodiments, the at least one attachment mechanism of the at least one lower cushion 102 and/or at least one back cushion 104 may align with at least one corresponding attachment mechanism 140 (e.g., a securing mechanism) disposed on at least one of the frame portions. In various embodiments, the attachment between the attachment mechanism on the cushions and corresponding complementary attachment mechanism on the frame may withstand the force of a collision. For example, the lower cushion 102 may be configured with an assortment of snaps, and the lower structural member 122 may comprise corresponding portions of the snaps in analogous locations. By positioning the lower cushion 102 snaps over the corresponding snaps on the lower structural member 122 and applying force, a user may attach the lower cushion 102 to the lower structural member 122. Furthermore, the frame 120 may have contours and/or a specific contoured shape. The cushions may further have a complementary contoured shape designed to fit within edges or around portions of frame 120. The contours and/or contoured shape may be designed to aid in alignment of attachment mechanisms between the frame 120 and the cushions and/or may aid in preventing the cushions from separating from the frame.

In various embodiments, the frame 120 may comprise a plurality of complementary attachment mechanisms, such that the plurality of complementary attachment mechanisms may be evenly and/or unevenly positioned along the frame 120. In one or more embodiments, the frame 120 may comprise an equal number of complementary attachment mechanisms 140 to the number of attachment mechanisms on at least one lower cushion and/or at least one back cushion. In other embodiments, the frame 120 may comprise an unequal number of complementary attachment mechanisms 140 to the number of attachment mechanisms on at least one cushion portion and/or at least one back portion. In various embodiments, the frame 120 may comprise at least one complementary attachment mechanism configured to at least partially attach and/or detach the at least one lower cushion 102 and/or the at least one back cushion 104 to the frame 120. In some embodiments, the at least one securing mechanism 140 may be at least partially integrated within the at least one frame portion.

In various embodiments, the frame portion of at least one seat assembly may allow for the fitting of at least one lower cushion and/or at least one back cushion that may comprise a variety of different styles and shape/configuration (e.g., comfort seats, sport seats, bucket seats, etc.). The frame portion of the at least one seat assembly may allow a user to change the style of the seats without removing the entire seat assembly. As will be appreciated by those of skill in the art, such interchangeability has multiple benefits. First, it allows the user to change the style of a vehicle and/or customize the vehicle without changing the upholstering of the entire seat body, which is expensive. Additionally, it allows the user to change the style of a vehicle and/or customize the vehicle without removing entire seat assemblies. Second, when a seat cushion and/or back portion (the two most worn parts of seats) wears out, the individual parts can be easily replaced. This lessens the carbon footprint of the vehicle as entire parts do not have to be replaced due simply to wear and tear. Third, a manufacturer can use a single seat assembly and/or frame portion for multiple different styles of seats, which reduces costs, because automotive seats are expensive to develop and homologate.

With reference to FIG. 1B, in various embodiments, a user may selectively detach at least one attachment mechanism of a back cushion 104 from at least one complementary attachment mechanism 140 of the frame 120 (e.g., at upper structural member 121), such that the back cushion 104 may be at least partially removed from the frame 120. In some embodiments, the back cushion 104 may be detached from the frame and/or moved away from the frame 120 (as shown by arrow 130A). In various embodiments, the back cushion 104 may comprise a first style of the back cushion. As depicted in FIG. 1C, in various embodiments, a user may move at least one additional back cushion 114 (e.g., a second back cushion) towards the frame 120 (as shown by arrow 130B). In some embodiments, the at least one additional back cushion 114 may comprise for example, one or more of: at least one additional style (e.g., sport, comfort, racing, outdoors, etc.), at least one additional material (e.g., cloth, leather, microfabric, etc.), at least one additional color, or a combination thereof. In other embodiments, the at least one additional back cushion 114 may comprise the same style as the original back cushion 104 (e.g., a replacement for a worn or damaged back cushion).

Figure 1D:
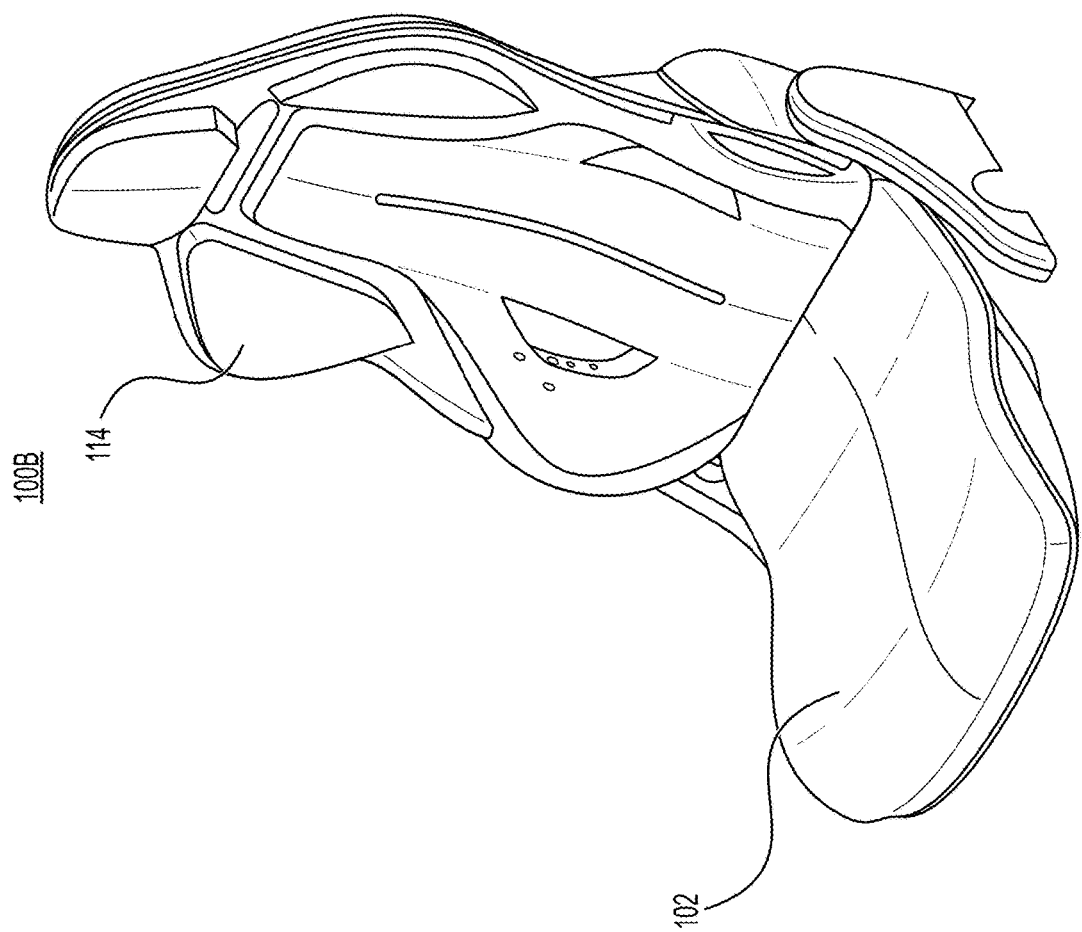
Figure 1E:
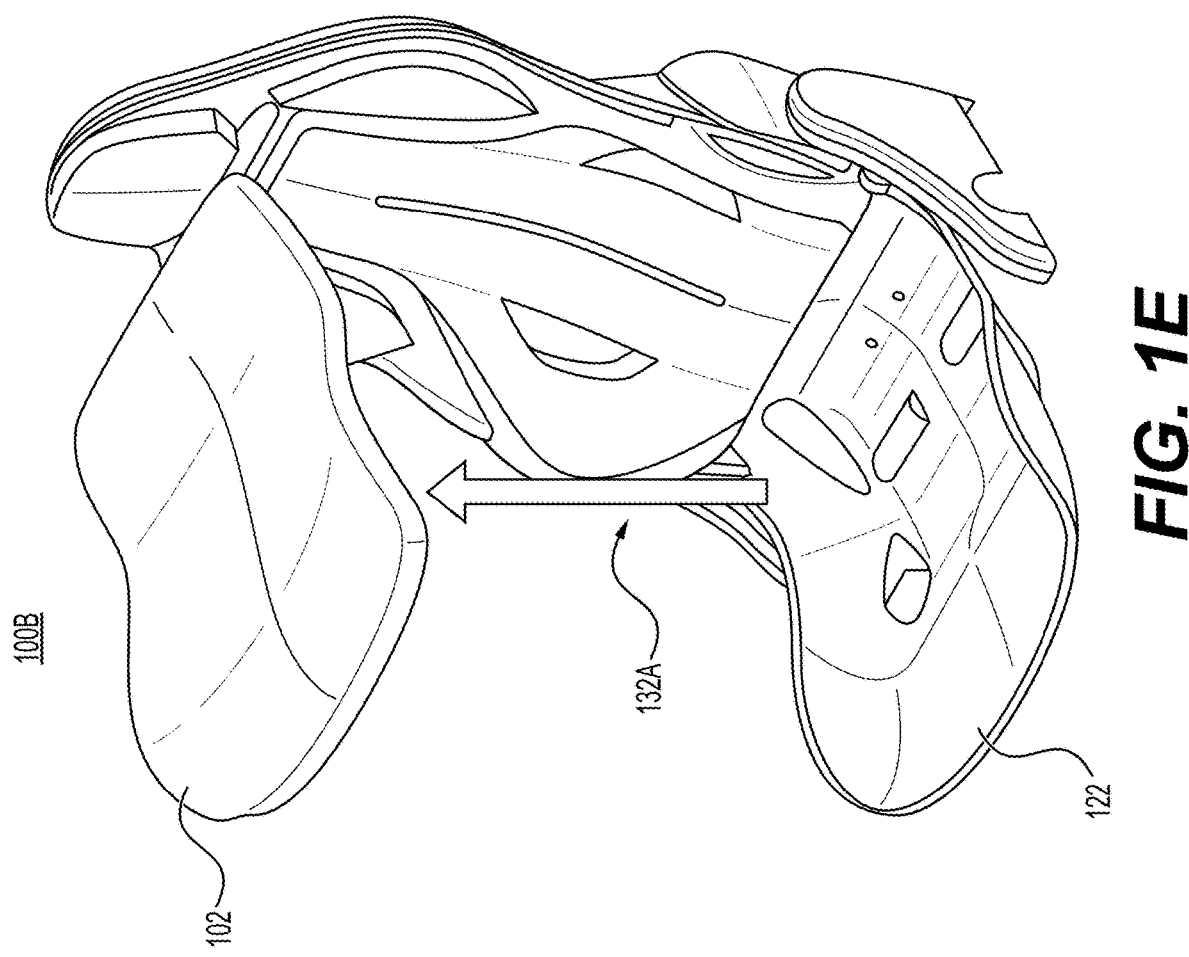

As depicted in FIG. 1D, in various embodiments, a user may secure at least one attachment mechanism of the at least one additional back cushion 114 to at least one securing mechanism of the frame 120. In various embodiments, the seat assembly 100B may comprise a new back cushion 114 (e.g., the at least one additional back cushion 114) and/or a prior-fitted lower cushion 102. In other embodiments, the seat assembly 100B may comprise a new back cushion 114 (e.g., the at least one additional back cushion 114) and/or a new lower cushion 112 (depicted in FIG. 1E). As depicted in FIG. 1E, in various embodiments, a user may selectively detach at least one attachment mechanism of a lower cushion 102 from at least one securing mechanism of the frame 120, such that the lower cushion 102 may be at least partially removed from the frame 120. In some embodiments, the lower cushion 102 may be detached from the frame portion and/or moved away from the frame 120 (as depicted by arrow 132A). In various embodiments, the lower cushion 102 may comprise a first style of the back portion.

Figure 1F:
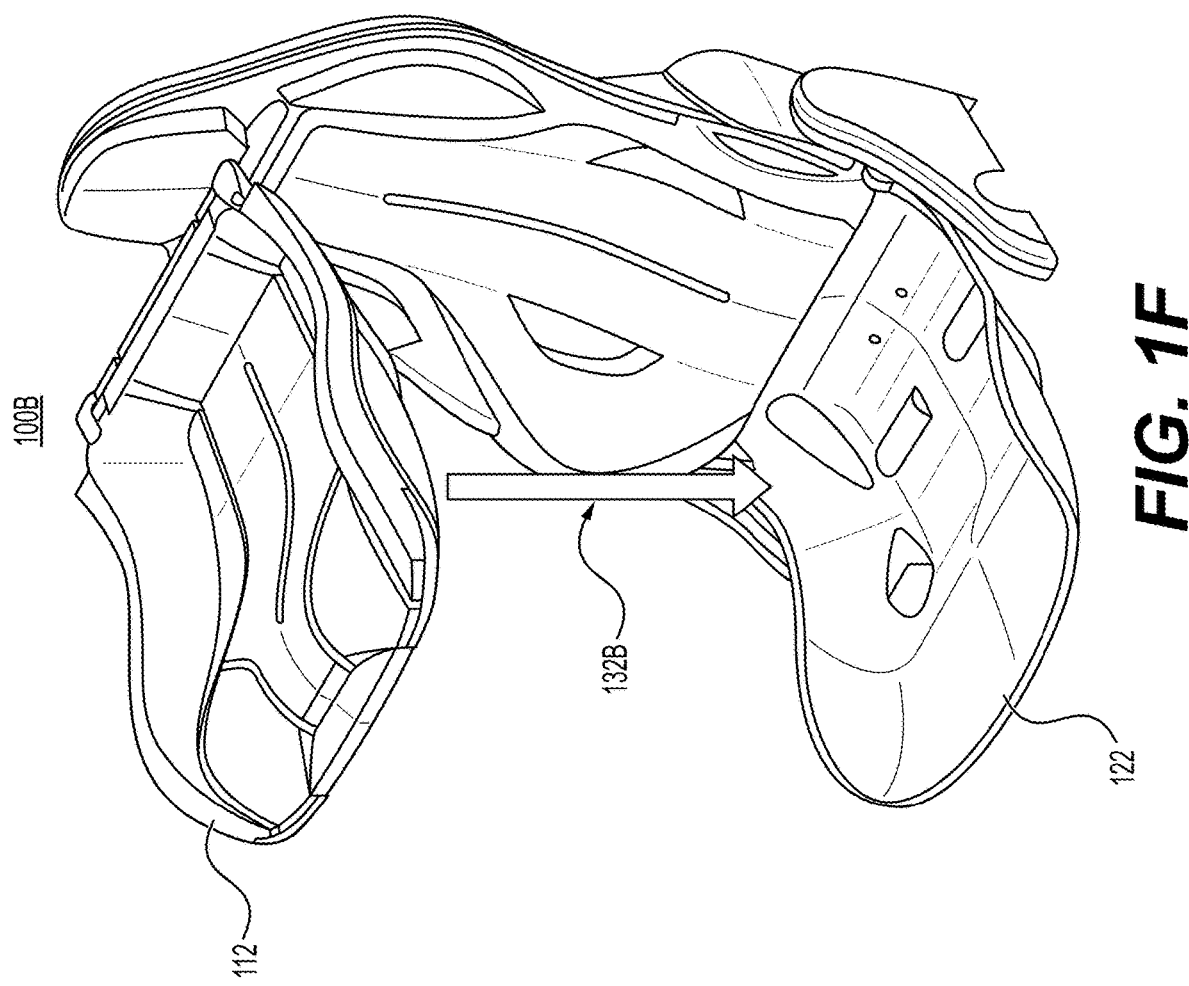

As depicted in FIG. 1F, in various embodiments, a user may move at least one additional lower cushion 112 towards the frame 120 (as depicted by arrow 132B). In some embodiments, the at least one additional lower cushion 112 may comprise one or more of: at least one additional style (e.g., sport, comfort, racing, outdoors, etc.), at least one additional material (e.g., cloth, leather, microfabric, etc.), at least one additional color, or a combination thereof. In other embodiments, the at least one additional lower cushion 112 may comprise the same style as the original cushion portion. As depicted in FIG. 1G, in various embodiments, a user may secure at least one attachment mechanism of the at least one additional lower cushion 112 to at least one securing mechanism of the frame 120. In various embodiments, the seat assembly 100C may comprise a new cushion portion 112 (e.g., the at least one additional cushion portion 112) and/or a prior-fitted back cushion 104. In other embodiments, the seat assembly 100C may comprise a new cushion portion 112 (e.g., the at least one additional cushion portion 112) and/or a new back portion 114.

In one or more embodiments, the process of selectively attaching and/or detaching of at least one cushion portion and/or at least one back portion, as described above, may be done on one or more additional seat assemblies within a vehicle. In some embodiments, the process of attaching and/detaching seat assemblies may be repeated multiple times as needed or desired to change seat characteristics. For example, through using the disclosed embodiments, the standard seat shown in FIG. 1A may be converted to a sport seat, as shown in FIG. 1F.

Seats and seating assemblies may be configured as modular units. One or more embodiments may include a similar seat used in a front center position in the first row, and the two side positions in the first row. A similar seat may also be used in second, third, or more rows. By designing a single seat frame that may be used in many different parts of the vehicle (and is compatible with multiple different seating configurations—e.g., sport seats and comfort seats), costs may be lowered and the seats may be easier to produce. Seats may retain similar parts despite placement in different positions in the vehicle, such as the frame (e.g., the upper and lower structural members), and seat bases. Certain seats may also have unique parts or lack parts related to the function (e.g., the center seat, which moves may lack hinges to fold the lower structural member and seat cushion, but may also comprise or be functionally coupled to one or more actuators to allow it to move to the left or right on tracks). Furthermore, seats designed as shown may aid the rider's line-of-sight, and may comprise features to aid line-of-sight (e.g., by adjusting side seats forwards or backwards to aid the views of a passenger in the back row). Additionally, allowing for a center driving position allows for the driver to have an enhanced driving experience and enhanced view. By placing the driver in the center of the front row, other passengers (e.g., in the side seats and/or back seats) may also have an enhanced line-of-sight, which may aid passenger experience. However, typically it is difficult and uncomfortable for a driver to get into a driving seat in a center position. Therefore, the embodiments disclosed below (e.g., in FIG. 5N) show a solution so that a vehicle may use a center driving configuration, and have the benefits associated with that (e.g., increased visibility), without the downside of the center driving seat being difficult to enter.

FIGS. 2A-2D illustrate example automotive seat configurations in an interior of a vehicle in accordance with various embodiments of the present disclosure. The vehicle may be a modular motor vehicle utilizing door ring and/or cast technology, as described, for example, in U.S. patent application Ser. No. 18/661,058, filed May 10, 2024, titled "Modular Motor Vehicle Platforms and Assembly Methods," the entire contents of which is expressly incorporated by reference herein. The vehicle may also utilize a pillarless barn door design to aid in users entering and exiting the vehicle, as described, for example, in U.S. patent application Ser. No. 18/758,397, filed Jun. 28, 2024, titled "Automotive Door and Window Systems, Devices, and Methods," the entire contents of which is expressly incorporated by reference herein. As depicted in FIGS. 2A-2D, the interior of a vehicle may comprise at least a front row. In various embodiments, the front row may comprise a first seat assembly 102A. In some embodiments, the front row may further comprise at least one additional seat assembly 204A, 204N (collectively "204"). In some embodiments, the front row may configure the first seat assembly 202A for a center driving configuration. In other embodiments, the front row may configure the first seat assembly 202A for a left-side driving configuration. In other embodiments, the front row may configure the first seat assembly 202A for a right-side driving configuration. In one or more embodiments, the front row may configure the at least one additional seat assembly 204N for a left-side driving configuration. In other embodiments, the front row may configure the at least one additional seat assembly 204A for a right-side driving configuration. In some embodiments, the first seat assembly 202A may be positioned slightly in front of the other seats of the front row (e.g., 204A, 204N). This may aid the driving position of the first seat assembly 202A.

In various embodiments, the front row may comprise a first additional seat assembly 204A and/or one or more additional seat assemblies 204N. The first additional seat assembly may be positioned on a first side of the first seat assembly 204A and/or the one or more additional seat assemblies 204N may be positioned on a second side of the first seat assembly 202A. In various embodiments, the first seat assembly 202A and/or the at least one additional seat assembly 204 may move between positions due to actuation of one or more motors (e.g., the seats may be able to move to the left, right, front, or back), such that the at least one additional seat assembly may allow a driver to enter or exit the vehicle. In one or more embodiments, the first seat assembly 202A and/or the at least one additional seat assembly 204 may further comprise one or more electrical switches/buttons (not explicitly shown) connected to at least one motor and/or at least one motorized bladder. The one or more switches/buttons may assist with the positioning the first seat assembly 202A and/or the at least one additional seat assembly 204 and/or adjust at least one bolster setting and/or at least one lumbar support setting of the first seat assembly 202A and/or the at least one additional seat assembly 204. In some embodiments, the first seat assembly 202A and/or the at least one additional seat assembly 204 may further comprise a heating/cooling function, massage function, vibration function, and/or the like.

In various embodiments, the first seat assembly 202A and the at least one additional seat assembly 204 may comprise the same style of seat (e.g., same style of cushion portion and same style of back portion), as shown in FIG. 1A. In other embodiments, the first seat assembly 204A and the at least one additional seat assembly 204 may comprise at least partially a different style of seat (e.g., different style of cushion portion and/or different style of back portion).

Figure 2A:
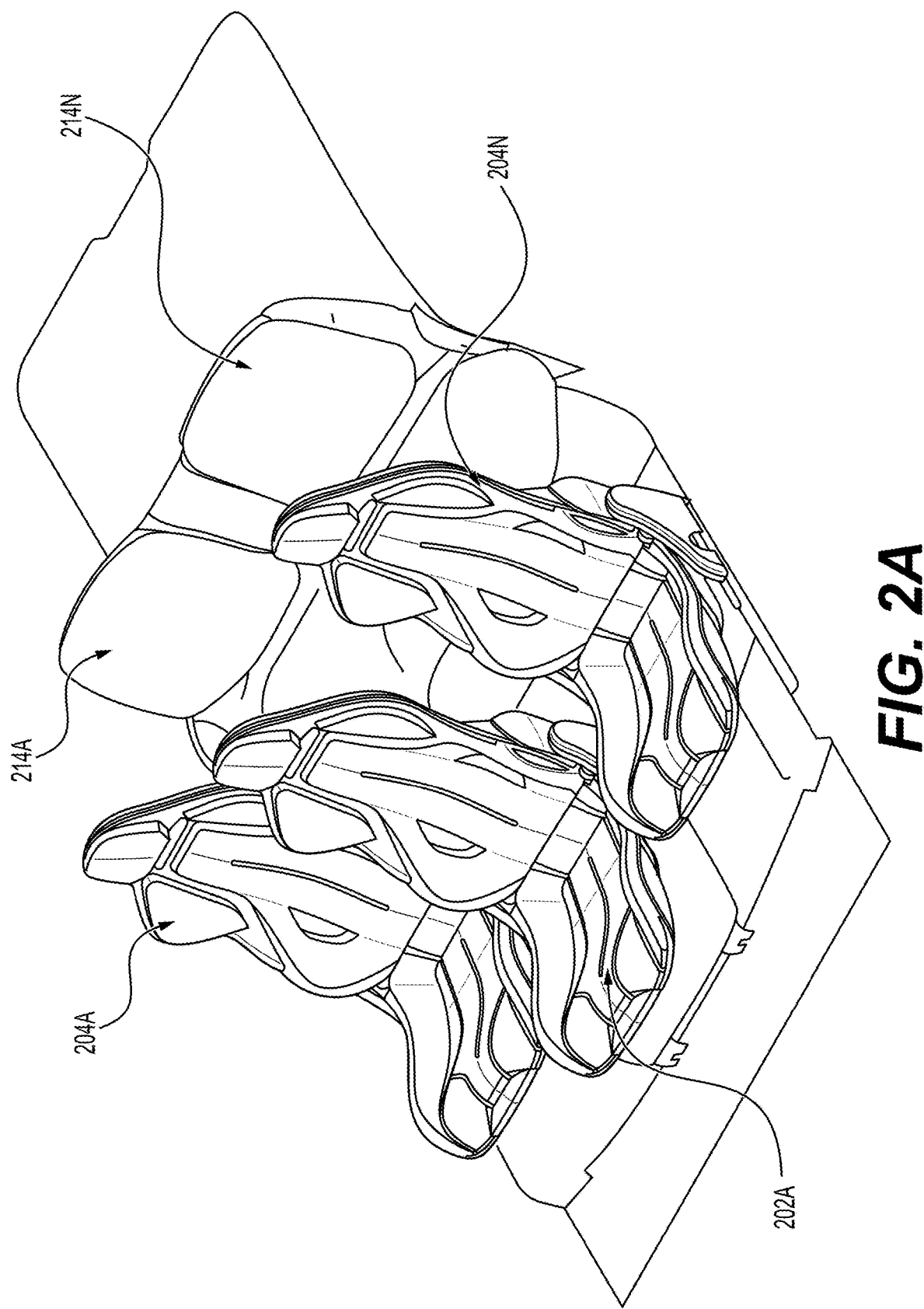
FIGS. 2A-2D are illustrations demonstrating an example seat configuration in accordance with certain embodiments of the disclosed technology.
Figure 2B:
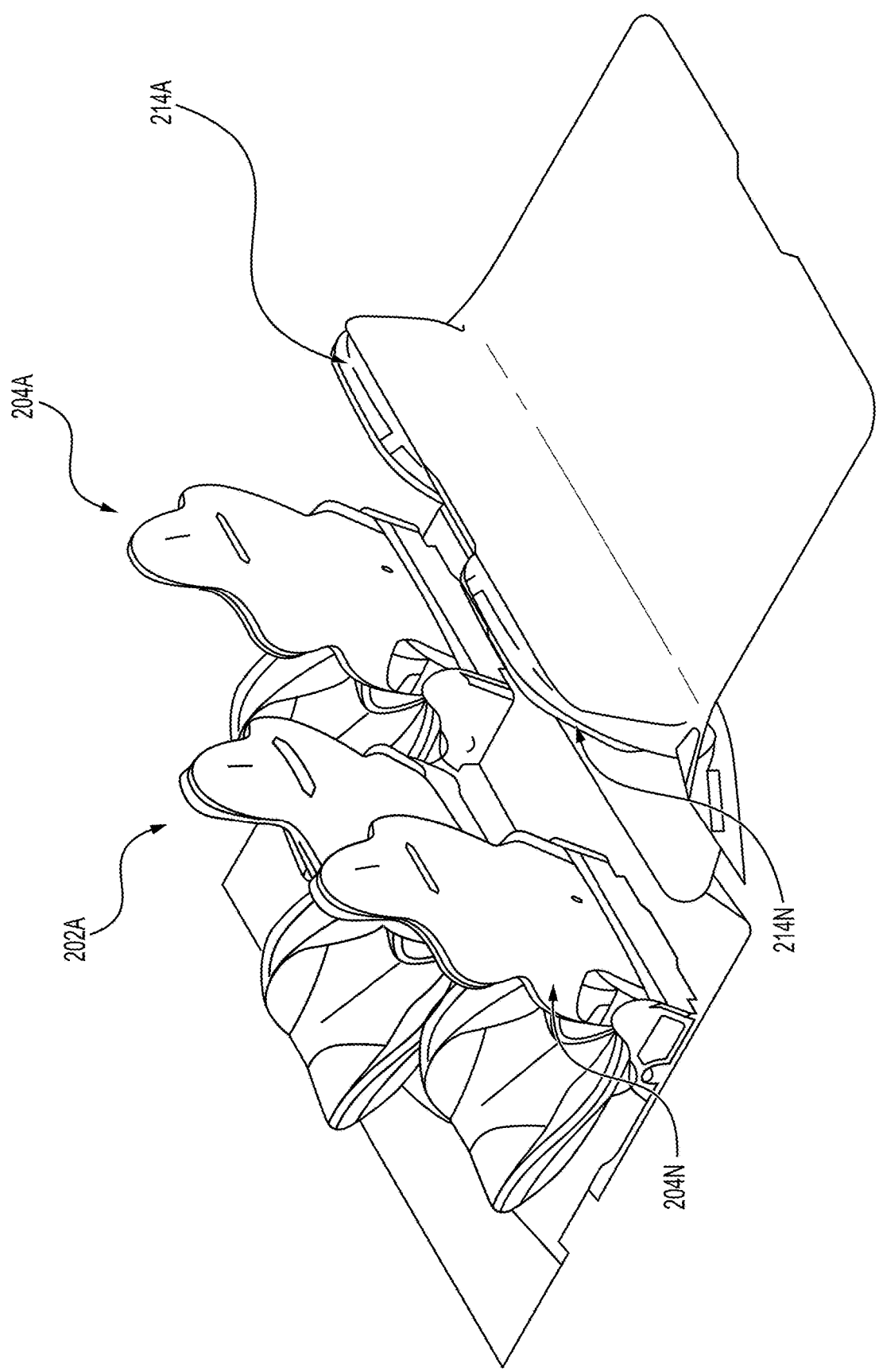
Figure 2C:
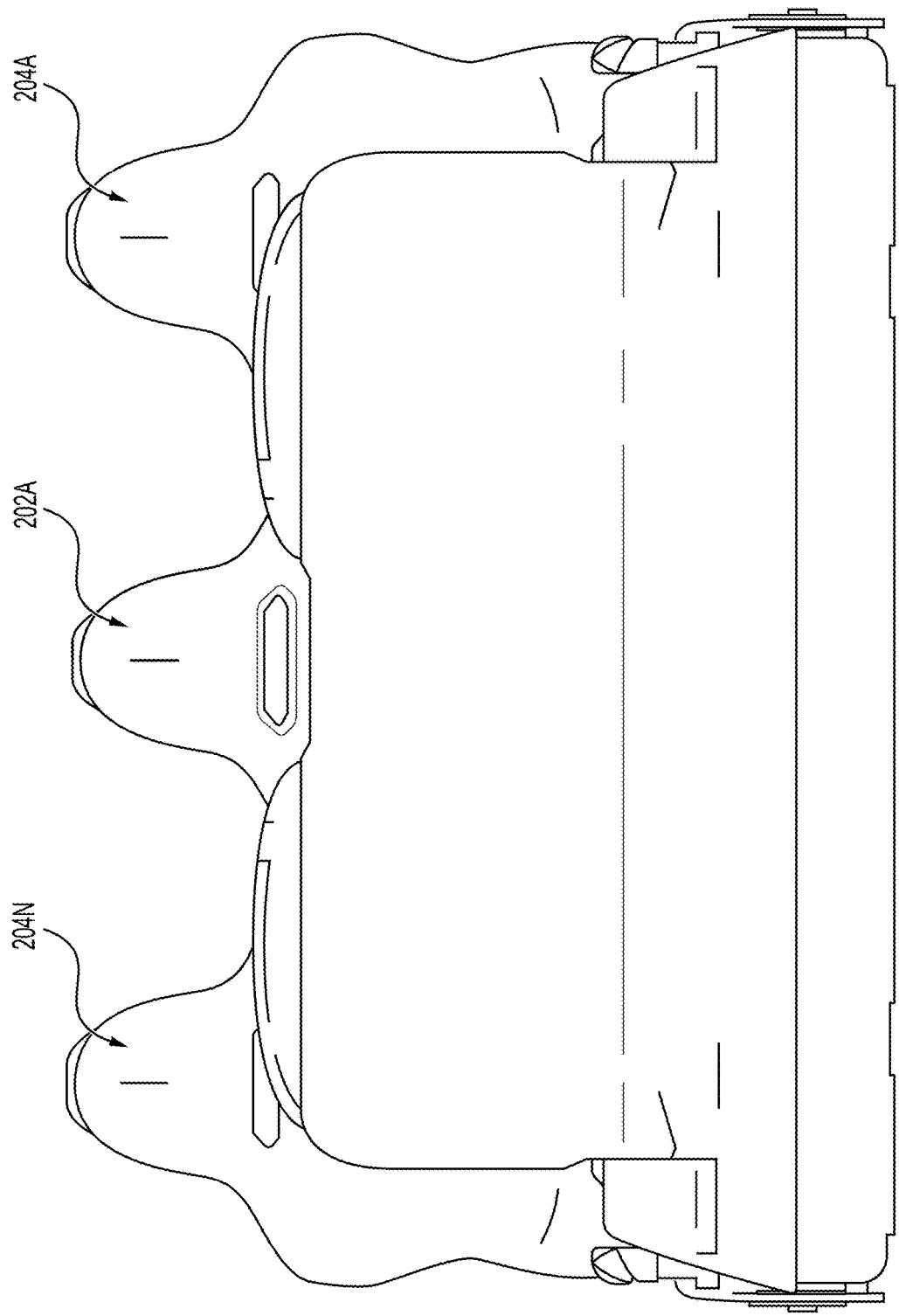
Figure 2D:
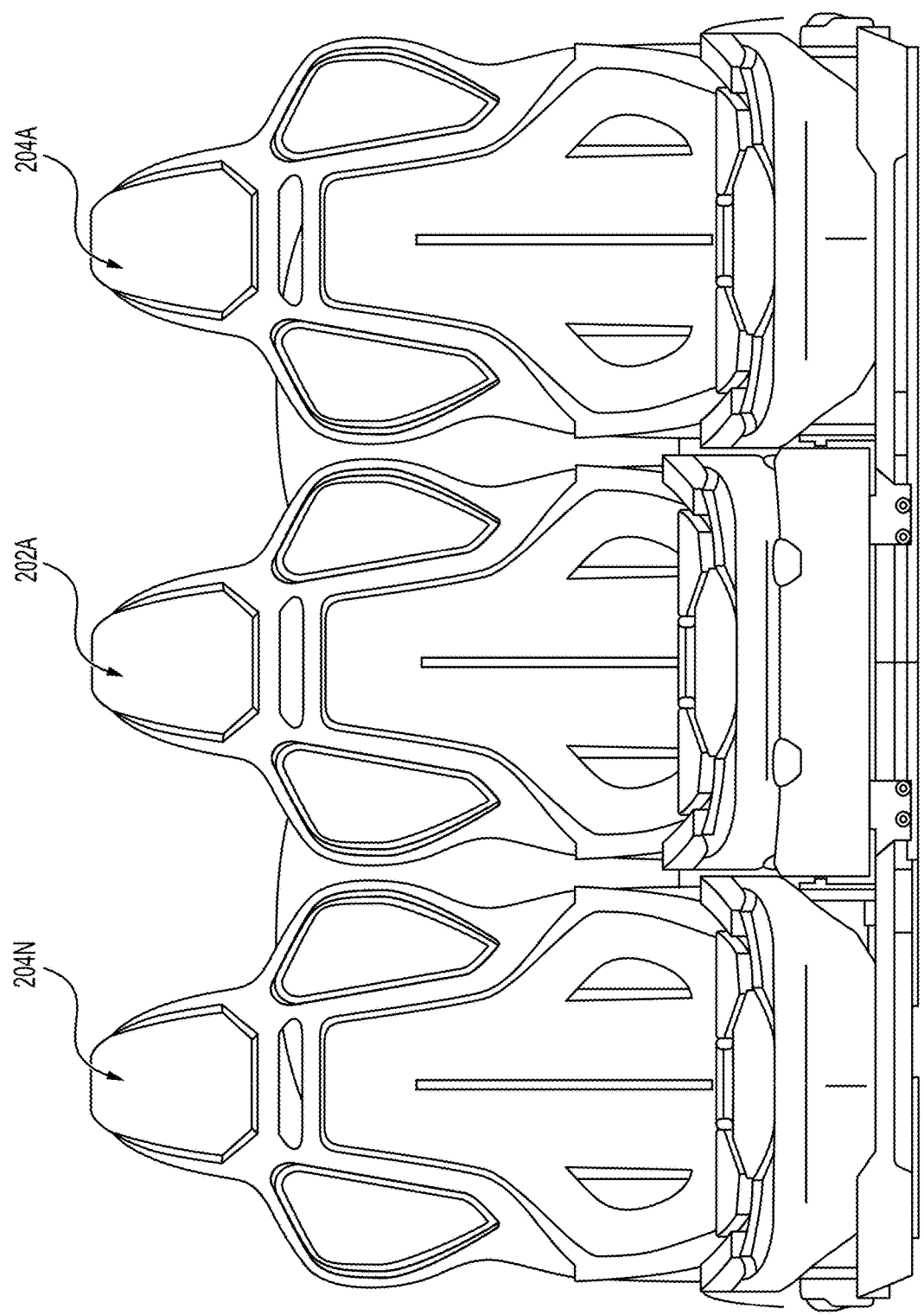

In various embodiments, the front row may comprise a staggered configuration, such that the first seat assembly may be positioned at least partially in front of the at least one additional seat assembly 204A, 204N. An interior of a vehicle may comprise one or more additional rows of seating. The one or more additional row of seating may comprise a first, second row seat assembly 214A and/or at least one additional second row seat assembly 214N. The one or more additional rows of seating may be a bench seat style. As depicted in FIGS. 2C-2D, in various embodiments, the first, second row seat assembly 214A and/or at least one additional second row seat assembly 214N may be positioned in a manner, such that the first, second row seat assembly 214A and/or at least one additional second row seat assembly 214N may have a direct line of sight out a front windshield of a vehicle. The one or more second (or additional rear) rows may be positioned have a line of sight through the front row of multiple adjacent seat assemblies to a front area of the vehicle.

A center drive configuration may offer a unique customer and driving experience versus a more traditional left-hand or right-hand drive layout. This configuration can provide convenience and safety for the driver as it allows them to always enter the car from the curbside when parallel parked on the right side of the road, as opposed to a more traditional left-hand drive layout where the driver would be required to walk into the lane of moving traffic to enter the vehicle. The center drive configuration also has an additional advantage of having to only homologate one driver position for the vehicle in both left- and right-hand drive markets.

Figure 3A:
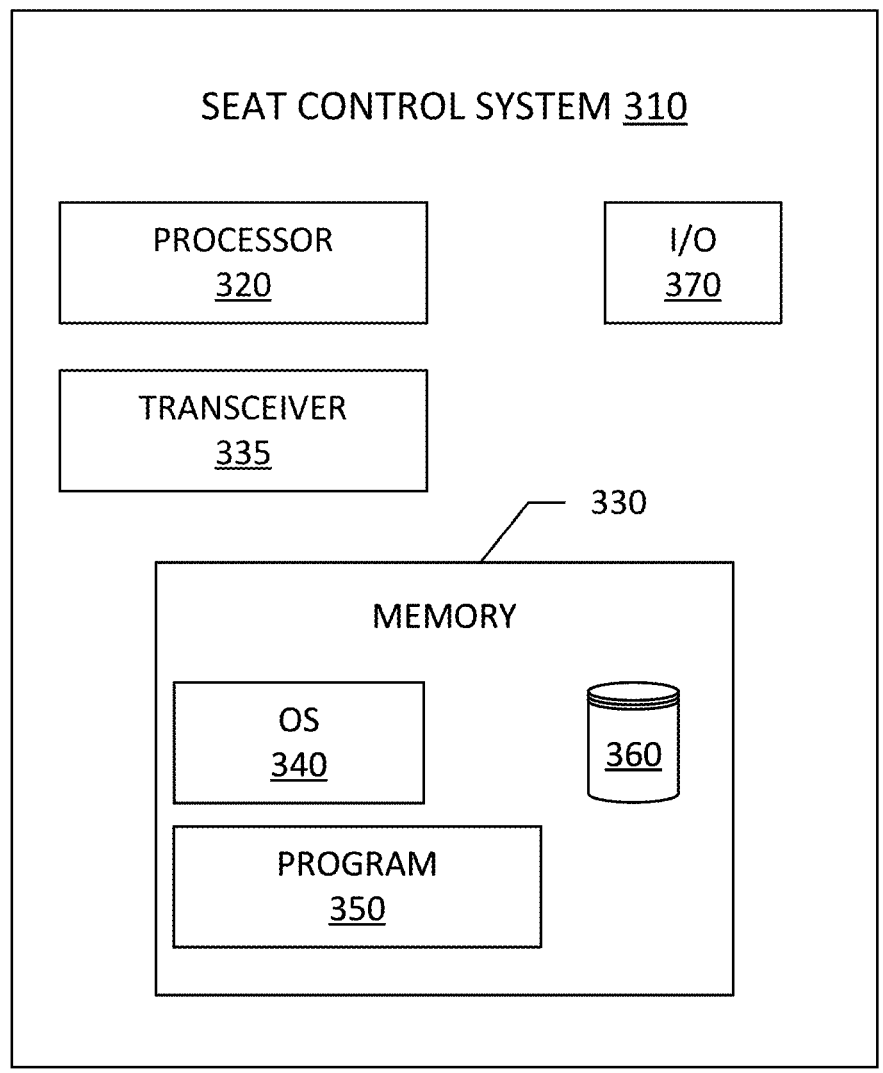
FIG. 3A is a block diagram of an example seat control system used to move seats, according to an example implementation of the disclosed technology.
Figure 3B:
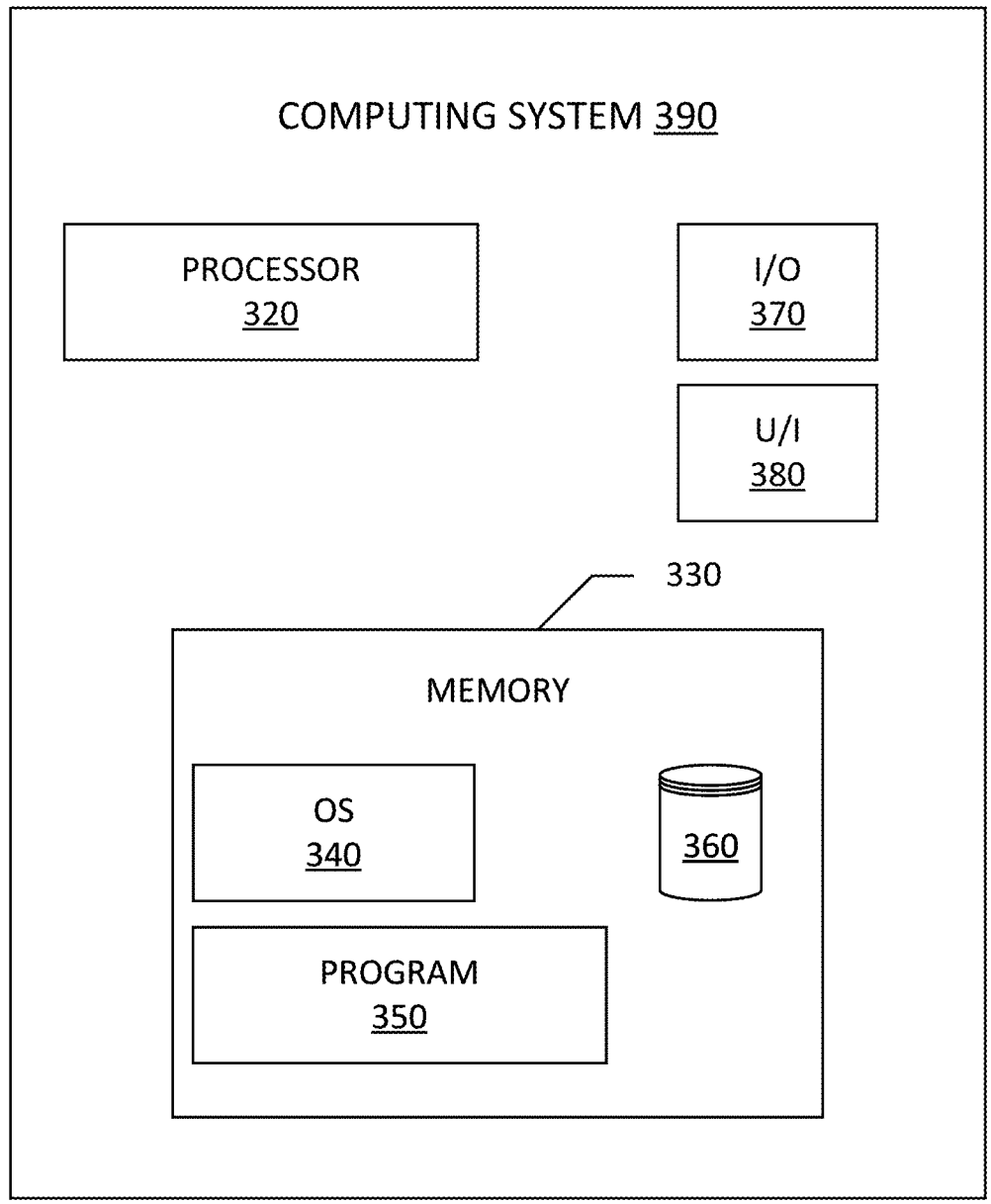
FIG. 3B is a block diagram of an example computing system used to assist the movement of seats, according to an example implementation of the disclosed technology.
Figure 4:
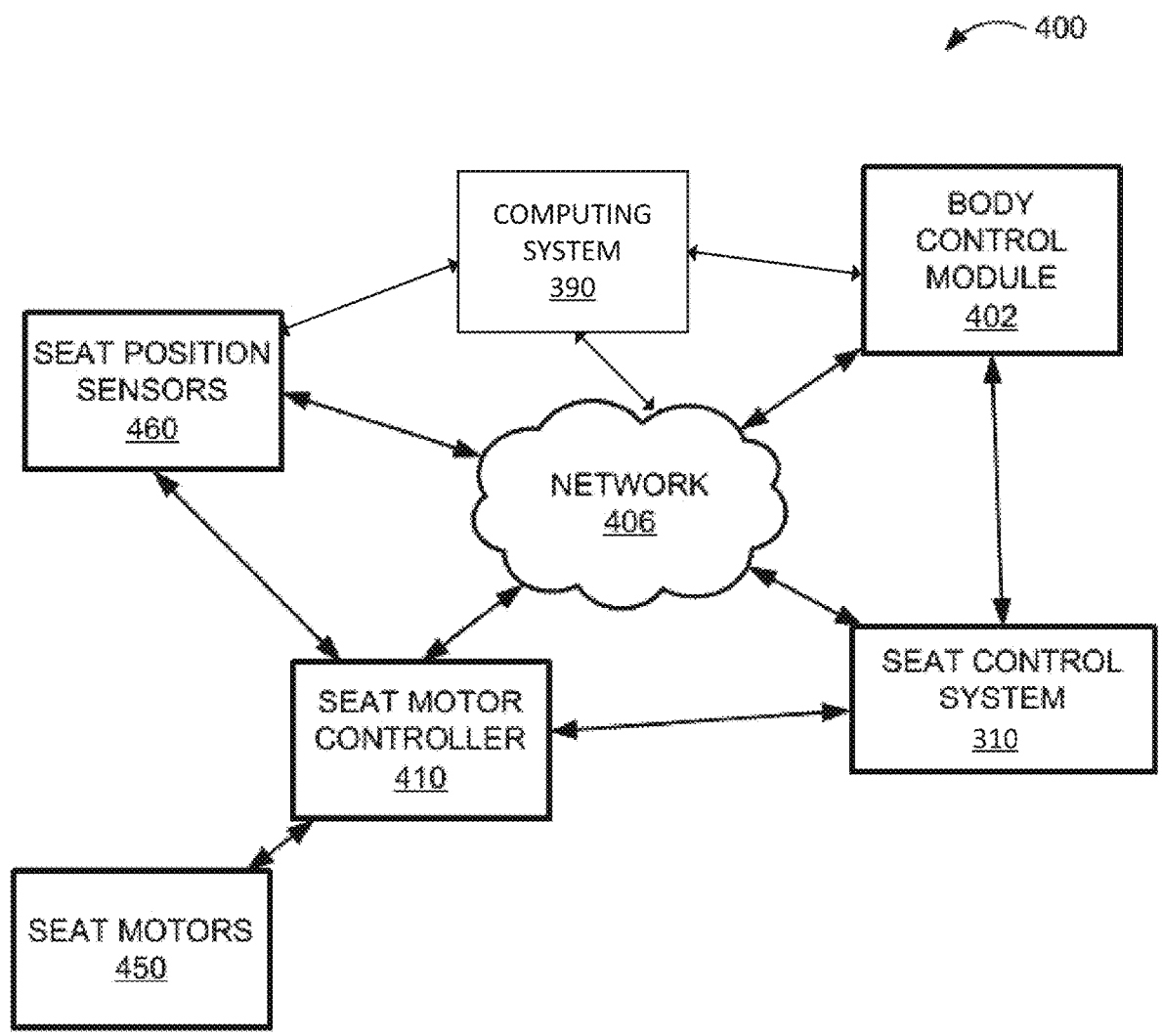
FIG. 4 is a block diagram of an example system that may be used to move seats, according to an example implementation of the disclosed technology.

FIGS. 3A and 3B depict exemplary block diagrams of a seat control system 310 and a computing system 390, respectively, used to move at least one seat assembly in accordance with various embodiments of the present disclosure. According to some embodiments, the body control module 402, seat motor controller 410, and computing system 390 as depicted in FIGS. 3B and 4, and described below, may have a similar structure and components that are similar to those described with respect to seat control system 310 shown in FIG. 3A. As shown in FIG. 3A, the seat control system 310 may include processor 320, input/output ("I/O") device 370, memory 330 containing an operating system ("OS") 340 and program 350. In some examples, the seat control system 310 may comprise, for example, a cell phone, a smart phone, a tablet computer, a laptop computer, a desktop computer, a sever, a controller, a module, or other electronic device. In some embodiments, the seat control system 310 may be integrated into at least one motor, at least one sensor, or a combination thereof. The seat control system 310 may be a single server, for example, or may be configured as a distributed, or "cloud," computer system including multiple servers or computers that interoperate to perform one or more of the processes and functionalities associated with the disclosed embodiments. In some embodiments, the seat control system 310 may further include a peripheral interface, a transceiver 335, a mobile network interface in communication with processor 320, a bus configured to facilitate communication between the various components of the seat control system 310 or network 406 (e.g., ethernet or CAN-BUS), and a power source configured to power one or more components of the seat control system 310.

A peripheral interface may include the hardware, firmware, and/or software that enables communication with various peripheral devices, such as media drives (e.g., magnetic disk, solid state, or optical disk drives), other processing devices, sensors (e.g., pressure sensor, motion sensor, thermal sensor, etc.), motors, or any other input source used in connection with the instant techniques. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, a CAN-BUS port, on-board diagnostics (OBD) port, another like communication interface, or any combination thereof.

In some embodiments, a transceiver 335 may be configured to communicate with compatible devices, such as one or more sensors, one or more computing devices, one or more user devices, one or more key fob, one or more motor, and/or one or more seat assembly. The transceiver 335 may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or wide-area or local area network, such as a CAN-BUS network or other automotive network. In some embodiments, a mobile network interface may include hardware, firmware, and/or software that allows processor(s) 320 to communicate with other devices via wired or wireless networks, whether local or wide area, private or public, as known in the art. A power source may be configured to provide an appropriate alternating current (AC) or direct current (DC) to power components.

As described above, the seat control system 310 may be configured to remotely communicate with one or more other devices, such as computing device 390, network 406, seat position sensors 460, seat motor controller 410, seat motors 450, body control module 402, and/or other external devices. According to some embodiments, the seat control system 310 may utilize network 130 (or other suitable logic) to determine the occupancy of one or more seat assembly and to assist with the movement of one or more seat assembly.

Processor 320 may include one or more of a microprocessor, a microcontroller, a digital signal processor, a co-processor or the like or combinations thereof capable of executing stored instructions and operating upon stored data. Memory 330 may include, in some implementations, one or more suitable types of memory (e.g. such as volatile or non-volatile memory, a random access memory (RAM), a read only memory (ROM), a programmable read-only memory (PROM), an erasable programmable read-only memory (EPROM), an electrically erasable programmable read-only memory (EEPROM), one or more magnetic disks, one or more optical disks, one or more hard disks, one or more removable cartridges, a flash memory, a redundant array of independent disks (RAID), and the like), for storing files including an operating system, one or more application programs (including, for example, a web browser application, a widget or gadget engine, and or other applications, as necessary), executable instructions and data. In one embodiment, the processing techniques described herein are implemented as a combination of executable instructions and data within memory 330.

Processor 320 may be one or more known processing devices, such as a microprocessor from the Pentium™ family manufactured by Intel™ or the Turion™ family manufactured by AMD™. Processor 320 may constitute a single core or multiple core processor that executes parallel processes simultaneously. Processor 320 may be a single core processor, for example, that is configured with virtual processing technologies. In certain embodiments, processor 320 may use logical processors to simultaneously execute and control multiple processes. Processor 320 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

The seat control system 310 may include one or more storage devices configured to store information used by processor 320 (or other components) to perform certain functions related to the disclosed embodiments. In one example, the seat control system 310 may include memory 330 that includes instructions to enable processor 320 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, the seat control system 310 may include memory 330 that includes instructions that, when executed by processor 320, perform one or more processes consistent with the functionalities disclosed herein. Methods, systems, and articles of manufacture consistent with disclosed embodiments are not limited to separate programs or computers configured to perform dedicated tasks. The seat control system 310 may include memory 330 including one or more programs 350, for example, to perform one or more functions of the disclosed embodiments. Moreover, processor 320 may execute one or more programs 350 located remotely from the seat control system 310. For example, the seat control system 310 may access one or more remote programs 350, that, when executed, perform functions related to disclosed embodiments.

Memory 330 may include one or more memory devices that store data and instructions used to perform one or more features of the disclosed embodiments. Memory 330 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational databases. Memory 330 may include software components that, when executed by processor 320, perform one or more processes consistent with the disclosed embodiments. In some embodiments, memory 330 may include database 360 for storing related data to enable the seat control system 310 to perform one or more of the processes and functionalities associated with the disclosed embodiments.

The seat control system 310 may also be communicatively connected to one or more memory devices (e.g., databases (not explicitly shown)) locally or through a network. The remote memory devices may be configured to store information and may be accessed and/or managed by the seat control system 310. By way of example, the remote memory devices may be document management systems, Microsoft™ SQL database, SharePoint™ databases, Oracle™ databases, Sybase™ databases, or other relational databases. Systems and methods consistent with disclosed embodiments, however, are not limited to separate databases or even to the use of a database.

The seat control system 310 may also include one or more I/O devices 370 that may include one or more interfaces (e.g., transceivers) for receiving signals or input from devices and providing signals or output to one or more devices that allow data to be received and/or transmitted by the seat control system 310. The seat control system 310 may include interface components, for example, which may provide interfaces to one or more input devices, such as one or more keyboards, mouse devices, touch screens, track pads, trackballs, scroll wheels, digital cameras, microphones, sensors, and the like, that enable user device 110 to receive data from one or more users.

In example embodiments of the disclosed technology, the seat control system 310 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While the seat control system 310 has been described as one form for implementing the techniques described herein, those having ordinary skill in the art will appreciate that other, functionally equivalent techniques may be employed. As is known in the art, some or all of the functionality implemented via executable instructions may also be implemented using firmware and/or hardware devices such as, for example, application specific integrated circuits (ASICs), programmable logic arrays, state machines, etc. Furthermore, other implementations of the first user device 110 may include a greater or lesser number of components than those illustrated.

FIG. 3B shows an example embodiment of computing system 390. As shown, computing system 390 may include input/output ("I/O") device 370 for receiving data from another device (e.g., seat control system 310, seat position sensors 460, body control module 402, seat motor controller 410, etc.), memory 330 containing operating system ("OS") 340, program 350, and any other associated component as described above with respect to seat control system 310. Computing system 390 may also have one or more processors 320, geographic location sensor ("GLS") for determining the geographic location of computing system 390, display for displaying content such as text messages, images, and selectable buttons/icons/links, environmental data ("ED") sensor (e.g., seat position sensors) for obtaining environmental data including audio and/or visual information, and user interface ("U/I") device 380 (e.g., graphical user interface) for receiving user input data, such as data representative of a click, a scroll, a tap, a press, or typing on an input device that can detect tactile inputs. User input data may also be non-tactile inputs that may be otherwise detected by ED sensor. For example, user input data may include auditory commands. According to some embodiments, U/I device 380 may include some or all of the components described with respect to I/O device 370 above. In some embodiments, environmental data sensor may include a microphone and/or an image capture device, such as a digital camera. In some embodiments, the computing system 390 may be a heads-up driving display, a control panel in the interior of a vehicle, a dashboard display, a multimedia display, or combinations thereof.

FIG. 4 is a block diagram of an example system that may be used to move seats, according to an example implementation of the disclosed technology. The components and arrangements shown in FIG. 4 are not intended to limit the disclosed embodiments as the components used to implement the disclosed processes and features may vary. As shown, assorted modules may interact with seat control system 320 and a computing system 390 via a network 406. In certain example implementations, the system 400 may include a network 406, a seat control system 320, a computing system 390, a body control module 402, a seat motor controller 410, seat motors 450, and seat position sensors 460. The system of FIG. 4 may also be used to control actuators, such as actuator 546. Actuators may be controlled, or may communicate with seat motor controller 410, network 406, the seat control system 310, the body control module 402, the computing system 390, or any other components shown in FIG. 4. In some embodiments, seat control system 310, body control module 402, computing system 390, the seat motor controller 410 may be integrated into a single computing module or combined computing modules. In some embodiments, one or more of the seat control system 310, computing system 390, the seat motor controller 410 may be an integrated part of seat motors 450 or actuators (e.g., actuator 546).

The network 406 may be of any suitable type, including individual connections via the internet such as cellular or WiFi networks. In some embodiments, the network 406 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, LAN, CAN-BUS, or another automotive bus. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 406 may include any type of computer networking arrangement used to exchange data. For example, the network 406 may be the Internet, a private data network, virtual private network (VPN) using a public network, and/or other suitable connection(s) that enable(s) components in the system 400 environment to send and receive information between the components of the system 400. The network 406 may also include a wireless network. In some embodiments, one or more components of system 400 may be integrated into a single component (e.g., the actions of the seat control system 320 may be performed by the body control module 402 or seat motor controller 406). The components of system 400 may be directly connected (e.g., directly wired) to other components of system 400. Alternatively, the components of system 400 may communicate with other components of system 400 through an automotive network, such as a CAN-BUS network.

Seat control system 310, the body control module 402, and/or computing system 390 may use a variety of means to control seat assemblies. In some embodiments, seat control system 310, the body control module 402, seat motor controller 410 and/or computing system 390 may directly control seat motors 450 and actuators (e.g., via a direct connection) or via a network (e.g., network 406). One or more of seat control system 310, the body control module 402, seat motor controller 410 and/or computing system 390, may coordinate the activities of multiple different seat motors 450, actuators, so that seat assemblies may move in coordinated motion. Accordingly, seat control system 310, the body control module 402, seat motor controller 410 and/or computing system 390 may transmit a variety of signals to actuators and/or seat motors within different seat assemblies. The signals may include commands, modified commands, and messages. Seat control system 310, the body control module 402, seat motor controller 410 and/or computing system 390 may also receive a variety of inputs from other sources, such as seat position sensors 460, which may allow the seat control system 310, the body control module 402, seat motor controller 410 and/or computing system 390 to determine a location of a seat assembly (e.g., whether the center seat assembly is located in the middle driving position or the left or right access positions, whether the side seat assembly has folded a cushion portion (e.g., cushion portion 506), or if a seat has become stuck between multiple positions). Other input sources may include seat occupancy sensors, which may provide seat occupancy data to seat control system 310, the body control module 402, seat motor controller 410 and/or computing system 390. In the case that a side seat is occupied, seat control system 310, the body control module 402, seat motor controller 410 and/or computing system 390 may prevent using actuators and/or seat motors to fold the cushion portion. Accordingly, if seat control system 310, the body control module 402, seat motor controller 410 and/or computing system 390 receive seat occupancy data that the center seat assembly is not occupied, then seat control system 310, the body control module 402, seat motor controller 410 and/or computing system 390 may not proceed with typical seat operations (e.g., after vehicle shutdown, moving the center seat to an access position).

Seat control system 310, the body control module 402, seat motor controller 410 and/or computing system 390 may also receive inputs, requests, or commands for seat movements from other systems. For example, a request to move the center seat to the access position from the driving position may be responsive to a signal generated from shutting off a vehicle, placing the vehicle in a stationary gear, opening a door of the vehicle, a key fob, a mobile device associated with a user (e.g., through a mobile application connected to the vehicle), pushing a dedicated button (e.g., on the seat, or steering wheel), a first selection on a first graphical user interface on a display on an instrument cluster or steering wheel display, a second selection on a second graphical user interface on a display on a vehicle multimedia screen. Furthermore, a request to move the center seat from the access position to the driving position may be responsive to a signal generated from opening a door of the vehicle, a key fob, a mobile device associated with a user, a dedicated button, a first selection on a first graphical user interface on a display on an instrument cluster, a second selection on a second graphical user interface on a display on a vehicle multimedia screen.

Specific commands to move different seats (e.g., center seats and side seats) to different locations may be made in a variety of ways. For example, graphical user interfaces may be displayed on touchscreen displays on vehicle's multimedia screen, instrument cluster, steering wheel, or a user device displaying an associated mobile application. A user may select an option to command a seat movement via a graphical user interface. A user may make a specific gesture via the touchscreen to command a seat movement (e.g., swiping left on the graphical user interface to move the center seat and exit to the left side of the vehicle and swiping right on the graphical user interface to move the center seat and exit to the right side of the vehicle).

In some embodiments, seat movements may be configurable (e.g., the user may be able to configure seating configurations and settings via a graphical user interface, such as a vehicle's multimedia screen). For example, if the user would like more space in the front row the vehicle, and has no passengers, they may configure a setting such that the side seats in the front row remain folded and in a rearward position. The user may be able to indicate a direction of desired movement or speed of the center seat assembly.

Figure 5A:
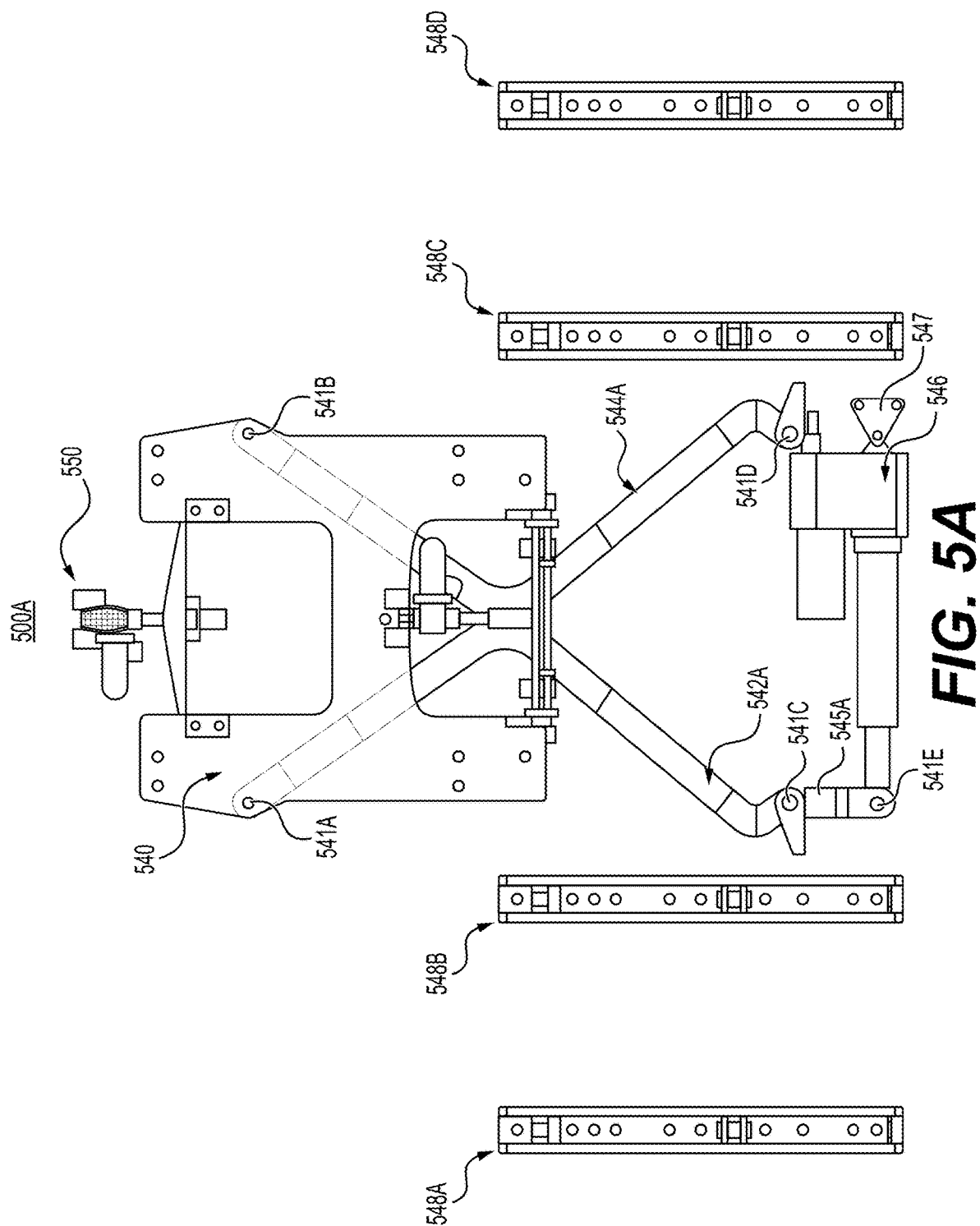
FIGS. 5A-5Q are illustrations demonstrating an example seat movement in accordance with certain embodiments of the disclosed technology.
Figure 5C:
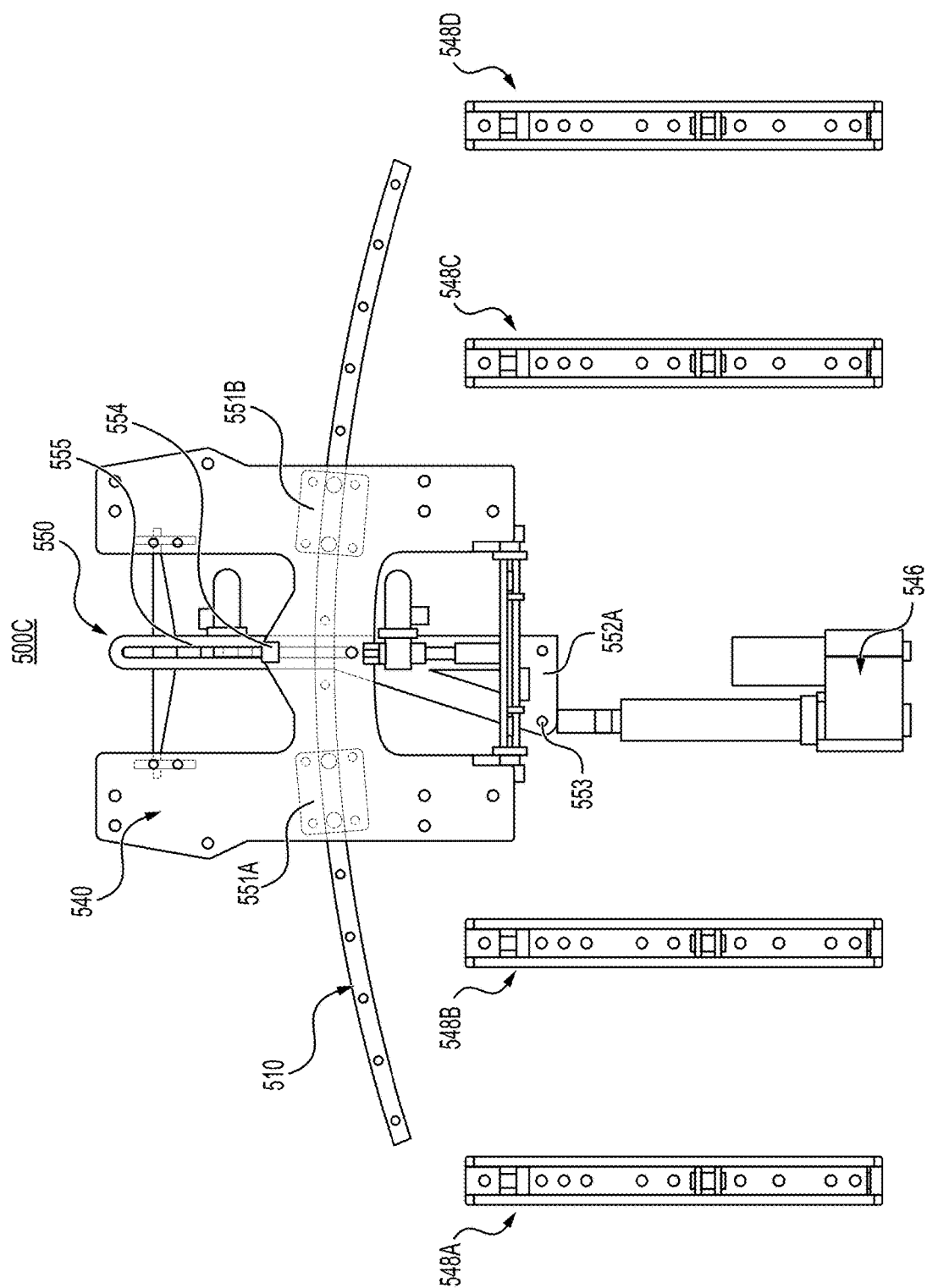
Figure 5D:
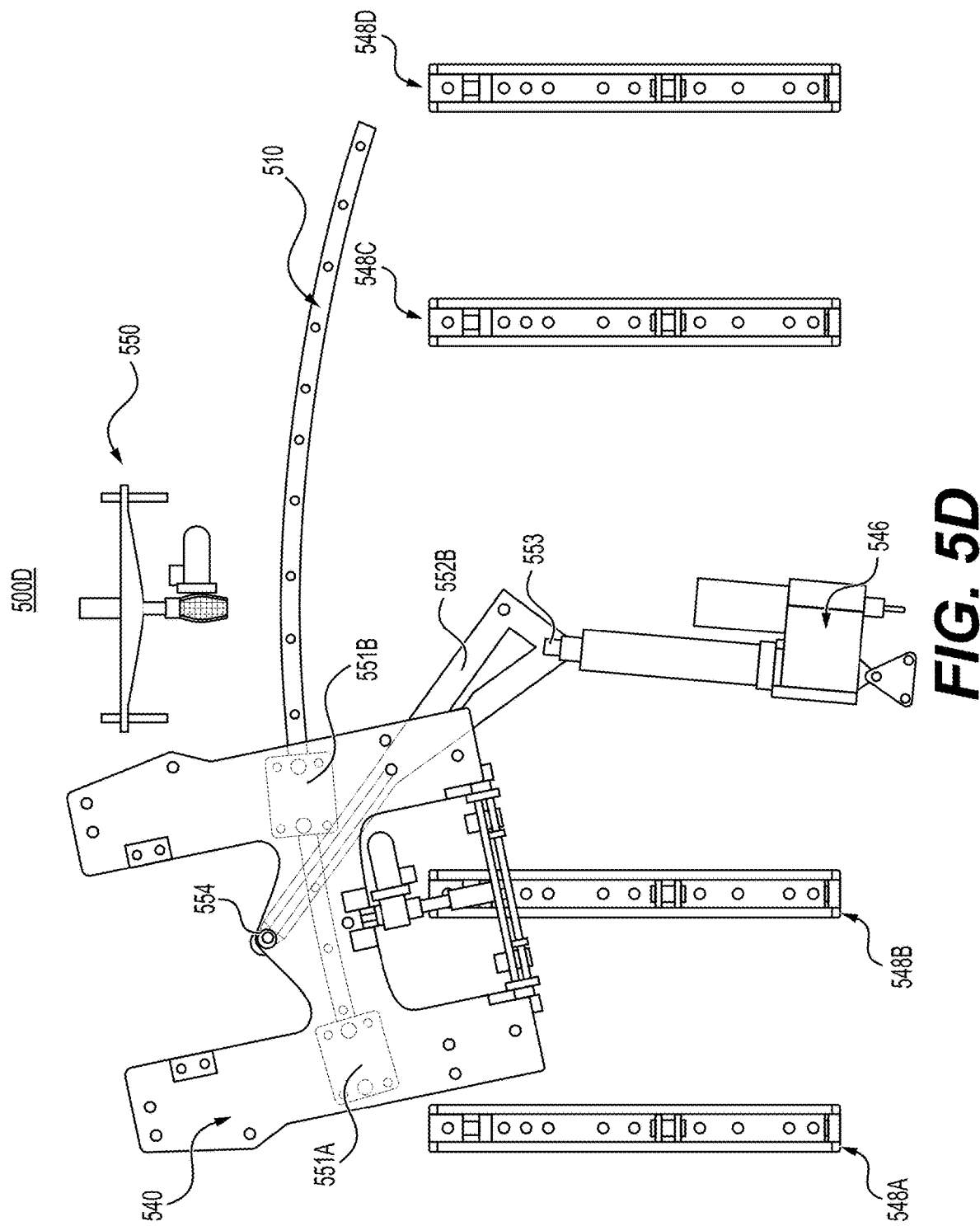
Figure 5E:
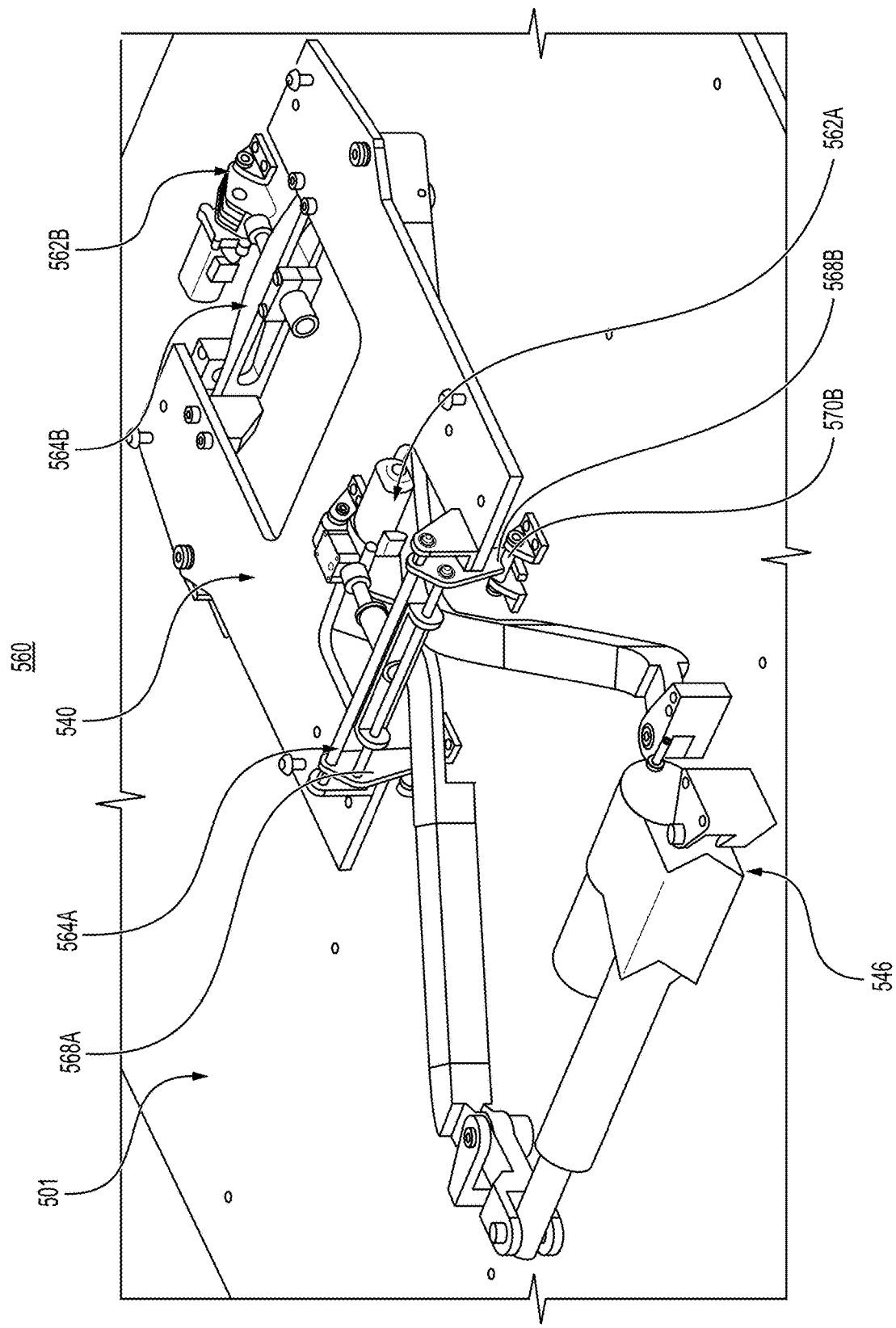
Figure 5F:
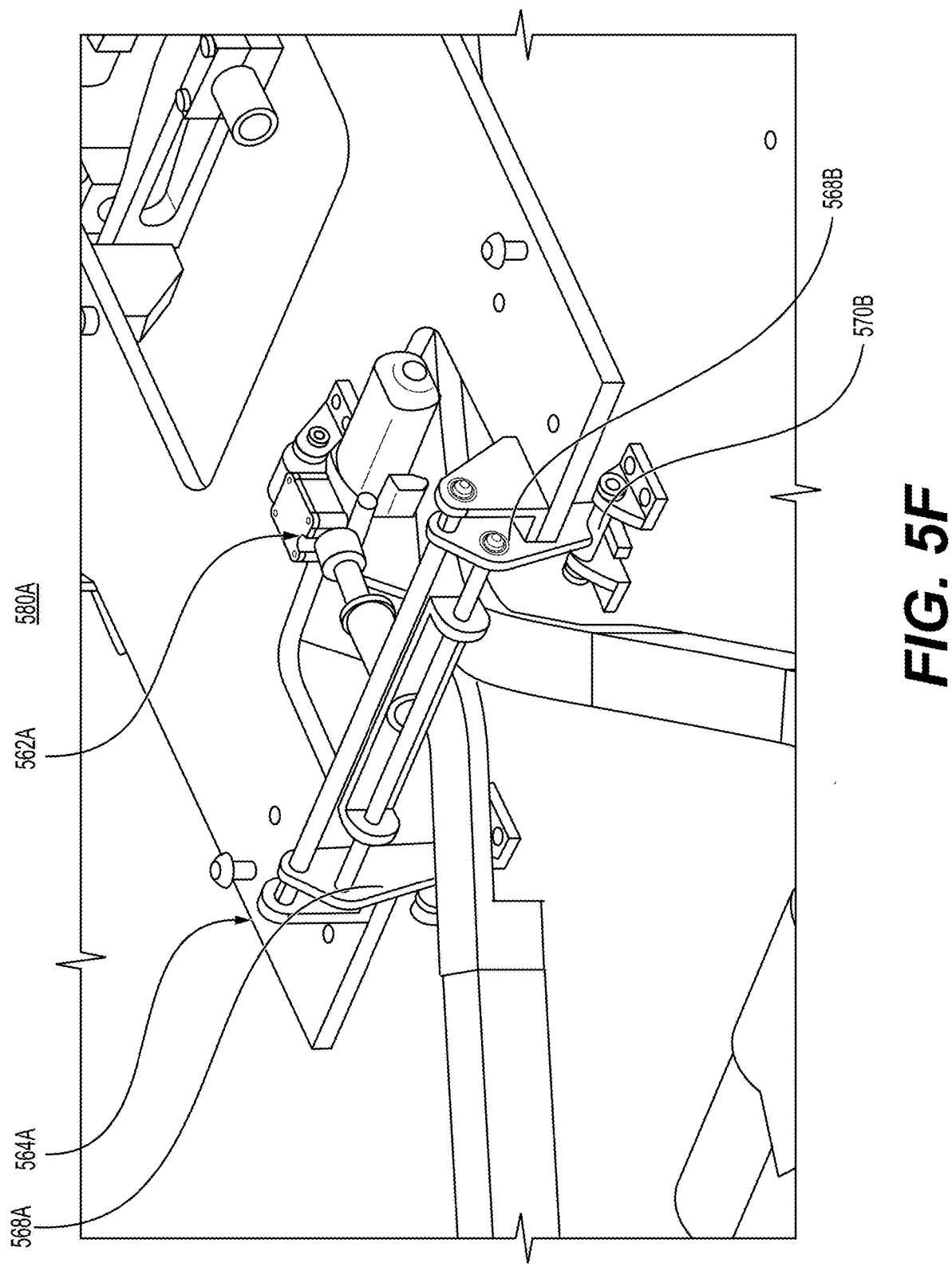
Figure 5G:
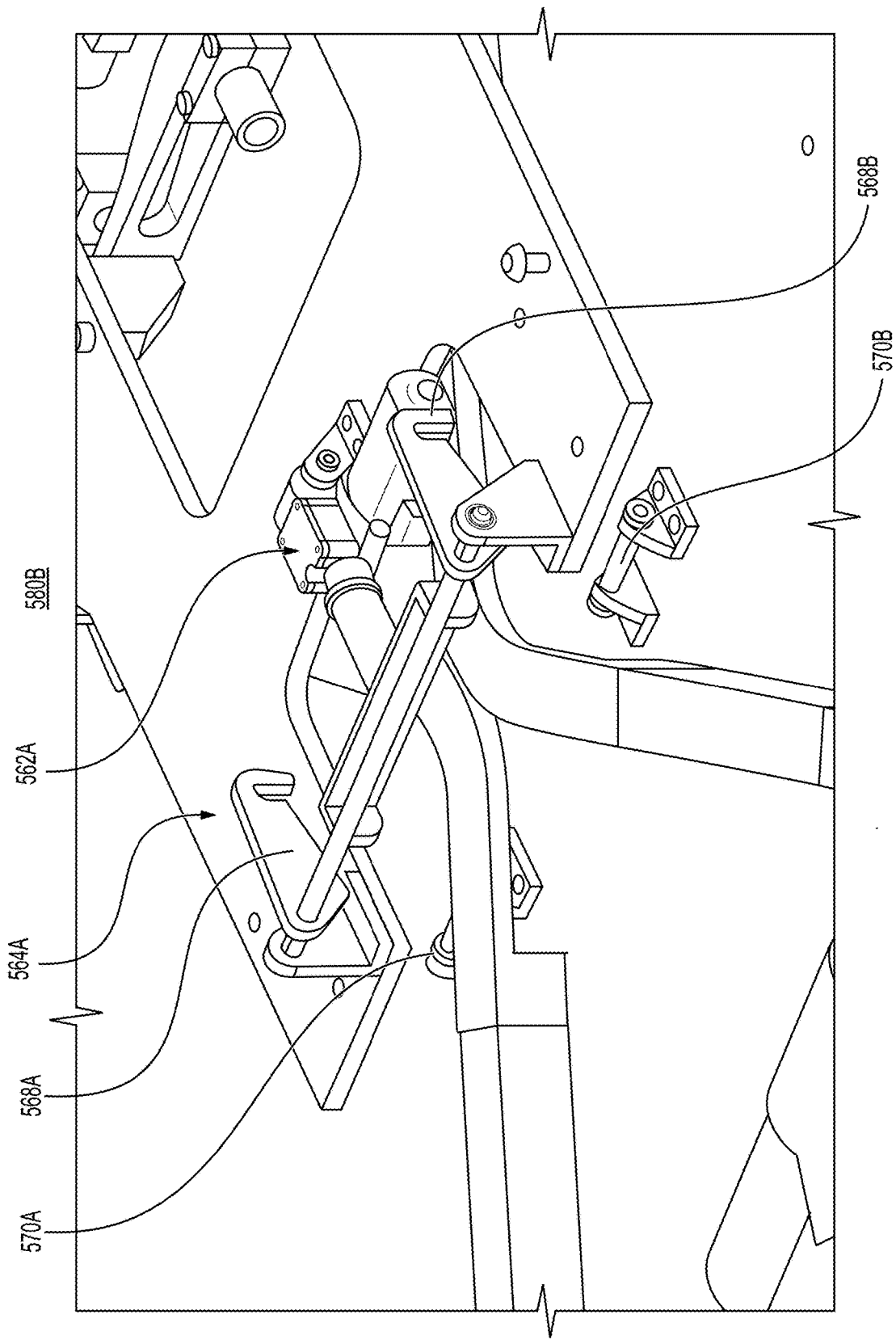
Figure 5H:
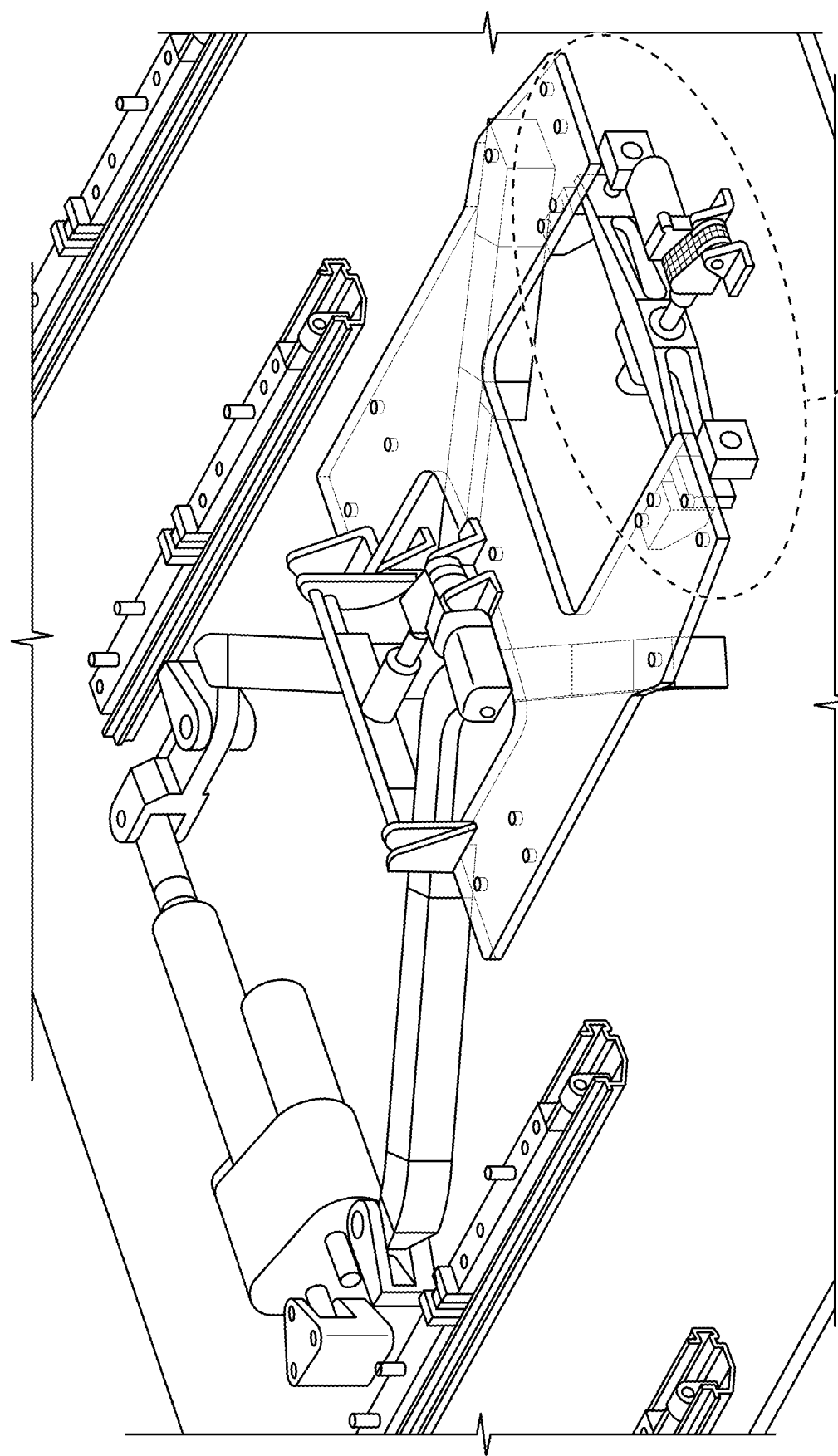
Figure 5I:
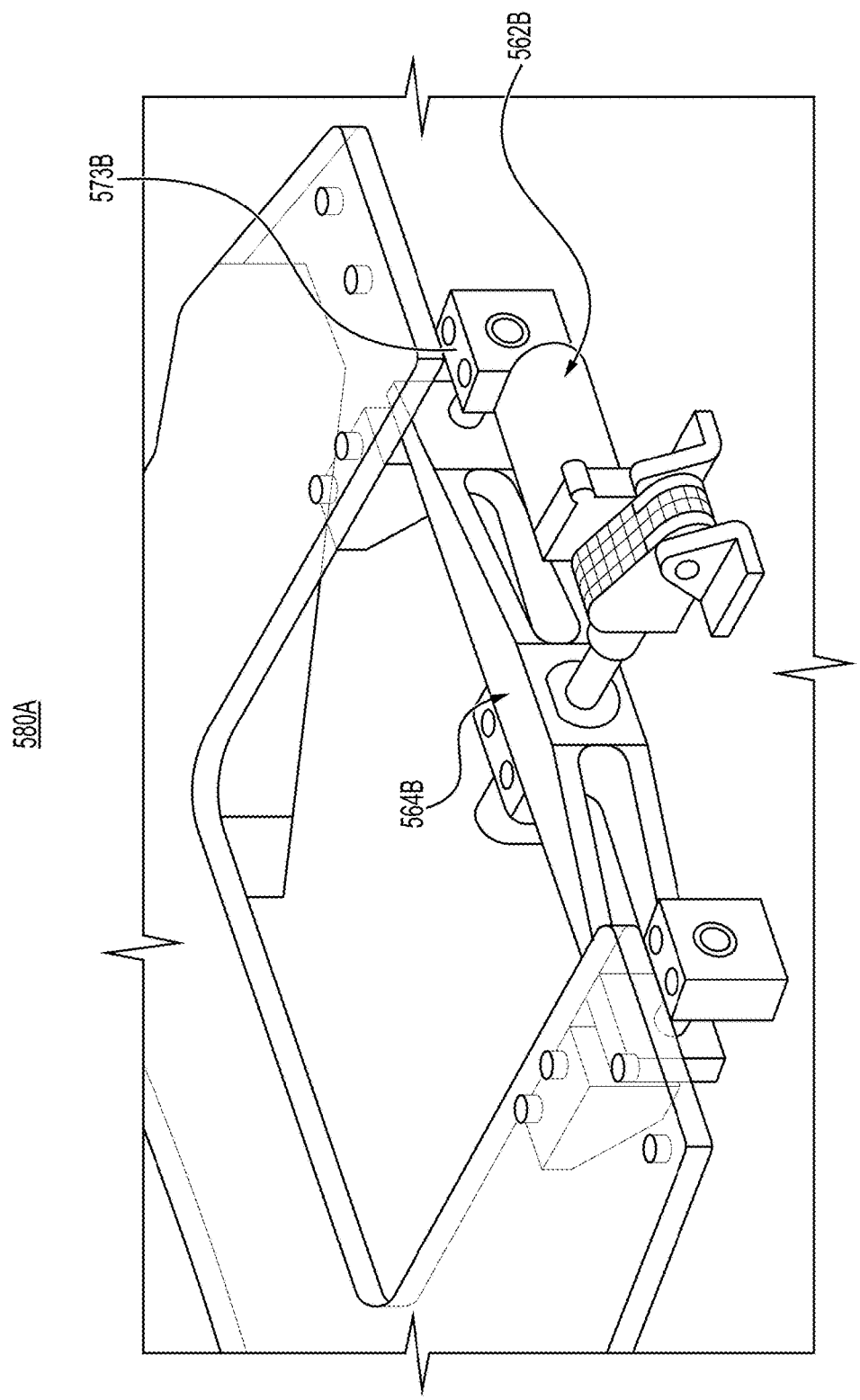
Figure 5J:
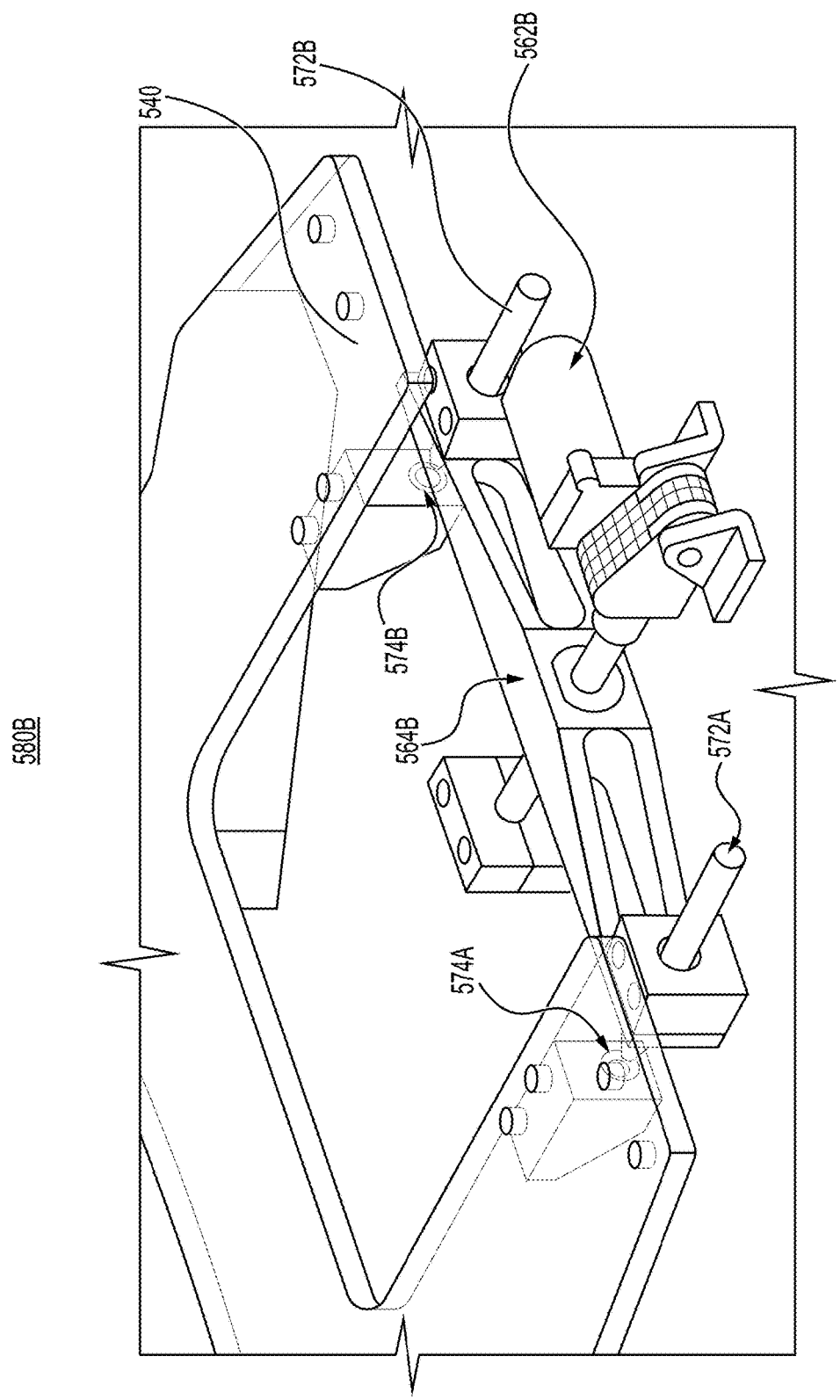
Figure 5L:
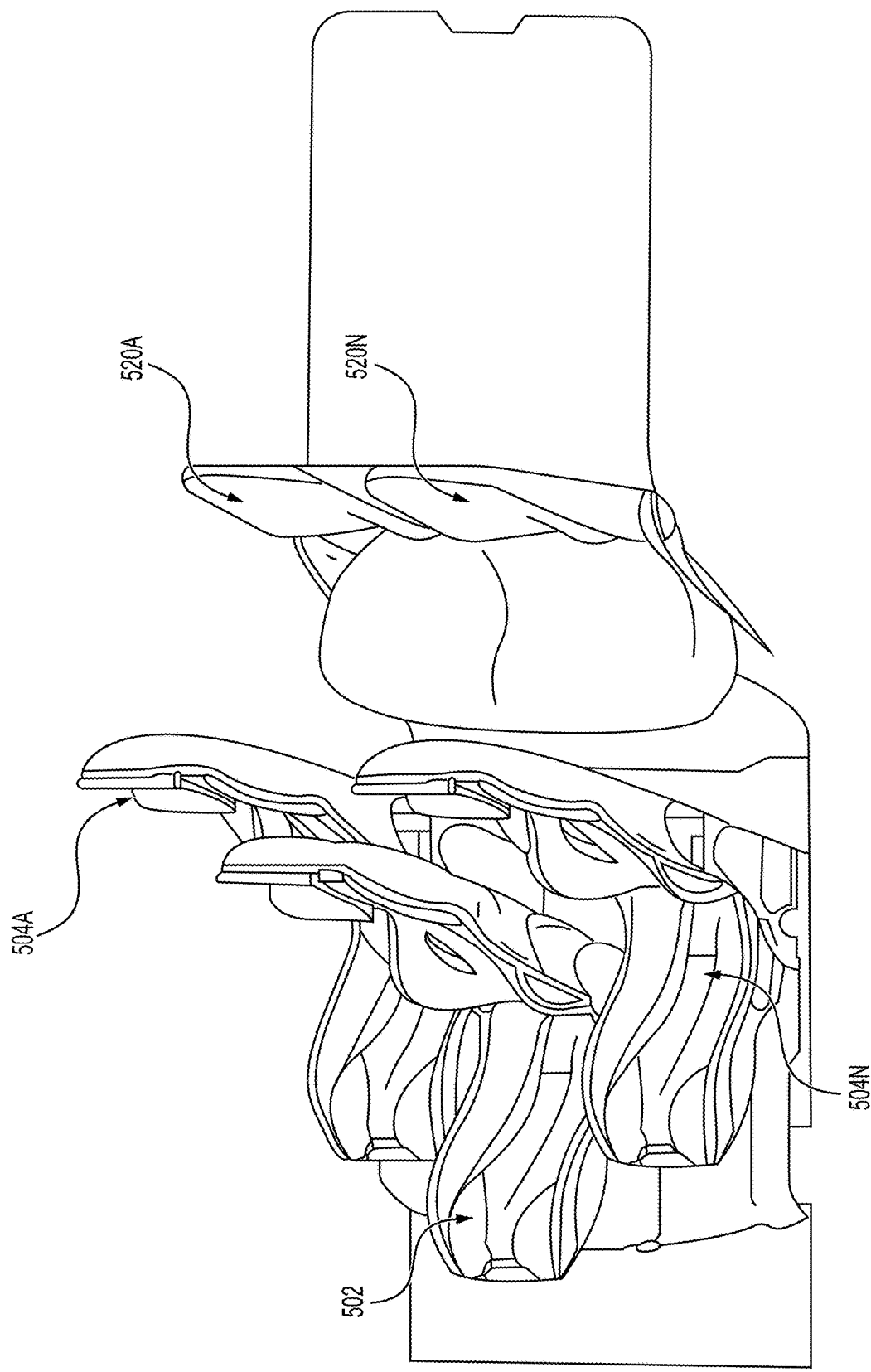
Figure 5M:
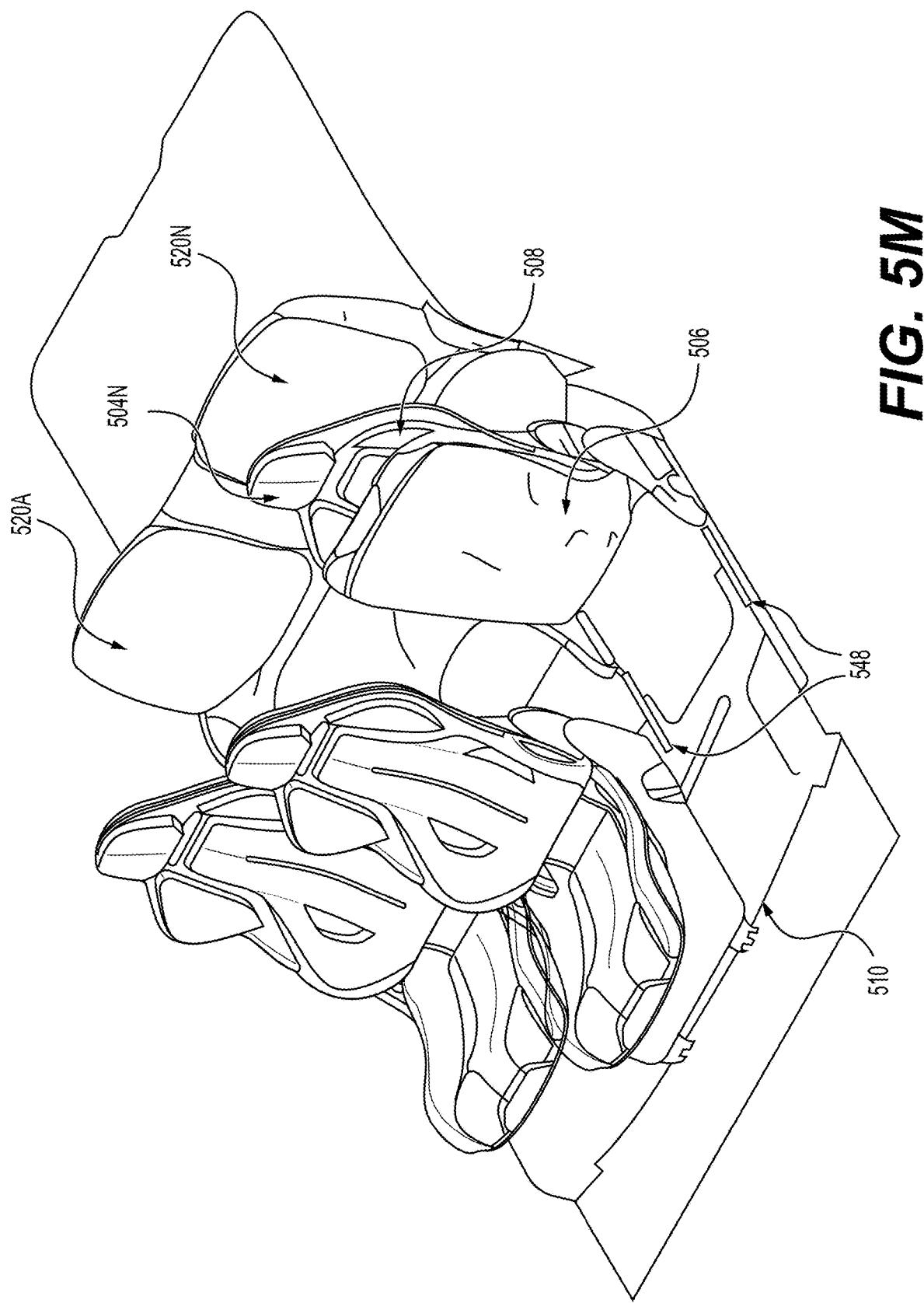
Figure 5N:
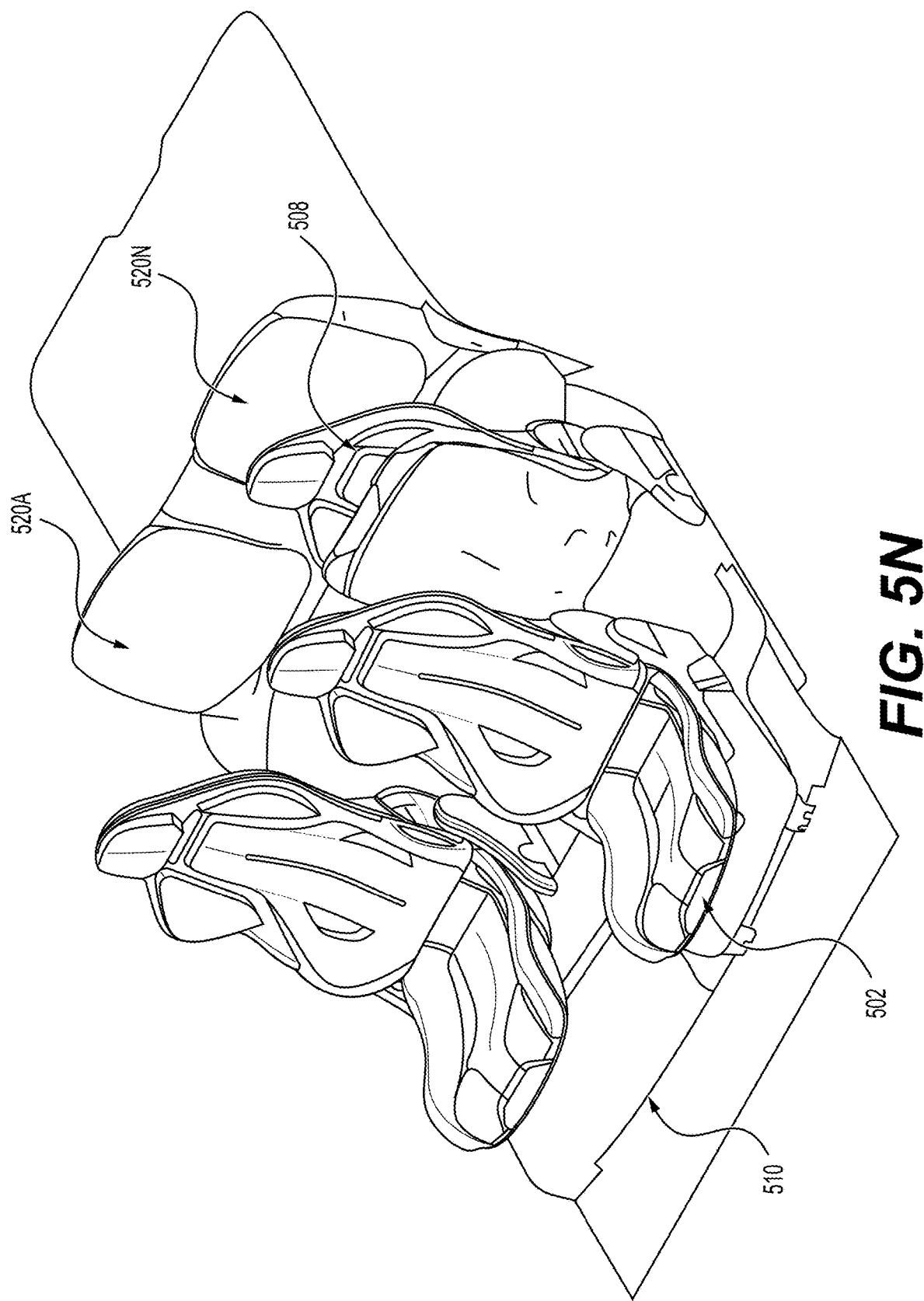
Figure 50:
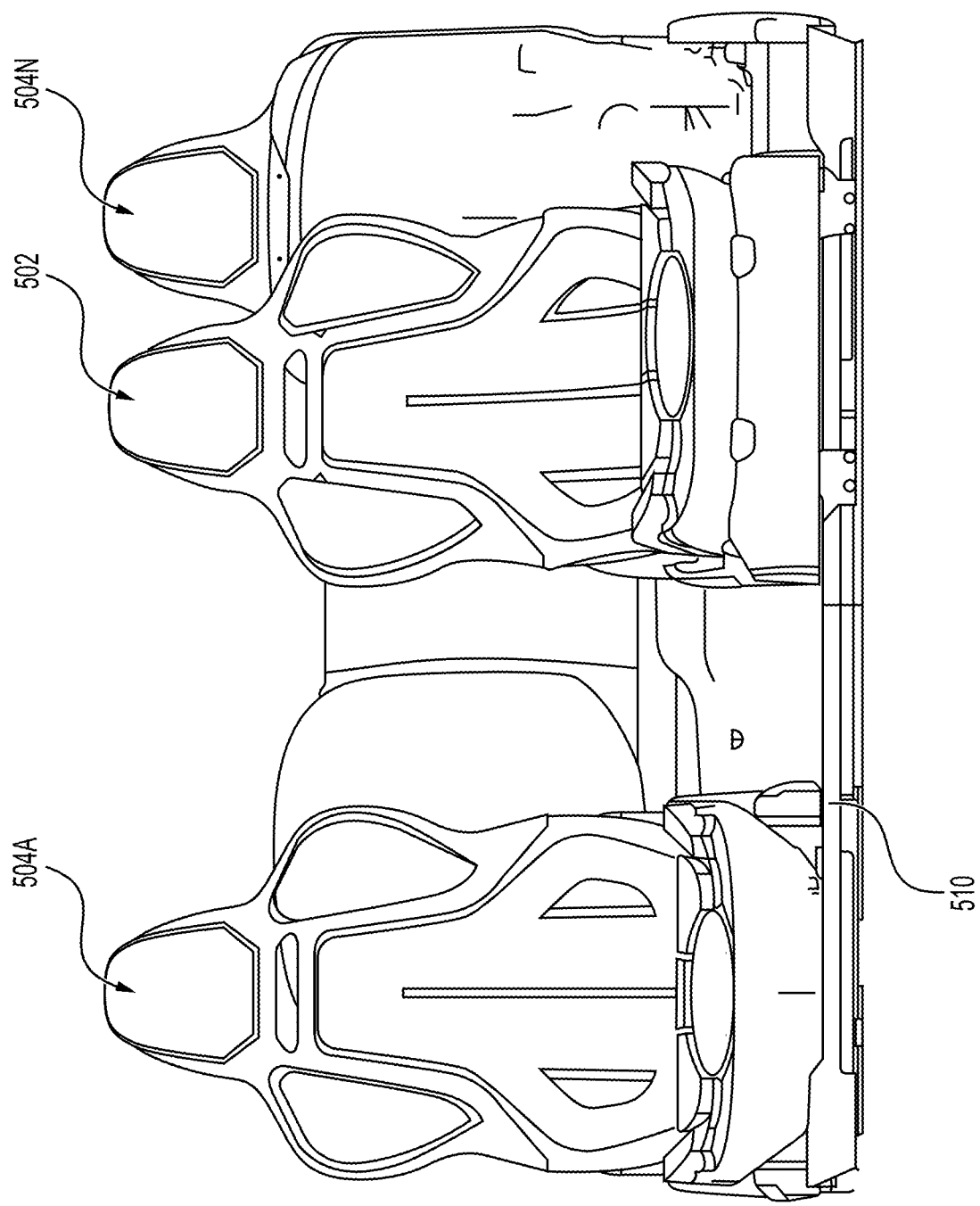
Figure 5P:
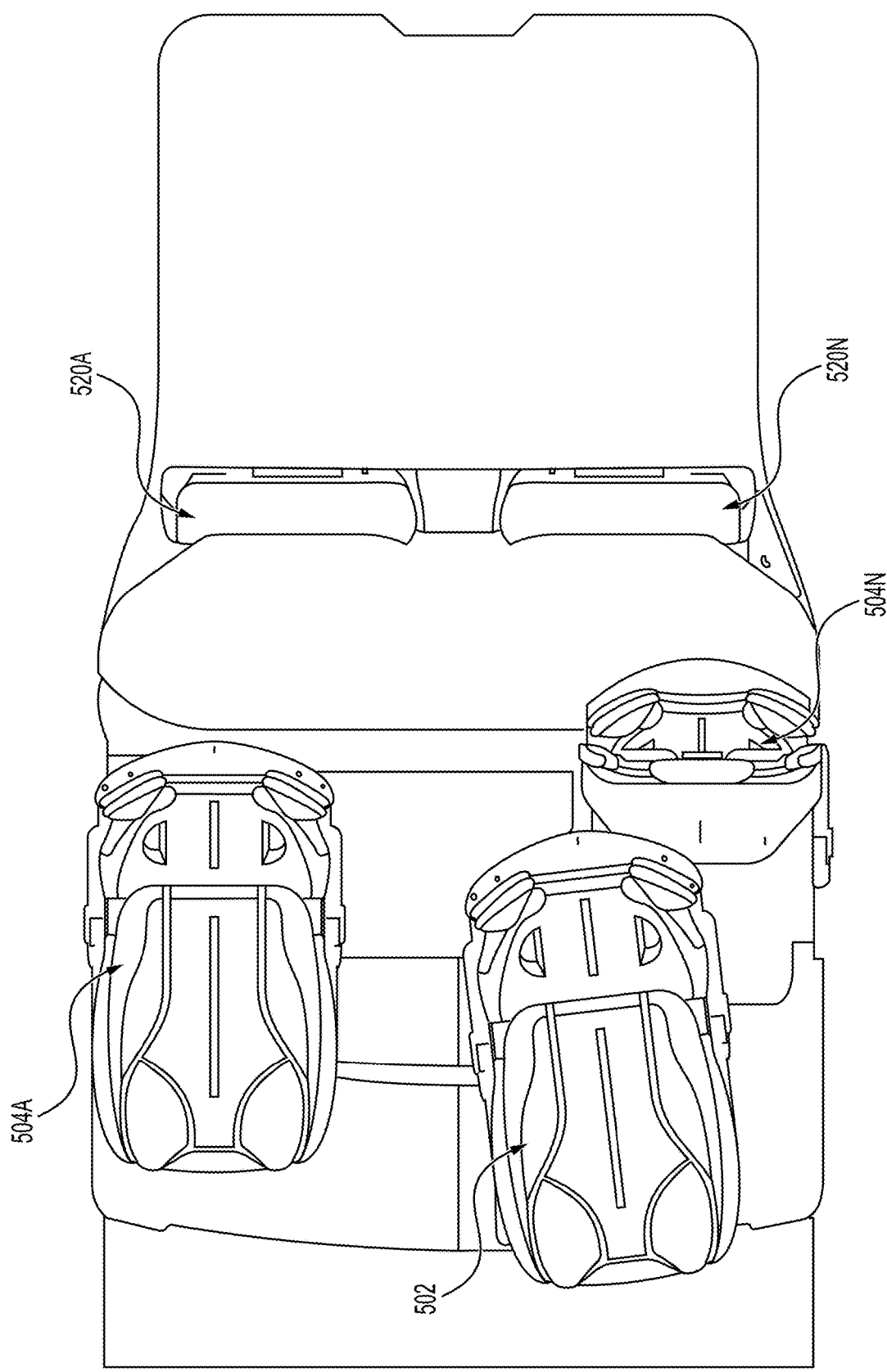
Figure 5Q:
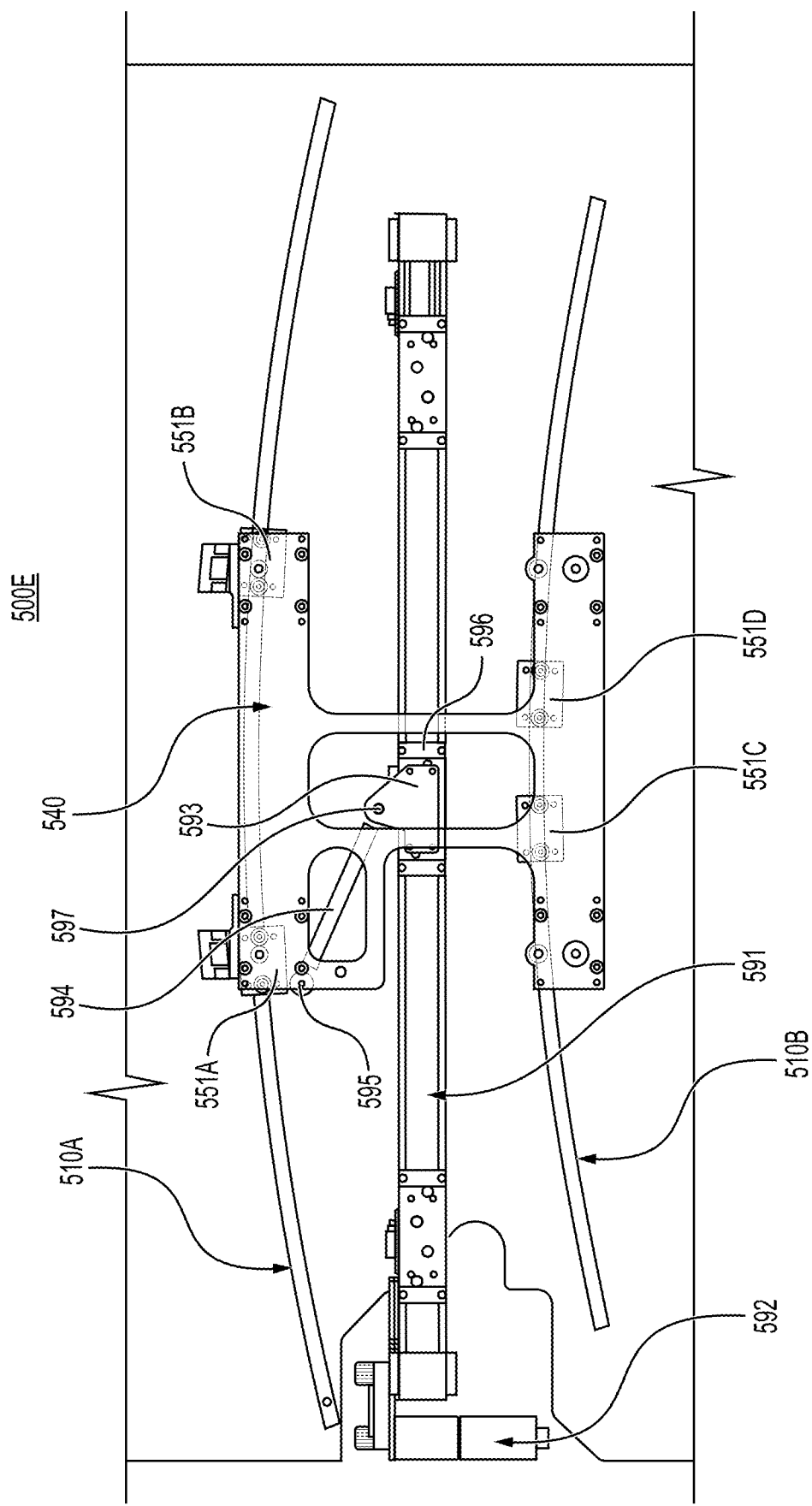

FIGS. 5A-5Q illustrate an exemplary automotive seat movement process in an interior of a vehicle according to various embodiments of the present disclosure. With reference to FIGS. 5A-5B, in various embodiments, a seat movement process may be configured to assist with the movement of at least one seat assembly. In various embodiments, at least one seat assembly may comprise a seat movement system. The seat movement system may be configured to at least partially move at least one seat assembly from a driving configuration 500A, 500C, 500E, to entering/exiting configuration 500B, 500D, such that the at least one seat assembly is disposed closer to the exterior of the vehicle. The seat movement system may comprise at least one actuator 546, a first movement arm 542A, and/or one or more additional movement arms (e.g., a second movement arm) 544A. In various embodiments, the first movement arm 542A and/or the one or more additional movement arms 544A may be in a four-bar linkage configuration to assist with the movement of the at least one seat assembly. The first movement arm 542A and/or the one or more additional movement arm 544A may be connected to at least one of an actuator 546 and/or at least one seat assembly base plate 540. Actuator 546 may be fixed to the floor of the vehicle 501 (FIG. 5E) at rotatable joint 547.

In various embodiments, the first movement arm 542A and/or the one or more additional movement arm 544A may be moveable upon an actuation of the at least one actuator 546. The first movement arm 542A may be fixed to the seat assembly base plate 540 at rotatable joint 541A, and may be fixed to the floor of the vehicle at rotatable joint 541C. The second movement arm 544A may be fixed to the seat assembly base plate 540 at rotatable joint 541B, and may be fixed to the floor of the vehicle or the actuator 546 at rotatable joint 541D. In some embodiments, the first movement arm 542A may have an additional section 545A attached to the actuator 546 at moveable joint 541E. In some embodiments, additional section 545A may be separate part from movement arm 542A. The first movement arm 542A and/or the one or more additional movement arm 544A may be positioned in a first position (e.g., starting position, driving position, etc.), such that the base plate 540 of at least one seat assembly is positioned in front of the driving controls (e.g., gas pedal, brake, clutch, steering wheel, gear shifter, etc.). The seat may also be aligned or docked in the first position by docking components 550 (further described with reference to FIG. 5E-5J). In various embodiments, the at least one actuator 546 may receive at least one initiation signal (e.g., a request) to begin a movement process. The at least one actuator 546 may be configured to output a predetermined amount of force to move the at least one seat assembly and/or occupant in the at least one seat assembly from the first position towards the second position (depicted in FIG. 5B). The actuator may have multiple standard positions (e.g., a first extended position when the seat assembly is in the center, as shown in FIG. 5A, a collapsed position when the seat assembly is to the left, as shown in FIG. 5B, and a second extended position when the seat assembly is to the right, not shown). In various embodiments, the seat movement system may further comprise at least one sensor (not explicitly shown), such that the at least one sensor (e.g., a seat occupancy sensor which may categorically classify a weight or mass upon it) may provide data to the seat control system 310. The seat control system 310 may then utilize the seat occupancy data to adjust the force output based on the occupant size, weight, or mass, and transmit the associate force required to the actuator 546. The actuator 546 may adjust a power or speed setting in response to a signal to modify or a modification of a force value. This may allow a center seat assembly to be moved in a consistent manner despite varying loads (e.g., the occupant) on the seat. In various embodiments, the seat movement system may further comprise one or more additional sensors for safety purposes (e.g., pressure sensor, pinch detector sensor, seat position sensor, etc.). The output of these sensors may be received by seat control system 310, which may then interrupt or stop the movement of the seat.

In various embodiments, the base plate 540 of the at least one seat assembly may further comprise at least one moving support attached at the bottom of the base plate 540 (not explicitly shown). The at least one moving support may assist with moving the at least one seat assembly from the first position to the second position by supporting the front of the base plate 540 and the seat assembly. The at least one moving support may be one or more of: a ball, a spherical object, a roller, a wheel, a slider, or a combination thereof. I In some embodiments, wear plates may be installed on the floor of the vehicle.

Upon receiving the at least one initiation signal, the at least one actuator 546 with the assistance from the first movement arm 542A, the one or more additional movement arm 544A, and/or the at least one movement portion of the base plate may at least partially move the at least one seat assembly laterally from the first position towards the second position. The at least one actuator may move the at least one seat assembly from the first position to the second position in a predetermined amount of time (e.g., 1 s, 2 s, 5 s, 10 s, etc.). In other embodiments, the at least one actuator 546 may be configured to adjust the movement speed of the at least one seat assembly based on data received from the at least one sensor. The at least one seat control system 510 may be further configured to receive at least one return signal, and an instruction signal may be transmitted to the actuator, such that the at least one actuator may move the at least one seat assembly in a reverse process (e.g., from the second position to the first position).

Upon receiving the at least one initiation signal, the seat control system 310 may signal the at least one actuator 546 to move (e.g., shorten an actuation arm), thereby causing the first movement arm 542A and/or the one or more additional movement arm 544A to move at least partially. Upon completion of the movement (to the left), as shown in FIG. 5B, movement arm 542A rotates to be as shown by movement arm 542B with section 545B. Similarly, movement arm 544A rotates to be as shown by movement arm 544B in FIG. 5B. This causes a translation of base plate 540 to the left, allowing for the user to easily exit the vehicle. Accordingly, the opposite movement to the right (not shown) is possible by extending the arm of the actuator further outward (e.g., beyond what is shown in FIG. 5A). In various embodiments, the first movement arm 542A may comprise at least one axis of rotation and/or the one or more additional movement arm 544A may comprise at least one axis of rotation. In various embodiments, the at least one axis of rotation of the first movement arm 542A may be configured to be separate than the at least one axis of rotation of the one or more additional movement arms 544A. As depicted in FIG. 5B, in various embodiments, the first movement arm 542A and/or the one or more additional movement arm 544A may comprise two or more axes of rotation, such that the first movement arm in the second position 542B comprises two or more different axes of rotation than the one or more additional movement arm in the second position 544B.

With further references to FIGS. 5A-5B, in various embodiments, the movement system may comprise at least one vertical rail portion 548A, 548B, 548C, and 548D (collectively "548"). In various embodiments, the at least one vertical rail portion of the rail system may be configured to assist with the movement of the one or more additional seat assemblies disposed on a first side or a second side of the first seat assembly (e.g., driver's seat). In various embodiments, upon receiving the at least one initiation signal, the one or more actuators or seat motors may be further configured to move at least one additional seat assembly disposed on either side of the first seat assembly at least partially backwards, such that the at least one additional seat assembly moves along at least a portion of the vertical rail portion 548. At least one motor connected to the at least one additional seat assembly may move at least one additional seat assembly disposed on either side of the first seat assembly at least partially backwards, such that the at least one additional seat assembly moves along at least a portion of the vertical rail portion 548. The base plate 540 and movement arms 542B and 544B may be configured to fit overtop of the rails for the side seats 548. In some embodiments, each side seat assembly may utilize two vertical rail portions (e.g., the left side seat assembly may ride on vertical rail portions 548A, 548B and the right side seat assembly may ride on vertical rail portions 548C, and 548D). One or more side seat assemblies may be configured to move forward and backward as guided by rails 548 using one or more seat motors or actuators. The one or more side seat assemblies may have a forward position and a rear position. The one or more seat motors or actuators may be capable of moving the one or more side seat assemblies between the positions.

In various embodiments, the seat movements assembly may further comprise a manual actuator (not explicitly shown), such that the occupant may manually move the at least one seat assembly. The at least one manual actuator may be one or more of: a gas spring, a slider, a roller, or a combination thereof.

An interior of a vehicle may comprise a front row and/or one or more additional rows of seat assemblies. In various embodiments, the front row may comprise a first seat assembly 502 and/or at least one additional seat assembly 504A, 504N (collectively "504"). A first additional seat assembly 504A may positioned on a first side of the first seat assembly 502 and/or at least one additional seat assembly 504N may be positioned on a second side of the first seat assembly 502. In various embodiments, the at least one additional row may comprise a first, second row seat assembly 520A and/or at least one additional second row seat assembly 520N. In various embodiments, the interior may further comprise a rail system 510 positioned within the floor of the vehicle. The rail system 510 may be configured to assist with the movement of the first seat assembly 502 and/or the at least one additional seat assembly 504 in one or more direction (e.g., left, right, forwards, backwards, diagonally, etc.), respectively. The first seat assembly 502 and/or the at least one seat assembly 504 may move along at least a portion of the rail system 510. The first seat assembly 502 and/or the at least one seat assembly 504 may move from a first position to at least one additional position due to actuation of one or more motors. In various embodiments, the rail system 510 may comprise an arch portion configured to assist with the movement of the first seat assembly 502 at least partially lateral relative to a center line 530 of the vehicle.

As depicted in FIGS. 5A-5B, the first seat assembly 502 and/or the at least one additional seat assembly 504A, 504N may be positioned in a first position (e.g., initial position). In various embodiments, the first position may be an active driving position (e.g., user is in the driver's seat). As depicted in FIG. 5C, at least one additional seat assembly 504N may be configured to move from a first position towards a second position (e.g., exit/enter position), such that the at least one additional seat assembly may move along at least one portion of the rail system 510. The at least one additional seat assembly 504N may move at least partially backwards, relative to the front of the vehicle. The second position of the at least one additional seat assembly may allow the first seat assembly to at least partially pass in front of the at least one additional seat assembly 504N.

With reference to FIGS. 5C-5D, in various embodiments, a seat movement process may be configured to assist with the movement of at least one seat assembly. At least one seat assembly may comprise a seat movement system. In one or more embodiments, the seat movement system may be configured to at least partially move at least one seat assembly from a driving configuration 500C to entering/exiting configuration 500D, such that the at least one seat assembly is disposed closer to the exterior of the vehicle. The seat movement system may comprise at least one actuator 546 and a movement portion connected to the at least one actuator. The at least one movement portion may comprise a slide mechanism. The at least one movement portion may be connected to at least one of an actuator 546 and/or at least one seat assembly base plate. With reference to FIG. 5C, a seat base 540 may be configured with one or more guides 551A, 551B (e.g., riders) that are configured to travel along one or more tracks 510. The tracks 510 may be connected to the floor of the vehicle. The seat base 540 may be connected to an actuator 546 using a bell crank and slider mechanism. Accordingly, actuator 546 may be connected to a sliding member 552A at a rotatable joint 553. The sliding member 552A may have a slot 555 configured to be connected to or in selected communication with the seat base 540 at joint 554. The sliding member 552A may have an offset from the slot 555 to the rotatable joint 553. The offset may be related to the stroke the actuator 546. In some embodiments, the actuator 546 may have a stroke of 150 mm or 6 inches. The actuator 546 may be able to complete an actuation in as little as two seconds, which allows for quick movement of the seat assembly.

In various embodiments, the seat movement portion may further comprise an arch rail portion 510 configured to assist with the movement of the at least one seat assembly. The at least one seat assembly may move along a portion of the arch rail portion from a first position to a second position. The at least one seat assembly may move at least partially laterally from the first position towards the second position.

FIG. 5D may depict the seat base 540 in a second position (e.g., an entrance or exit position). Accordingly, the one or more guides 551A, 551B may travel along the tracks to the left. The sliding member 552A may move (now shown as sliding member 555B). Joint 554 may attach the sliding member 552B at the seat base 540 at a far end of slot 555. Actuator 546 may pivot or angle slightly (against rotatable joint 547). The actuator 546 may be in a collapsed position when the seat base 540 is in a left position in the vehicle, while the actuator 546 may be in a middle position when the seat base 540 is in a center position. Furthermore, the actuator 546 may be in an extended position when the seat base 540 is in a right position in the vehicle.

With further references to FIGS. 5C-5D, in various embodiments, the movement system may comprise at least one vertical rail portion 548A, 548B, 548C, and 548D (collectively "548"). The at least one vertical rail portion of the rail system may be configured to assist with the movement of the one or more additional seat assemblies disposed on a first side or a second side of the first seat assembly (e.g., driver's seat). Upon receiving the at least one initiation signal, a seat motor or actuator may be further configured to move at least one additional seat assembly disposed on either side of the first seat assembly at least partially backwards, such that the at least one additional seat assembly moves along at least a portion of the vertical rail portion 548. At least one motor connected to the at least one additional seat assembly may move at least one additional seat assembly disposed on either side of the first seat assembly at least partially backwards, such that the at least one additional seat assembly moves along at least a portion of the vertical rail portion 548.

In various embodiments, the base plate 540 of the movement portion may further comprise one or more of: a ball, a spherical object, a roller, a wheel, a slider, or a combination thereof disposed on the bottom of the base portion 540 of the at least one seat assembly. Upon receiving the at least one initiation signal, the at least one actuator 546 with the assistance from the movement portion and/or the at least one movement portion on the base plate may at least partially move the at least one seat assembly laterally from the first position towards the second position. The at least one actuator may move the at least one seat assembly from the first position to the second position in a predetermined amount of time (e.g., 1 s, 2 s, 5 s, 10 s, etc.). In other embodiments, the at least one actuator 546 may be configured to adjust the movement speed of the at least one seat assembly based on data received from the at least one sensor. In various embodiments, the at least one actuator 546 may be further configured to receive at least one return signal, such that the at least one actuator may move the at least one seat assembly in a reverse process (e.g., from the second position to the first position).

FIGS. 5E-5J illustrate a docking system and portions thereof in accordance with various embodiments of the present disclosure. The docking system may be necessary to secure the seat to the floor when the seat is in the driving position. The docking system may be important so that the center seat maintains a necessary stable connection to the floor. The seat having a stable connection to the floor of the vehicle (via the docking system) may be important for the seat to be able to maintain certain safety requirements (e.g., regarding how secure vehicle seats must be in order to survive vehicle accidents). Therefore, the docking system may allow the center seat to move between multiple positions (when unlocked), but also be securely fastened when in the driving (center) position (and locked). Multiple types of locks may be used for the docking system. FIG. 5E illustrates an overview of the docking system showing the first locking mechanism 564A mounted on the seat base plate 540 and additional locking mechanism 564B (e.g., second locking mechanism) mounted to the vehicle floor 501. FIG. 5F illustrates the first locking mechanism 564A in a locked position. FIG. 5G illustrates the first locking mechanism 564A in an unlocked position. FIG. 5H illustrates an alternative overview of the docking system. FIG. 5I illustrates the additional locking mechanism 564B in a locked position. FIG. 5J illustrates the additional locking mechanism 564B in a unlocked position.

In various embodiments, a docking system 560 may comprise at least one actuator 562A, 562N, a first locking mechanism 564A, and/or at least one additional locking mechanism 564B. The first locking mechanism 564A (e.g., a rotating axle or rod with one or more hooks) may be connected to a first actuator 562A and/or the at least one additional locking mechanism 564B (e.g. a member with one or more locking pins) may be connected to at least one additional actuator 562B. The first locking mechanism 564A and/or the at least one additional locking mechanism 564B may be connected to the first actuator 562A. The first actuator 562A, the at least one additional actuator 562B, the first locking mechanism 564A, and/or the at least one additional locking mechanism 564B may be secured to at least a portion of base plate 540 of the seat or floor 501 of the vehicle.

In various embodiments, the first locking mechanism 564A may be disposed at a first portion of the seat base plate 540 and the at least one additional locking mechanism 564B may be disposed at or near a second portion of the seat base plate 540. The first locking mechanism 564A may be disposed linearly opposite to the at least one additional locking mechanism 564B. The first locking mechanism 564A and/or the at least one additional locking mechanism 564B may comprise at least one of: pins, hooks, hooks with latches, connection points, connection bars, anchor points, or a combination thereof.

In various embodiments, the first locking mechanism 564A may comprise a first receiving element 570A and/or a second receiving element 570B, which may be mounted to vehicle floor 501. The first locking mechanism may further comprise a first connecting element 568A and/or a second connecting element 568B. The first connecting element 568A may at least partially secure to the first receiving element 570A and/or the second connecting element 568B may at least partially secure to the second receiving element 570B, such that the first locking mechanism secures at least a portion of the at least one seat assembly in place. Accordingly, as actuator 562A moves, it may cause an axle or rod to rotate. Connecting elements 568A, 568B attached to the axle or rod may then also rotate. Therefore, by moving the actuator 562A, the connecting elements 568A, 568B may selectively engage with the first and second receiving elements 570A, 570B, thereby locking the seat in place.

The at least one additional locking mechanism 564N may comprise a first receiving element 574A (e.g., pin receiver) and/or a second receiving element 574B (e.g., pin receiver). The at least one additional locking mechanism 564B may further comprise a first connecting element 572A (e.g., a guide pin) and/or a second connecting element 572B (e.g., a guide pin). The first connecting element 572A may at least partially secure the first receiving element 574A to a guide block mounted to the vehicle floor. The second connecting element 572B may at least partially secure the second receiving element 574B to a guide block 573B (FIG. 5I)

mounted to the vehicle floor, such that the additional locking mechanism secures at least a portion of the at least one seat assembly in place. The first locking mechanism 564A and/or the at least one additional locking mechanism 564B may comprise one or more additional receiving element and/or one or more additional connecting element (not explicitly shown). Accordingly, as actuator 562B moves, it may move an associated member forward or backwards. One or more guide pins may be attached to the associated member and positioned within guide blocks attached to the vehicle floor. The one or more guide pins may extend into first and second connecting elements 572A, 572B (e.g., a latch pin receptor), which may be attached to, or part of the base plate 540. Therefore, by moving the actuator 564B, the guide pins may be in selective communication with the latch pin receptors and the guide block, thereby restricting the movement of the seat.

In various embodiments, the first connecting element and the second connecting element of the first locking mechanism and/or the at least one additional locking mechanism may be configured to at least partially translate from a locked position 580A to an unlocked position 580B. In various embodiments, the first actuator 562A and/or the at least one additional actuator 562B may at least partially assist with translating the first connecting element and the second connecting element of the first locking mechanism and/or the at least one additional locking mechanism from the locked position to the unlock position or vice-versa. In various embodiments, the first actuator 562A and/or the at least one additional actuator 562B may translate the first connecting element and the second connecting element of the first locking mechanism and/or the at least one additional locking mechanism upon receiving at least one initiation signal for a seat movement process. In various embodiments, the first actuator 562A and/or the at least one additional actuator 562B may be configured to operate simultaneously. In various embodiments, the first actuator 562A and/or the at least one additional actuator 562B may be configured to operate individually. In various embodiments, the docking system may further comprise at least one manual actuator (not explicitly shown) configured to assist with locking and unlocking the at least one seat assembly. In various embodiments, the occupant may manually actuate the at least one manual actuator to lock or unlock the first locking mechanism and/or the at least one additional locking mechanism.

With reference to FIGS. 5K-5P, in various embodiments, simultaneously and/or individually, a cushion portion 506 of the at least one additional seat assembly 504N may move at least partially toward the back portion 508 (e.g., fold at a hinge) of the at least one additional seat assembly 504N. In various embodiments, the cushion portion 506 of the at least one additional seat assembly 504N may move at least partially toward the back portion 508 of the at least one additional seat assembly 504N while the seat assembly moves from the first position towards the second position. In other embodiments, the cushion portion 506 of the at least one additional seat assembly 504N may move at least partially toward the back portion 508 of the at least one additional seat assembly 504N once the seat assembly moves from the first position towards the second position. In various embodiments, the cushion portion 506 may be moved automatically and/or manually. The one or more side seat assemblies may include one or more hinges between the back portion 508 and the cushion portion 506 (e.g., seat portion). The one or more side seat assemblies may include one or more seat motors or one or more actuators for manipulating the position of the cushion portion 506 relative to the back portion 508. The one or more side seat assemblies may be capable of being in an open (occupied) position and a closed (folded) position. The one or more seat motors and/or one or more actuators may receive signals to alternate the one or more side seat assemblies between the positions.

In some embodiments, there may be a concerted motion between the movements of a center seat assembly and one or more side seat assemblies. Accordingly, in order to allow a driver in the center seat to easily exit, upon the receipt of a signal, a process may begin to move the center seat from a driving (center) position to an access position near a door. First, a side seat may transition from the open position to the folded position (FIG. 5M). Second, the side seat may move rearwardly (FIG. 5M). Third, the center seat may undock and move along its rails from the driving position to the access position in front of the side seat (FIGS. 5N, 5O, 5P). The center seat may be capable of moving to either side of the vehicle, and either side seat may be capable of folding and moving rearwardly.

To return the center seat from the access position near a door to the center driving position, a reverse process may be used. First, the center seat may move along its rails from the access position to the driving position, and dock. Second, the side seat may move forward. Third, the side seat may transition to the open position from the folded position. In some embodiments, these actions may take place in a specific order as described. In some embodiments, some actions may occur simultaneously.

As depicted FIG. 5D, in various embodiments, the first seat assembly 502 may move at least partially lateral (e.g., left or right) along at least one portion of the rail system 510. At least one portion of the rail system may comprise an arc rail portion. In various embodiments, the arc rail portion may move the first seat assembly 502 from its first position towards its second position, such that the second position is disposed closer to the exterior of a vehicle relative to a centerline (e.g., 530, depicted in FIG. 5A). In various embodiments, the movement of the first seat assembly may make it easier for the driver to enter and/or exit the interior of the vehicle. As depicted in FIGS. 5D-5E, in various embodiments the first seat assembly 502 may move along the arc portion of the rail system 510 towards a second position (e.g., exit/entrance position).

In various embodiments, the first seat assembly 502 may be further programmed to at least partially rotate inwardly and/or outwardly while in the second position. In various embodiments, the first seat assembly 502 may be further programmed to at least partially rotate inwardly and/or outwardly while moving towards and/or away from the second position. The at least partially rotation of the first seat assembly may further assist the driver with entering and/or exiting the vehicle. In various embodiments, the first seat assembly may rotate, such that, the first seat assembly is up to perpendicular or nearly perpendicular to the longitudinal axis of the vehicle (e.g., the first seat assembly would be parallel or nearly parallel to the longitudinal axis of the vehicle while driving). In other embodiments, the first seat assembly may be configured to be positioned at a 45-degree angle to the longitudinal axis of the vehicle when the user is entering or exiting to the left or right of the vehicle. In other embodiments, the amount of rotation by the first seat assembly may be configurable for a range of different angles. In some embodiments, the first seat assembly may be capable of rotating a full circle (360 degrees). In various embodiments, the first seat assembly may be at least partially rotated automatically and/or manually.

FIG. 5Q illustrates an alternative embodiment 500E for a utilizing a linear actuator to move a seat from a center driving position (shown) to an entrance or exit position. As shown in FIG. 5Q, linear actuator 591 may be positioned largely across the width of the vehicle. The linear actuator 591 may include a motor 592 that moves a carriage 596 from one end of the linear actuator 591 to the other. The linear actuator 591 may include stops at either end to prevent excess movement of the carriage 596. The carriage 596 may include an attachment bracket 593 with a first rotatable joint 597. The first rotatable joint 597 may be used to attach to bar 594. Bar 594 may attach to base plate 540 of a seat assembly at second rotatable joint 595. The bottom of base plate 540 may include one or more guides 551A, 551B, 551C, 551D. The guides may be configured to ride in one or more tracks 510A, 510B connected to the vehicle floor. Accordingly, as the carriage 596 of linear actuator 591 is moves between left and right positions, the base plate 540 of the seat assembly may travel in a path dictated by the one or more tracks 510A, 510B according to the one or more guides 551A, 551B, 551C, 551D. In some embodiments, two tracks may be used with a first track 510A towards the front of the vehicle, and a rear track 510B towards the rear of the vehicle. Guides 551A and 551B may be configured to ride in the first track 510A (e.g., the front track). Guides 551C and 551D may be configured to ride in the second track 510B (e.g., the rear track). The first track 510A and the second track 510B may be configured in a parallel arc configuration such that the seat base 540 of the seat assembly is angled outwardly when at the in the non-driving position. Tracks 510A, 510B and guides 551A, 551B, 551C, 551D may be otherwise similar to track 510 and guides 551A, 551 described with respect to FIG. 5C. The process of moving the seat from a driving position to an entrance/exit position for embodiment 500E may be otherwise similar as described for other embodiments.

Figure 6A:
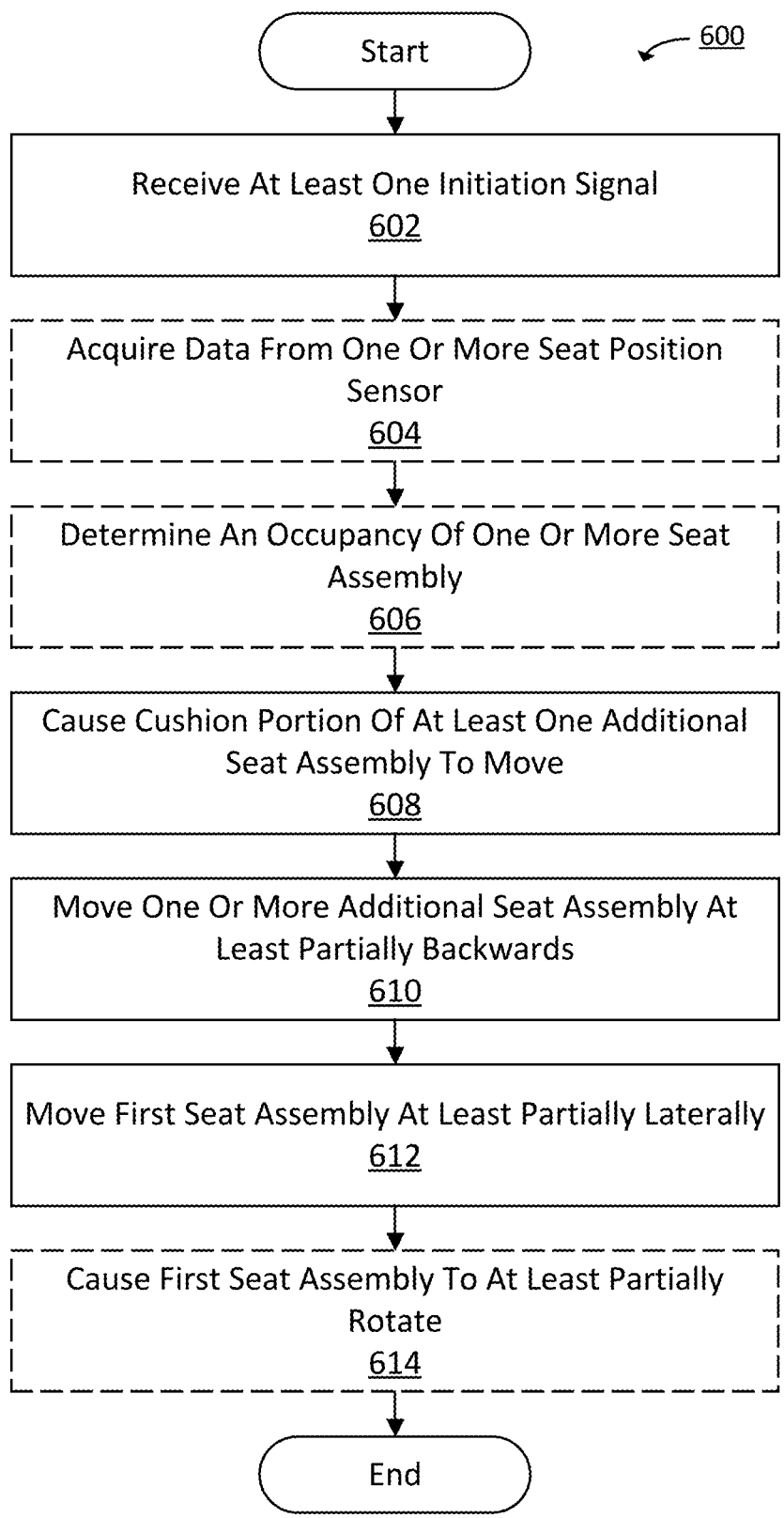
FIGS. 6A-6B are a flow diagrams of how an example system may be used to move seats according to an example implementation of the disclosed technology.

FIG. 6A illustrates an exemplary flow diagram illustrating a method 600 for moving a seat assembly in accordance with various embodiments of the present disclosure. The steps of method 600 may be performed by one or more components of the system (e.g., seat control system 310, computing system 390, using seat motor controller 410 with seat motors 450 and/or actuators), as described in more detail with respect to FIGS. 3A-5F. The seat control system 310 and/or the computing system 390 may begin method 600 as a result of receiving a signal that a driver would like to enter or exit the center front seat of the vehicle. This may be received by the body control module 402 (e.g., from a key fob unlocking the vehicle, or from a phone).

Method 600 may also begin with the seat control system and/or the computing device receiving at least one signal (e.g., an initiation signal for a seat assembly movement process) from the body control module. The at least one initiation signal may be transmitted when the vehicle is parked, shut off, and/or the driver is ready to exit, block 602. In various embodiments, the at least one initiation signal may be transmitted from a button on the control column, infotainment system, or some other part of the vehicle interior. In other embodiments, the action may also be automatic once the vehicle is shut off.

In optional block 604, the seat control system and/or the computing system may acquire data from one or more seat position sensors. In various embodiments, the one or more seat position sensors may comprise one or more of: a pressure sensor, a thermal sensor, a motion sensor, a location sensor, or a combination thereof. In various embodiments, the data received from the one or more seat position sensors may comprise information regarding one or more of a location of the first seat assembly, the location of at least one additional seat assembly, the position of one or more cushion portions, or a combination thereof. In various embodiments, the data may further comprise information regarding occupant in the vehicle.

In optional block 606, the seat control system and/or the computing system may optionally determine the occupancy of the first seat assembly and/or at least one additional seat assembly based at least in part on the occupancy data received from one or more seat position sensors. In various embodiments, the occupancy data may be used to determine which additional seat assembly may be moved, such that the first seat assembly may move towards an exit/enter position.

In block 608, the seat control system and/or the computing system may cause at least a portion of the cushion portion of at least one additional seat assembly to move towards the back portion. In various embodiments, the seat control system and/or the computing system may move the cushion portion of the at least one additional seat assembly using one or more seat motors. In various embodiments, the seat control system and/or the computing system may move the cushion portion of the at least one additional seat assembly, such that a distalmost edge of the cushion portion may contact at least a portion of the back portion. In one or more embodiments, the seat control system and/or the computing system may output a signal to a seat motor controller or one or more seat motors to cause the one or more additional seat assembly to move.

In block 610, the seat control system and/or the computing system may cause at least one additional seat assembly to move from a first position towards a second position. In various embodiments, the at least one additional seat assembly may move at least partially rearward from an initial position to an exit position. In various embodiments, the seat control system may move the at least one additional seat assembly along one or more rail portions of the rail system using one or more seat motors. In some embodiments, the seat control system may further output at least one signal to a seat motor controller and/or one or more seat motors to cause the at least one additional seat assembly to move. In some embodiments, the actions of block 610 may occur simultaneously with the actions of block 608 and allows for more room at the front of the vehicle. In some embodiments, the system may further check that seats in the second row are unoccupied before the seat begins to move rearward.

In block 612, the seat control system and/or the computing system may move the first seat assembly along a portion of the rail system, such that the first seat assembly may move at least partially lateral from a first position towards a second position. In various embodiments, the second position may be disposed towards an exterior of the vehicle relative to a centerline of the vehicle. In various embodiments, the seat control system and/or the computing system may use one or more seat motors and/or rail motors to move the seat first seat assembly along the arc portion of the rail system. In various embodiments, the second position may be a position in the vehicle in which it was formerly occupied by one or more additional seat assembly.

In optional block 614, the seat control system and/or the computing system may optionally cause the first seat assembly to at least partially rotate outwardly to either the left side or right side of the vehicle to aid the user in exiting the vehicle. In various embodiments, the seat control system and/or the computing system may output at least one signal to a seat motor controller and/or one or more seat motors to cause the first seat assembly to at least partially rotate towards an exterior of a vehicle.

Throughout method 600, system 400 may utilize the position sensors 460 in order to determine the location of components of seat assemblies and occupants of the vehicle to prevent collisions. In various embodiments, at least one position sensors 460 may be used to stop the movement of one or more components if another component is not able to fully retract.

Figure 6B:
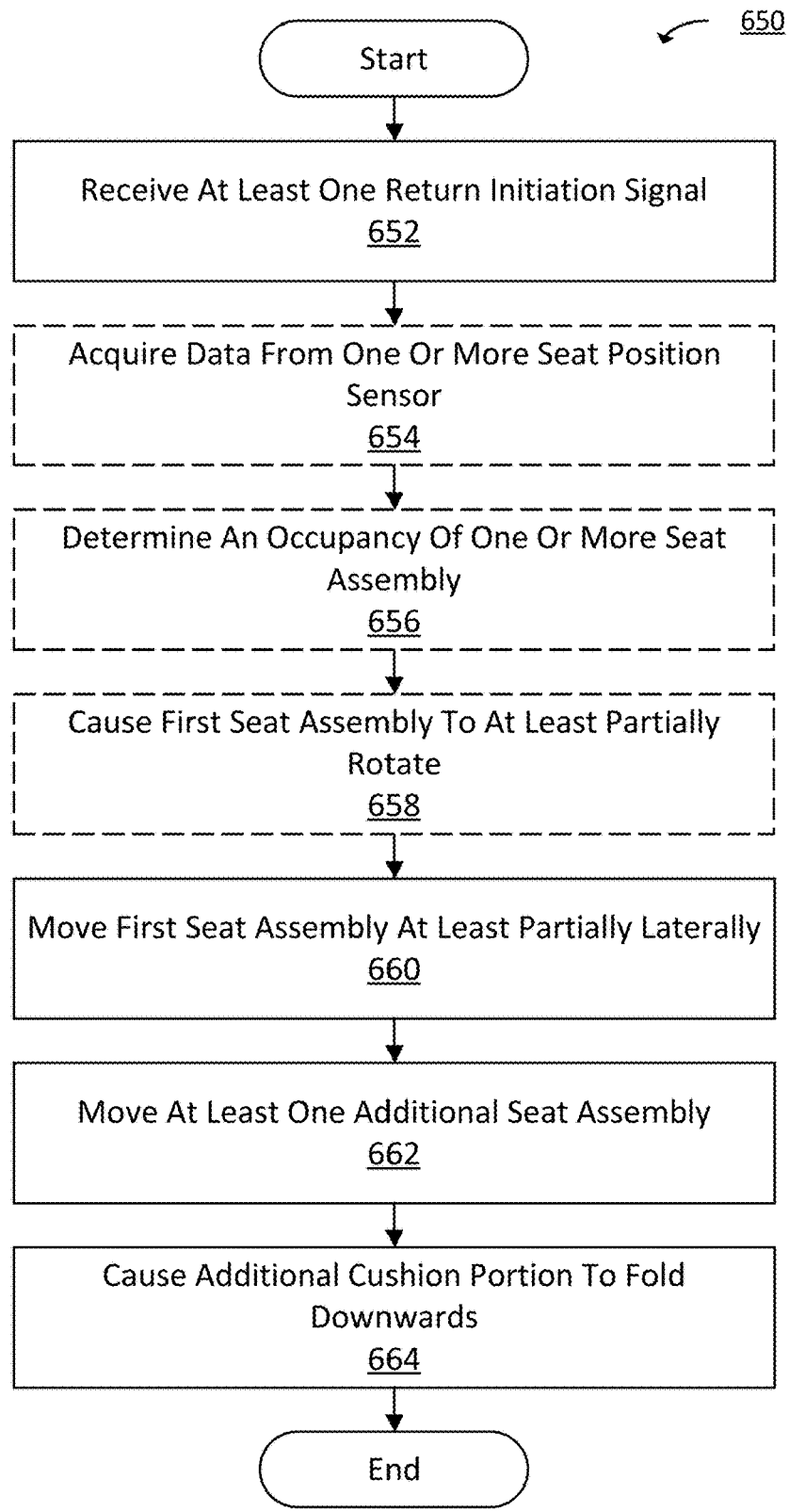

FIG. 6B illustrate an exemplary flow diagram of a seat assembly return movement method 650 in accordance with various embodiments of the present disclosure. The steps of method 650 may be performed by one or more components of the system (e.g., seat control system 310, computing system 390, using seat motor controller 410 with seat motors 450 and/or actuators), as described in more detail with respect to FIGS. 3A-5F. The seat control system 310 and/or the computing system 390 may begin method 650 as a result of receiving a signal that a driver would like to enter the first seat assembly of the vehicle. This may be received by the body control module 402 (e.g., from a key fob unlocking the vehicle, or from a phone). The system 400 may be able to detect the side of the vehicle the driver is approaching (either left or right) using the position of the driver's key fob or phone as received by a transceiver and configure the appropriate side seats to allow the center seat to meet the driver on the appropriate side of the vehicle. This may allow the driver to enter the vehicle from either side.

Method 650 may also begin with the seat control system and/or the computing device receives at least one signal (e.g., at least one return initiation signal for a seat assembly return movement process) from the body control module that the vehicle is parked, shut off, and/or the driver is ready to enter, block 652. In various embodiments, the action may also be automatic once the vehicle is turned on.

In optional block 654, the seat control system and/or the computing system may acquire data from one or more seat position sensor. In various embodiments, the one or more seat position sensors may comprise one or more of: a pressure sensor, a thermal sensor, a motion sensor, a location sensor, or a combination thereof. In various embodiments, the data received from the one or more seat position sensor may comprise information regarding one or more of a location of the first seat assembly, the location of at least one additional seat assembly, the position of one or more cushion portions, or a combination thereof. In various embodiments, the data may further comprise information regarding occupant in the vehicle.

In optional block 656, the seat control system and/or the computing system may determine the occupancy of the first seat assembly and/or at least one additional seat assembly based at least in part on the occupancy data received from one or more seat position sensors. In various embodiments, the occupancy data may be used to determine which additional seat assembly may be moved, such that the first seat assembly may move towards an exit/enter position. In various embodiments, the data may further comprise information regarding the side in which the driver may be entering the vehicle.

In optional block 658, the seat control system and/or the computing system may cause the first seat assembly the first seat assembly to at least partially rotate inwardly to either the left side or right side of the vehicle once the driver has sat in the first seat assembly. In various embodiments, the seat control system and/or the computing system may output at least one signal to a seat motor controller and/or one or more seat motors to cause the first seat assembly to at least partially rotate towards an interior of a vehicle.

In block 660, the seat control system and/or the computing system may move the first seat assembly along a portion of the rail system, such that the first seat assembly may move at least partially lateral from a second position towards a first position. In various embodiments, the first position may be disposed towards an interior of the vehicle (e.g., towards a centerline of the vehicle). In various embodiments, the seat control system and/or the computing system may use one or more seat motors and/or rail motors to move the seat first seat assembly along the arc portion of the rail system. In various embodiments, the first position may be a position in the vehicle in which the steering wheel and driving components are located.

In block 662, the seat control system and/or the computing system may cause at least one additional seat assembly to move from a second position towards a first position. In various embodiments, the at least one additional seat assembly may move at least partially forwards from an exit position towards an initial position. In various embodiments, the seat control system may move the at least one additional seat assembly along one or more rail portions of the rail system using one or more seat motors. In some embodiments, the seat control system may further output at least one signal to a seat motor controller and/or one or more seat motors to cause the at least one additional seat assembly to move.

In block 664, the seat control system and/or the computing system may cause at least a portion of the cushion portion of at least one additional seat assembly to move away from the back portion. In various embodiments, the seat control system and/or the computing system may move the cushion portion of the at least one additional seat assembly using one or more seat motors. In various embodiments, the seat control system and/or the computing system may move the cushion portion of the at least one additional seat assembly, such that a distalmost edge of the cushion portion may move away from at least a portion of the back portion. In one or more embodiments, the seat control system and/or the computing system may output a signal to a seat motor controller or one or more seat motors to cause the one or more additional seat assembly to move. In some embodiments, the actions of block 664 may occur simultaneously with the actions of block 662.

Throughout method 650, system 400 may utilize the position sensors 460 in order to determine the location of components of seat assemblies and occupants of the vehicle to prevent collisions. In various embodiments, at least one position sensors 460 may be used to stop the movement of one or more components if another component is not able to fully retract.

Figure 7A:
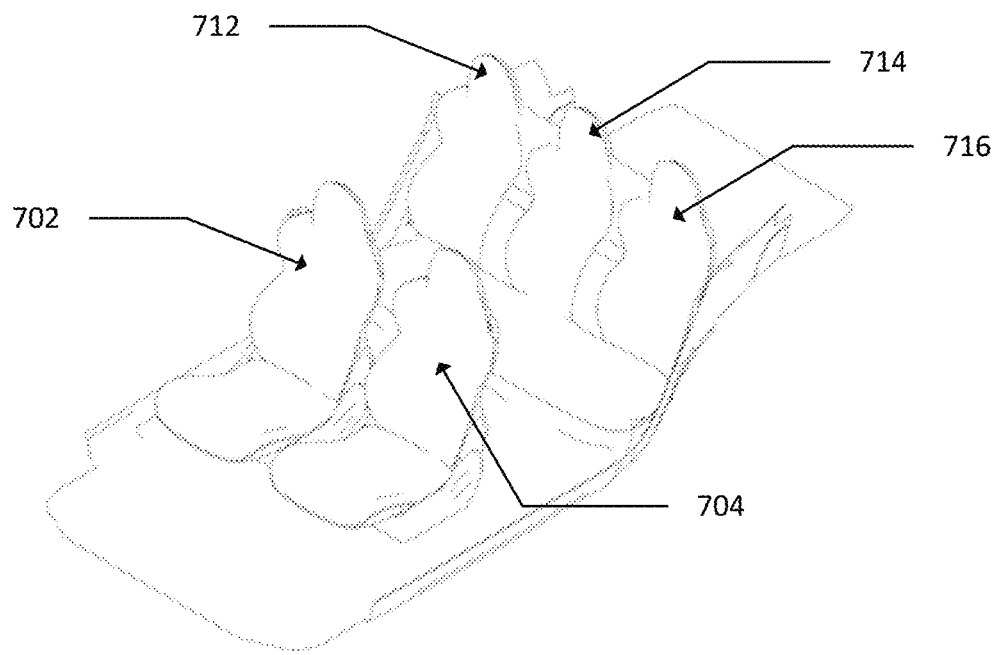
FIGS. 7A-7H are illustrations demonstrating an example seat configuration in accordance with certain embodiments of the disclosed technology.
Figure 7B:
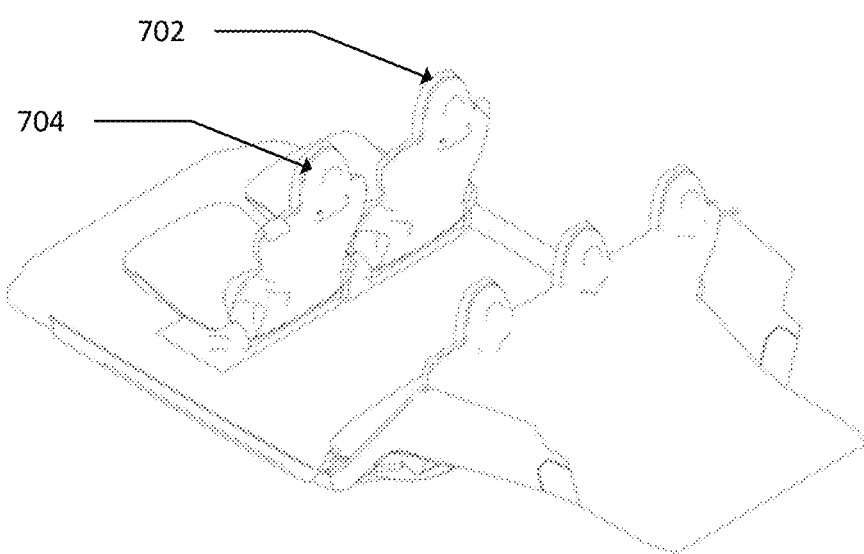
Figure 7C:
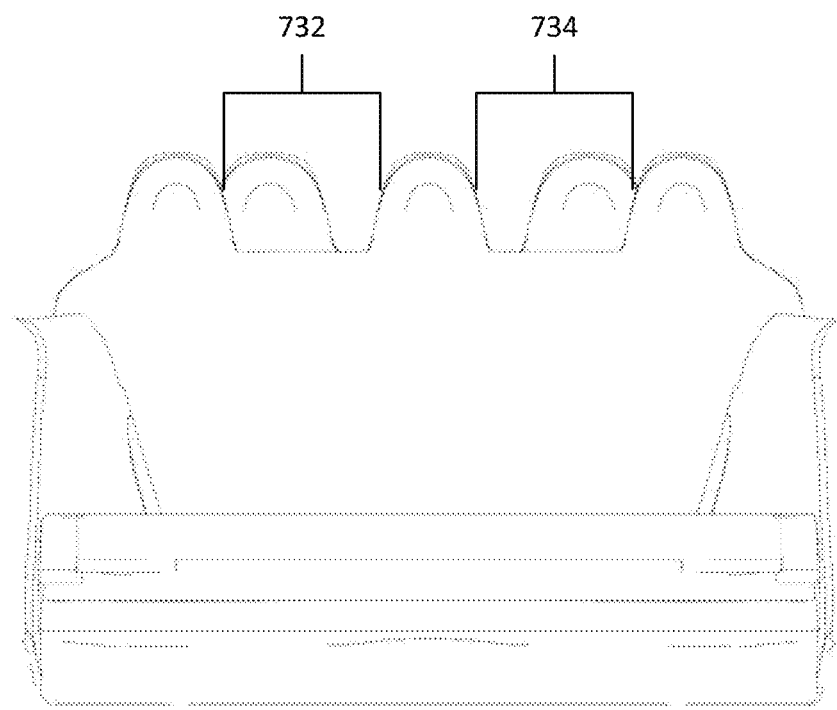
Figure 7D:
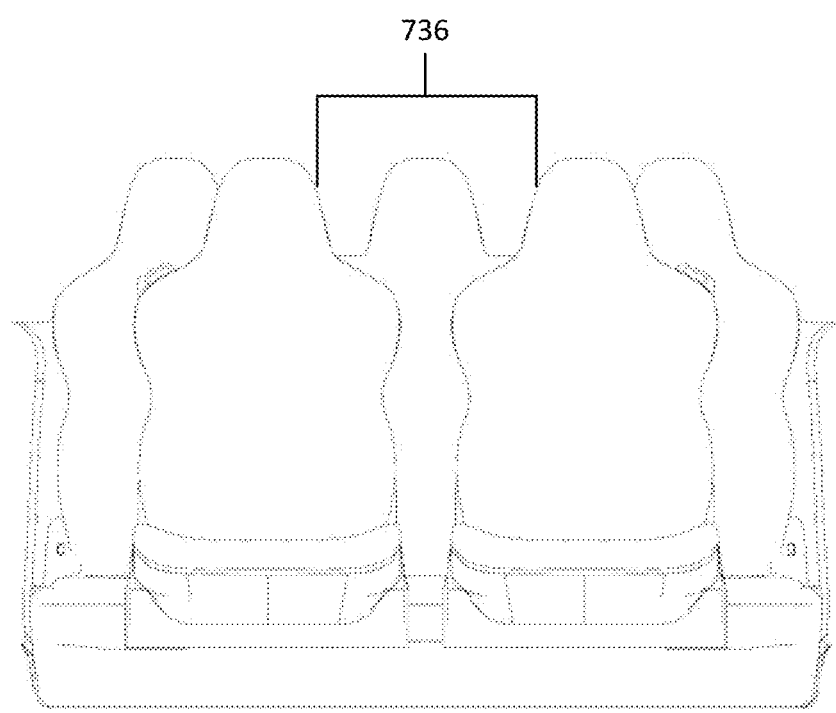
Figure 7E:
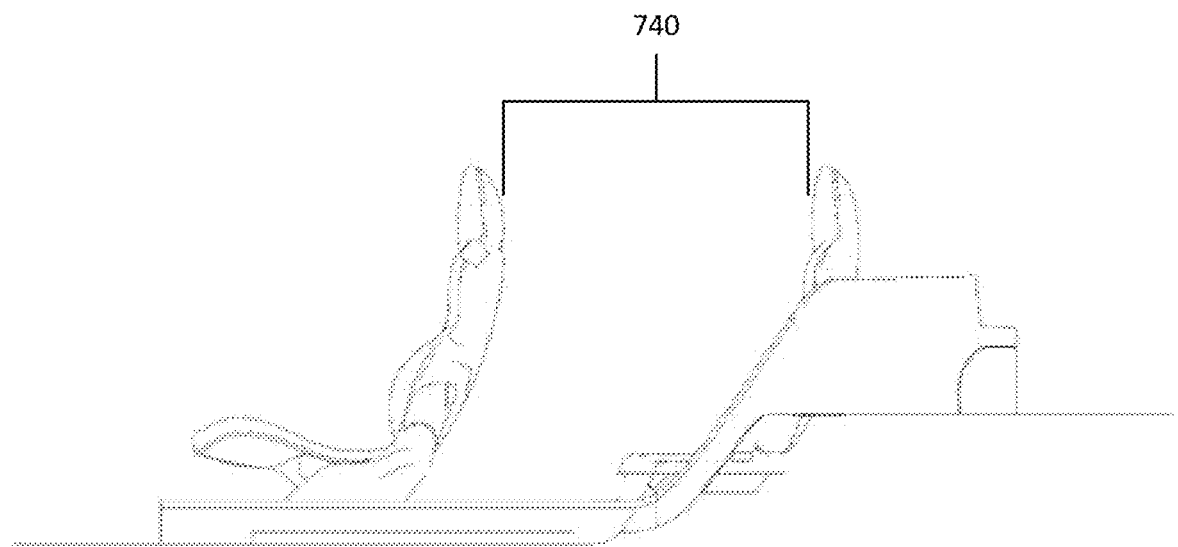
Figure 7F:
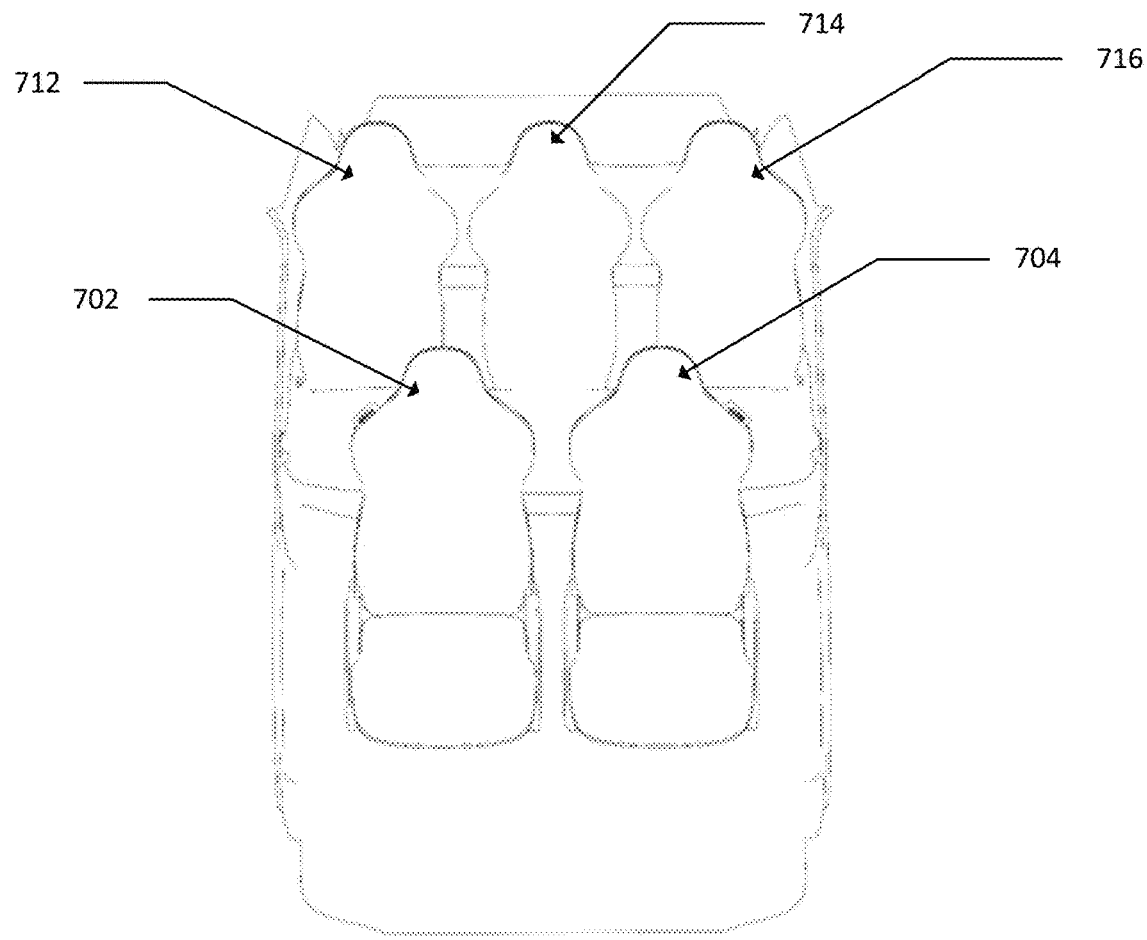
Figure 7G:
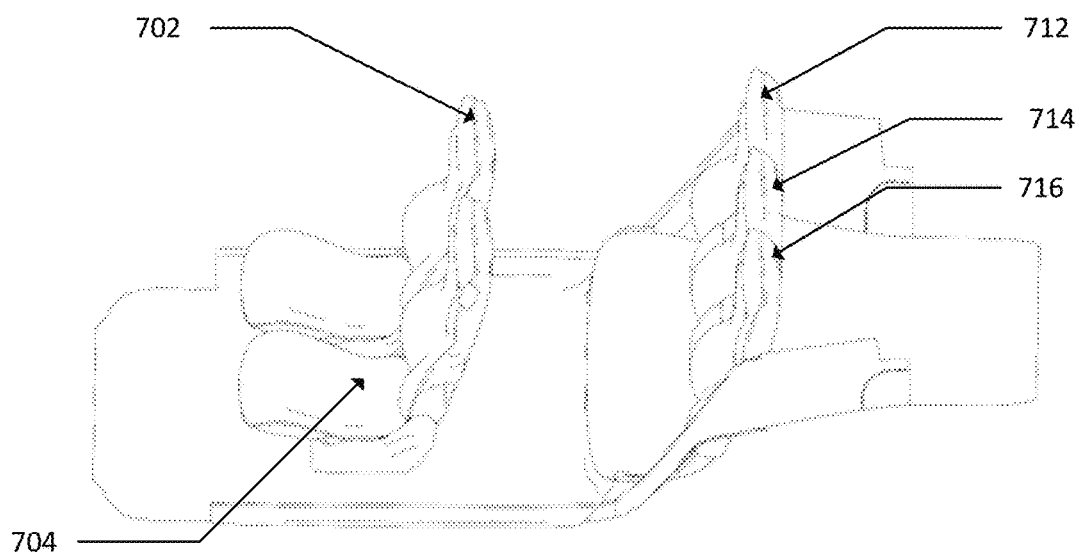
Figure 7H:
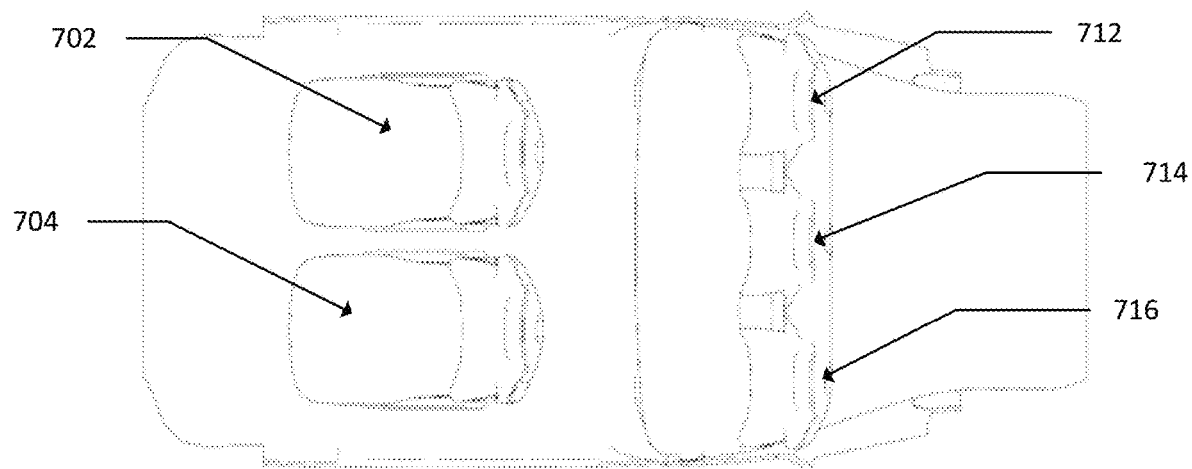

FIGS. 7A-7H illustrate various views of a seating arrangements according to various embodiments of the present disclosure. In various embodiments, the vehicle may comprise a front row and/or at least one additional row. In the depicted embodiments, the front row may comprise a first seat assembly 702 and/or a second seat assembly 704, such that, the driver may be positioned in either a left- or right-hand drive configuration. In various embodiments, the at least one additional row may comprise a first, second row seat assembly 712, a second, second row seat assembly, and/or at least one additional second row seat assembly 714. As depicted in FIGS. 7C-7D, in various embodiments, the front row seat assemblies may be positioned, such that the first seat assembly may be disposed in a first gap 732 and/or the second seat assembly may be disposed in a second gap 734. In various embodiments, the first gap 732 and/or the second gap 734 may allow one or more occupants in the at least one additional row have a clear line of sight. As depicted in FIG. 7D, the second, second row seat assembly may be disposed in a third gap 736. In various embodiments, the third gap may allow one or more occupants in the at least one additional row have a clear line of sight. In various embodiments, the first row and/or the at least one additional row may be separated by a predetermined distance 740.

Figure 8A:
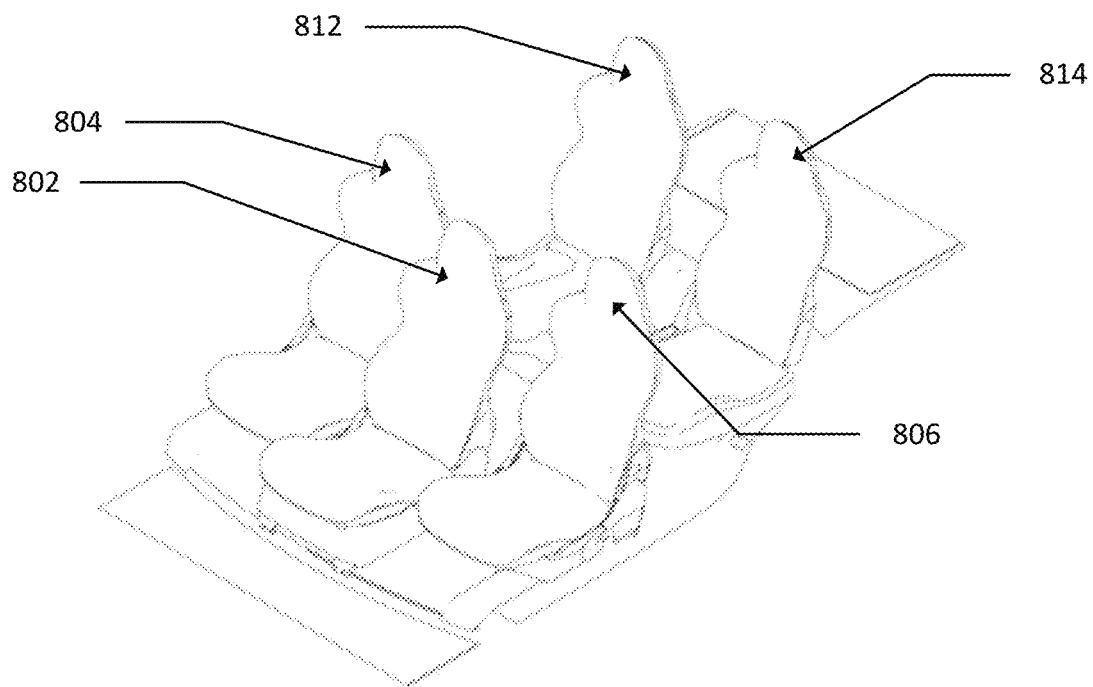
FIGS. 8A-8X are illustrations demonstrating an example seat configuration and movement in accordance with certain embodiments of the disclosed technology.
Figure 8B:
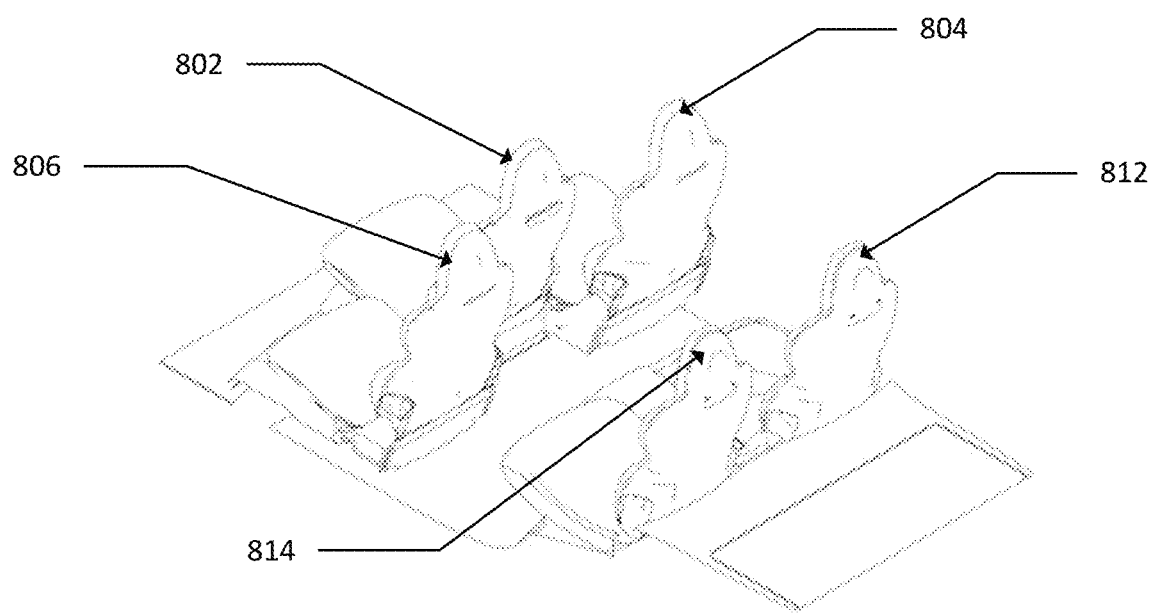
Figure 8C:
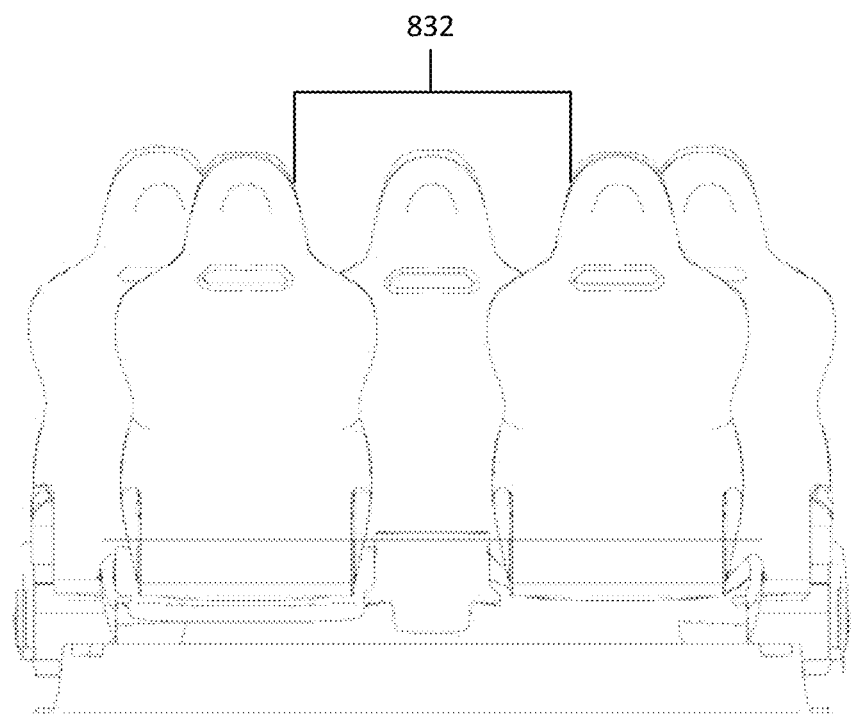
Figure 8D:
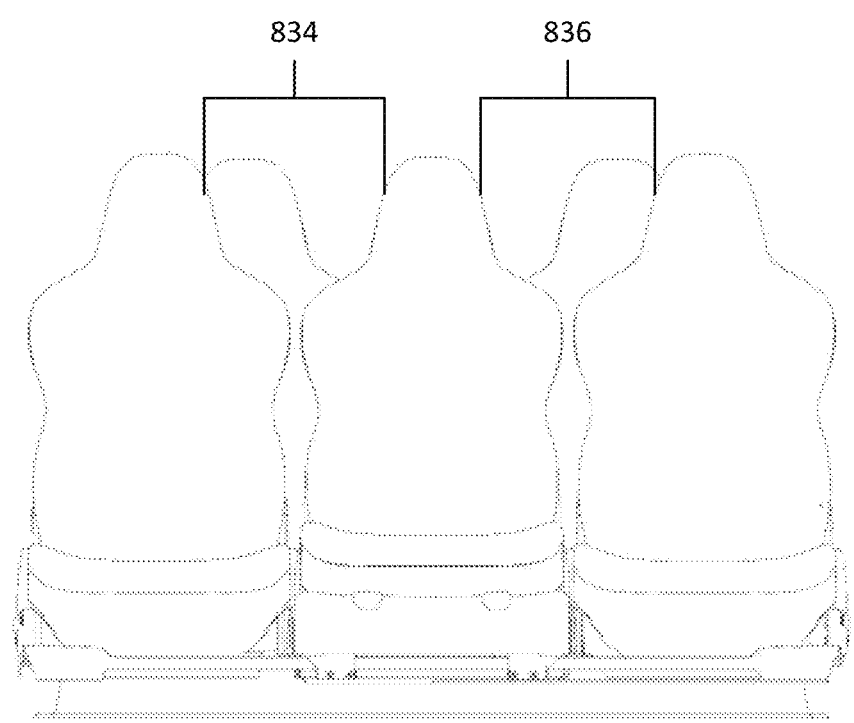
Figure 8E:
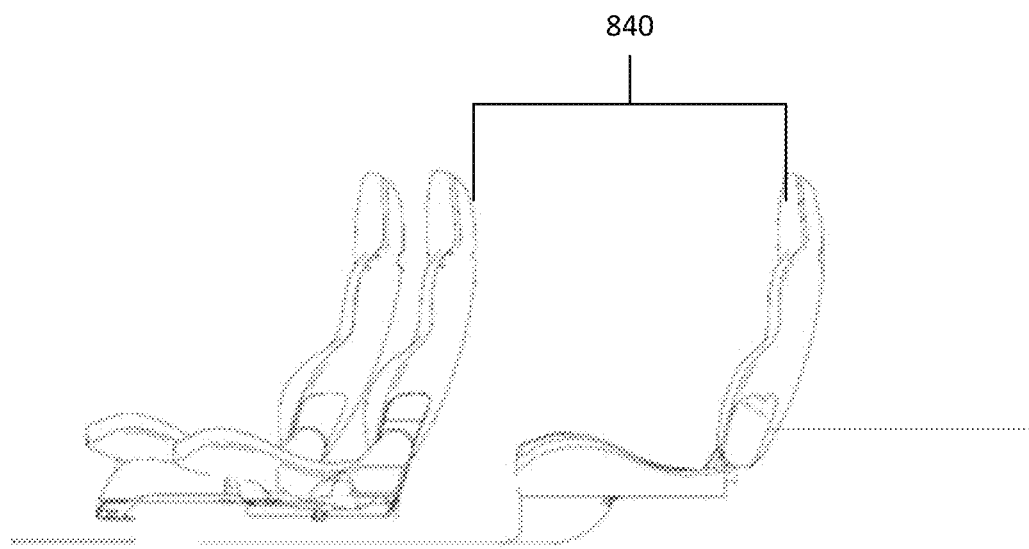
Figure 8F:
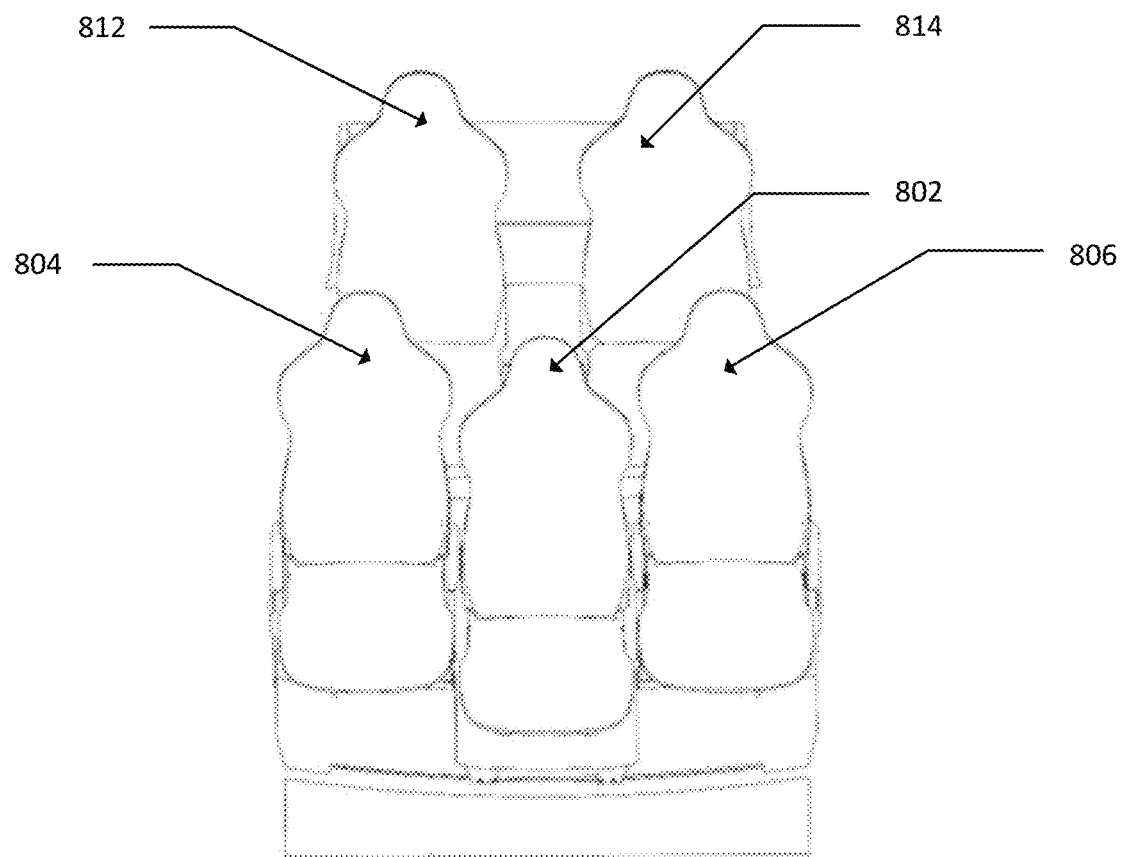
Figure 8G:
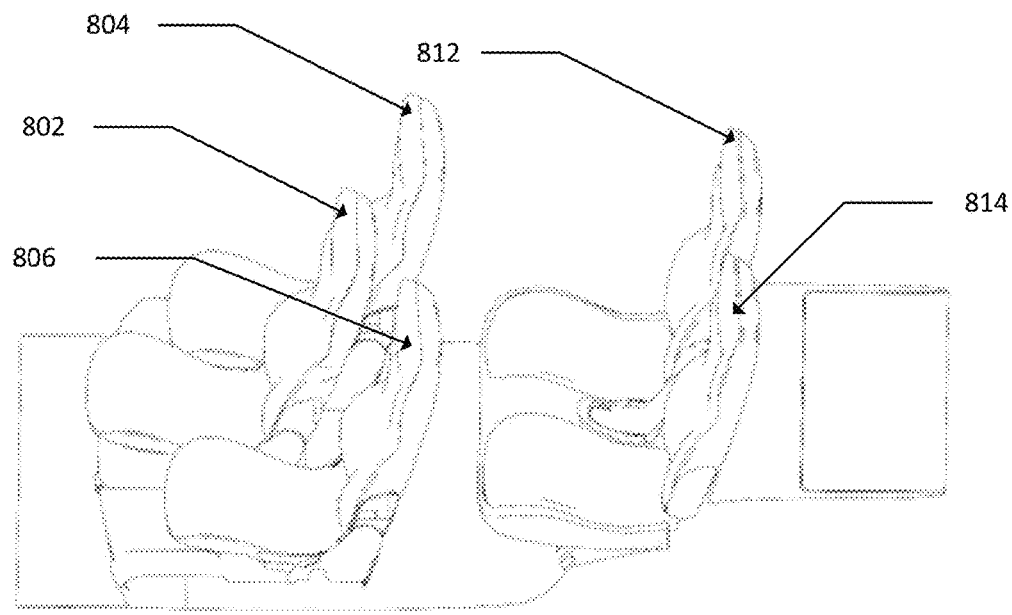
Figure 8H:
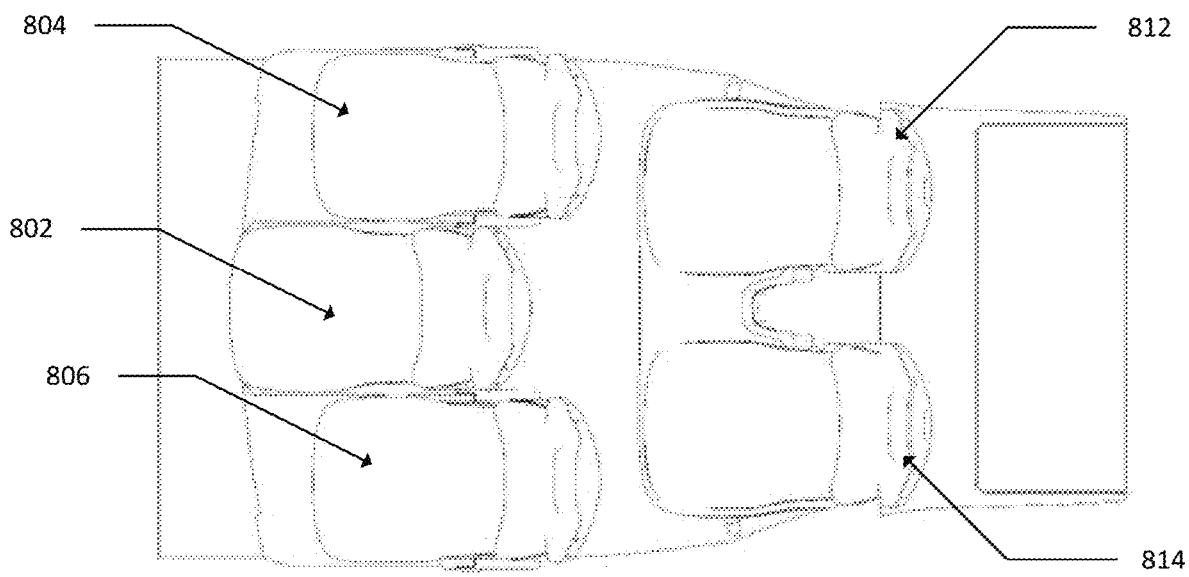
Figure 8I:
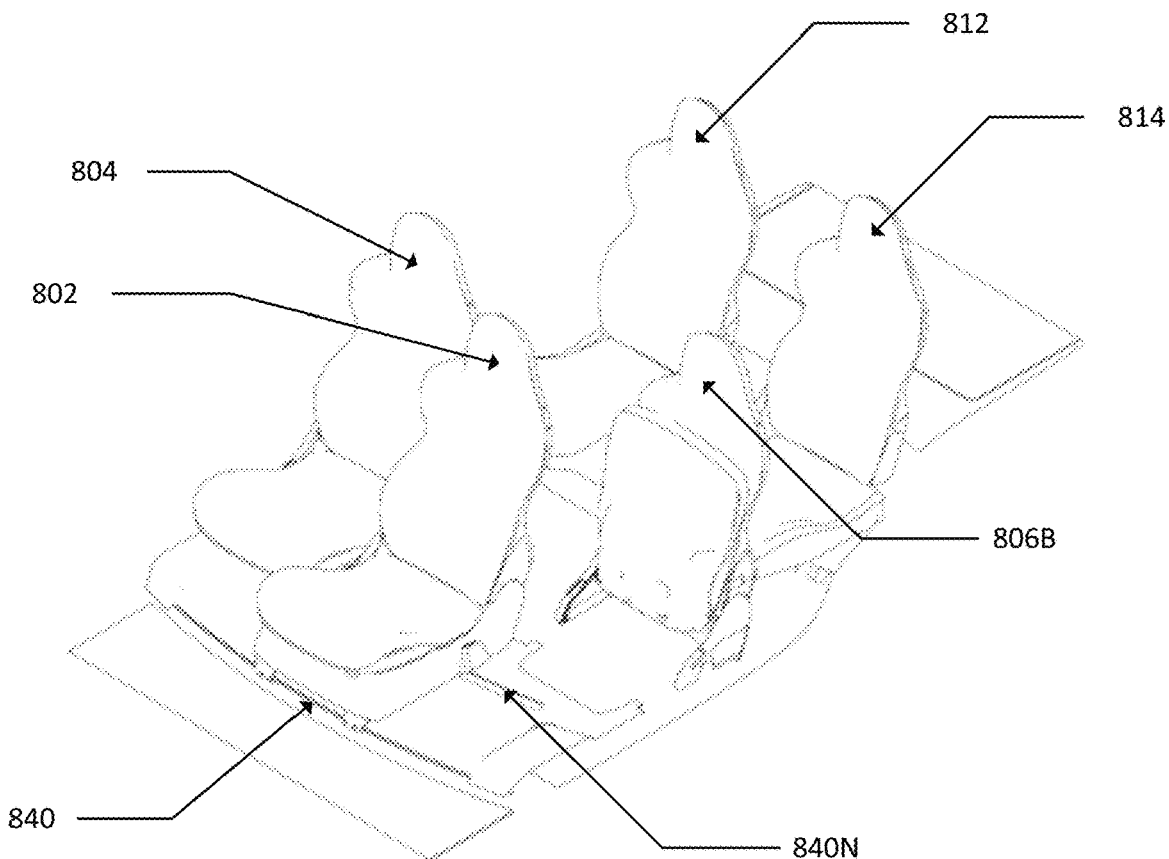
Figure 8J:
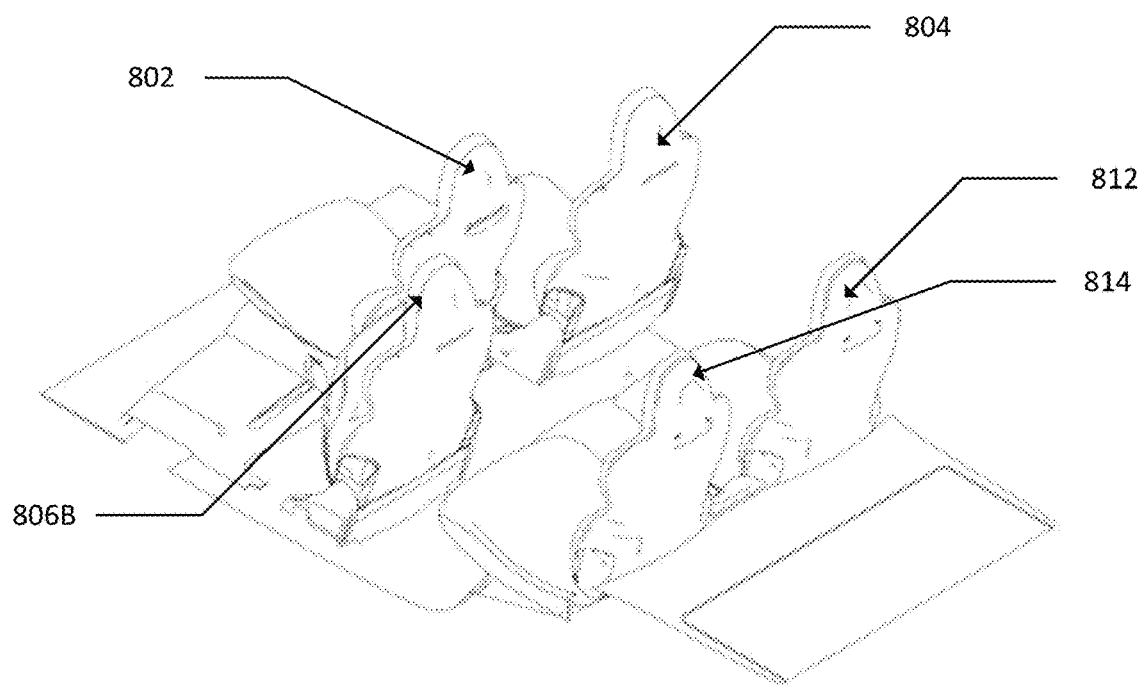
Figure 8K:
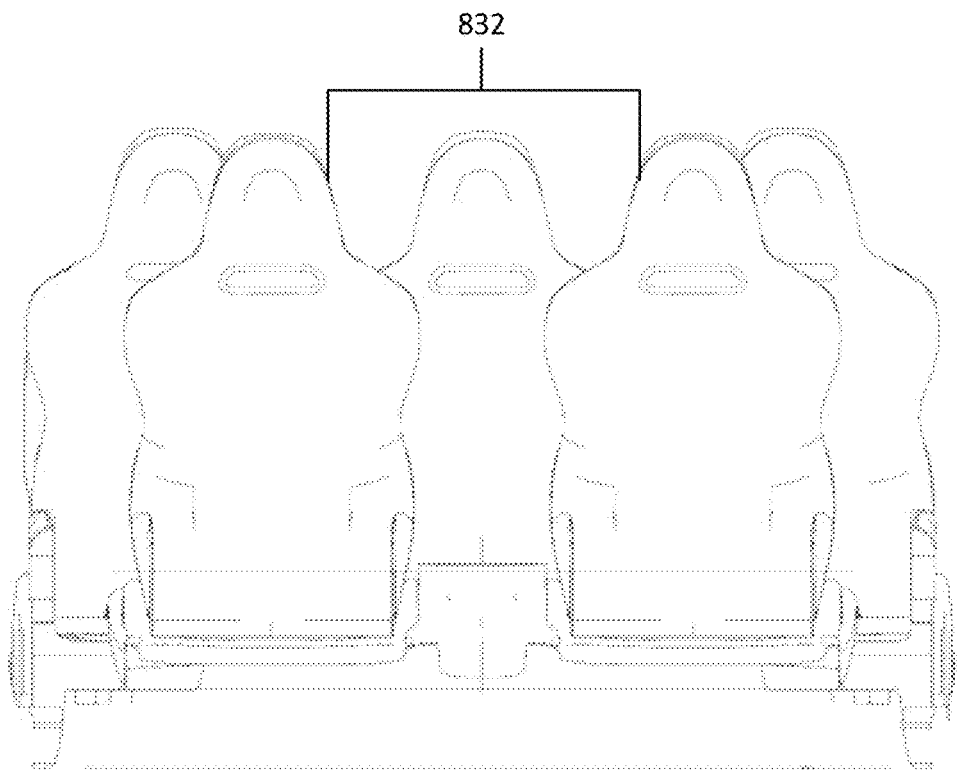
Figure 8L:
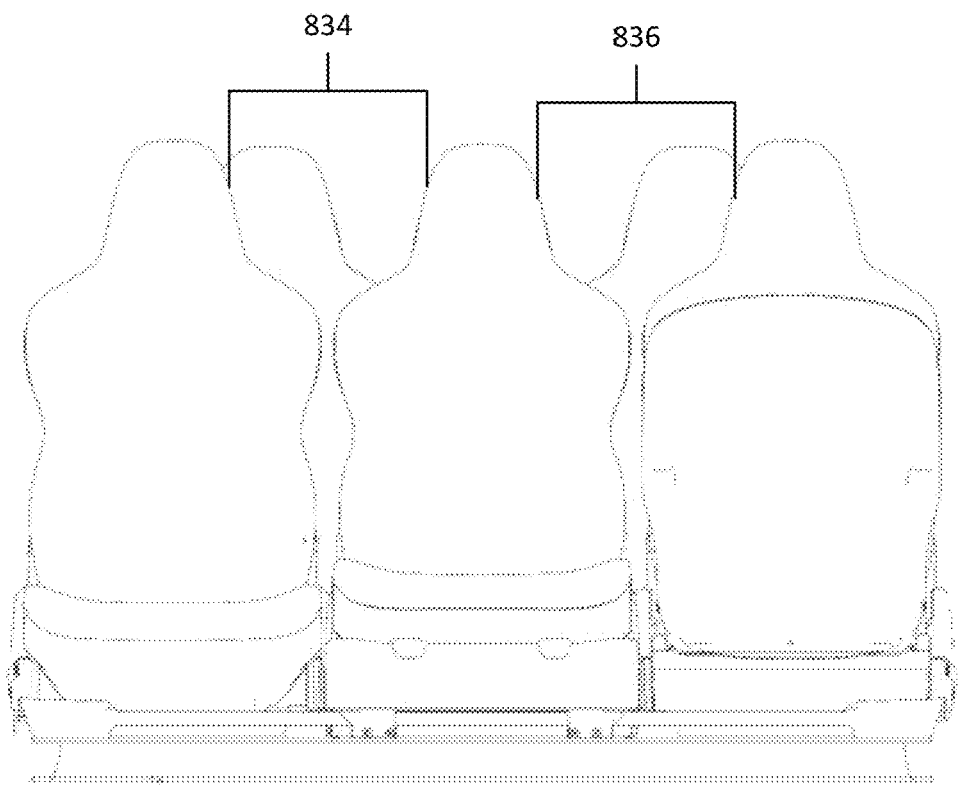
Figure 8M:
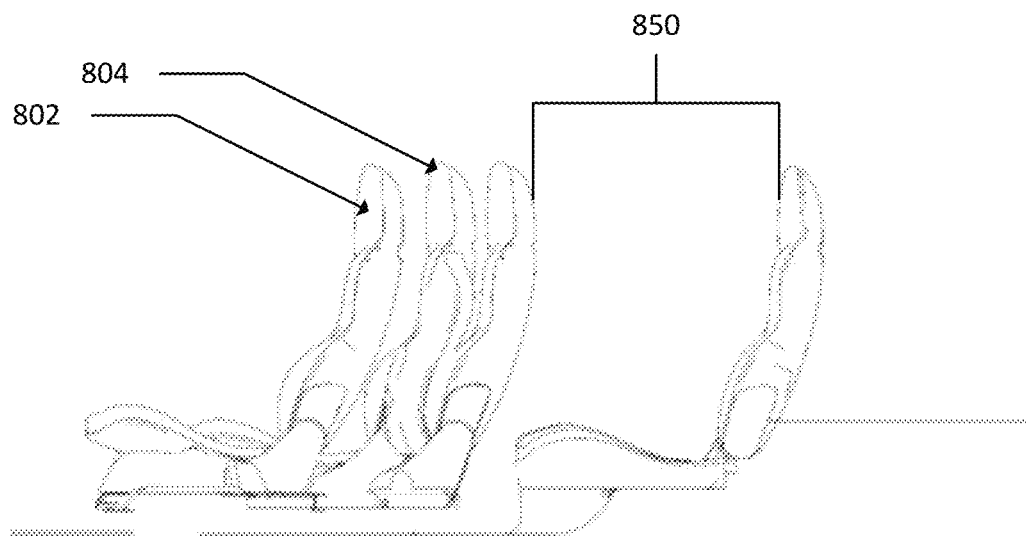
Figure 8N:
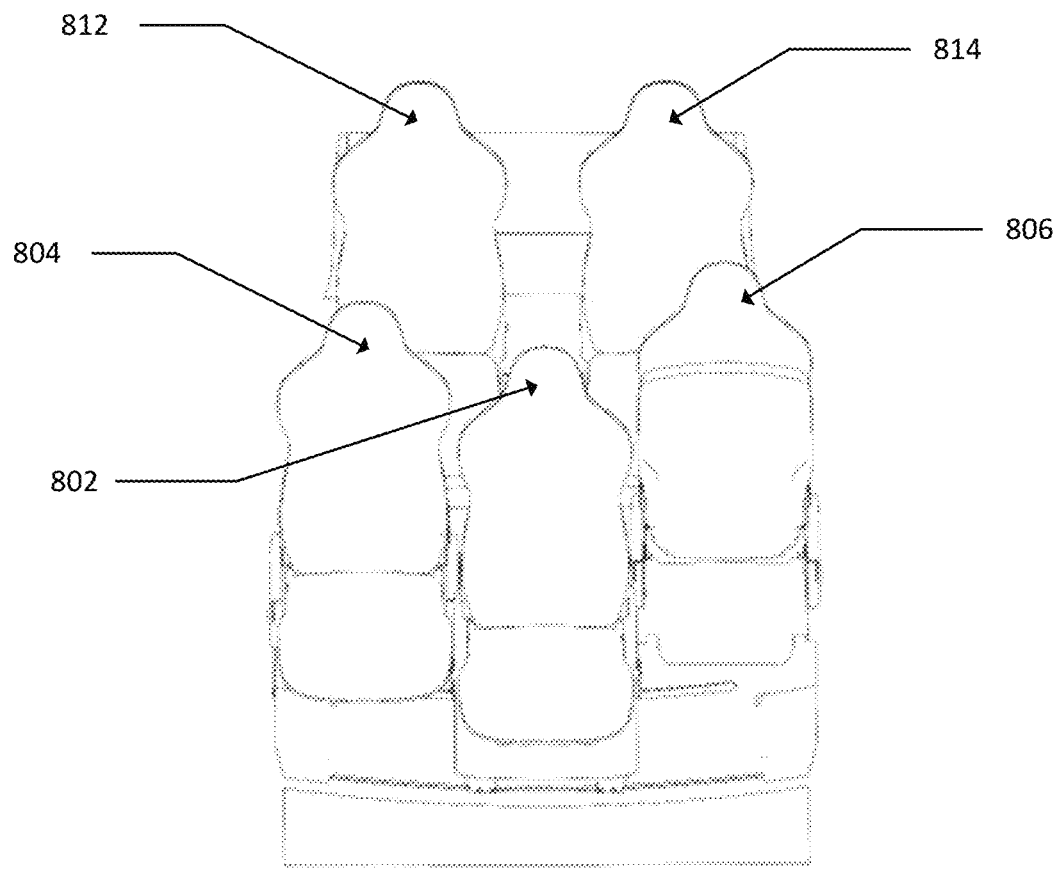
Figure 8O:
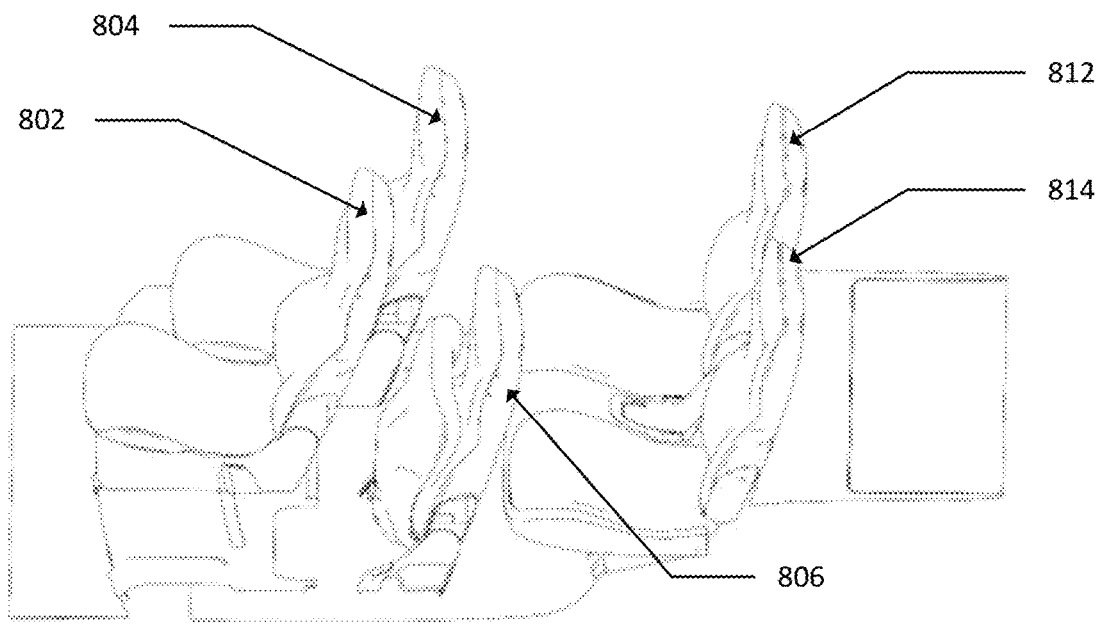
Figure 8P:
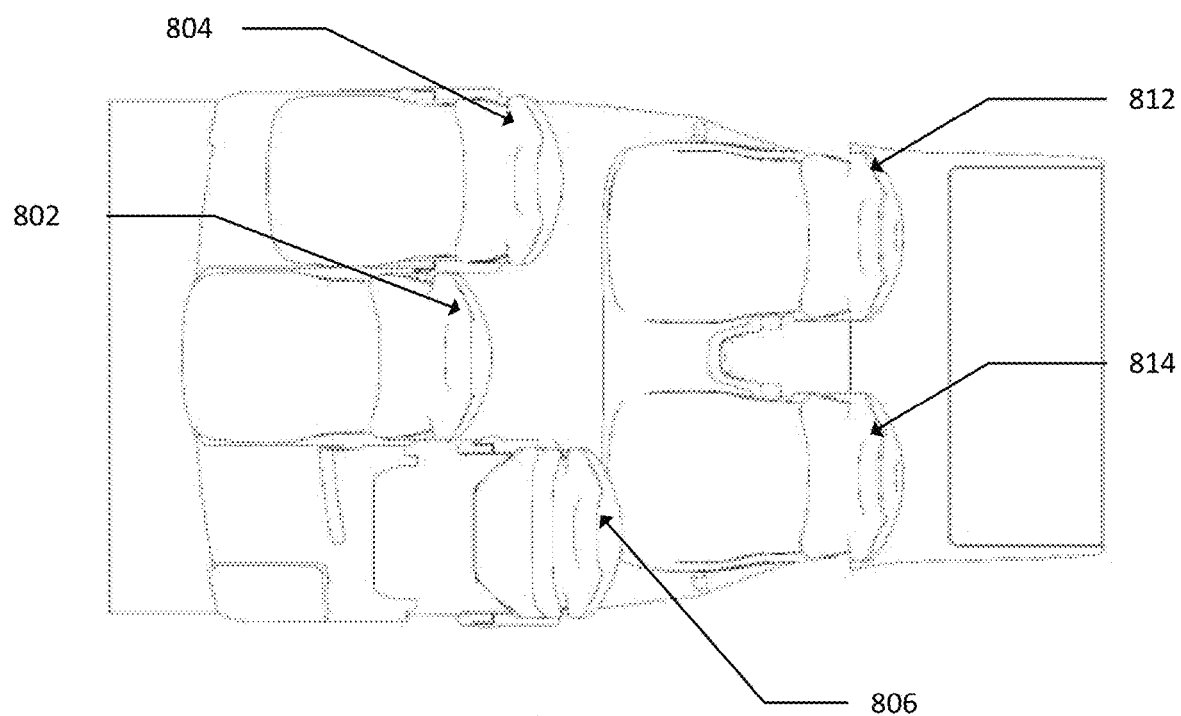
Figure 8Q:
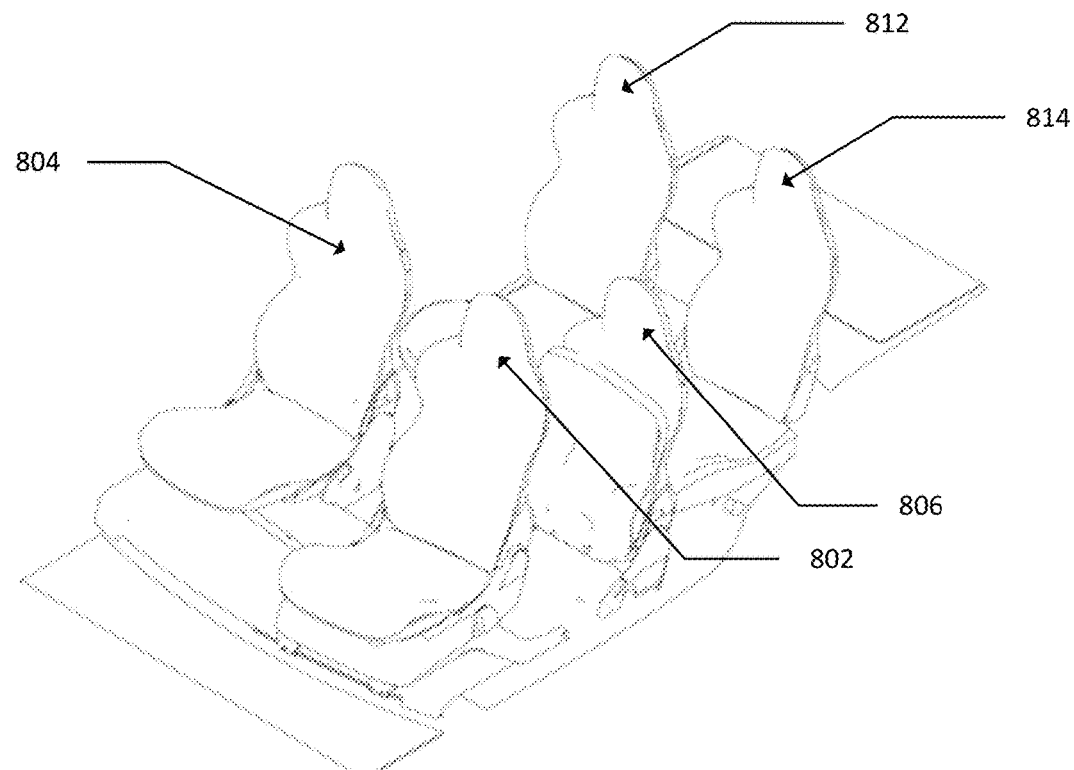
Figure 8R:
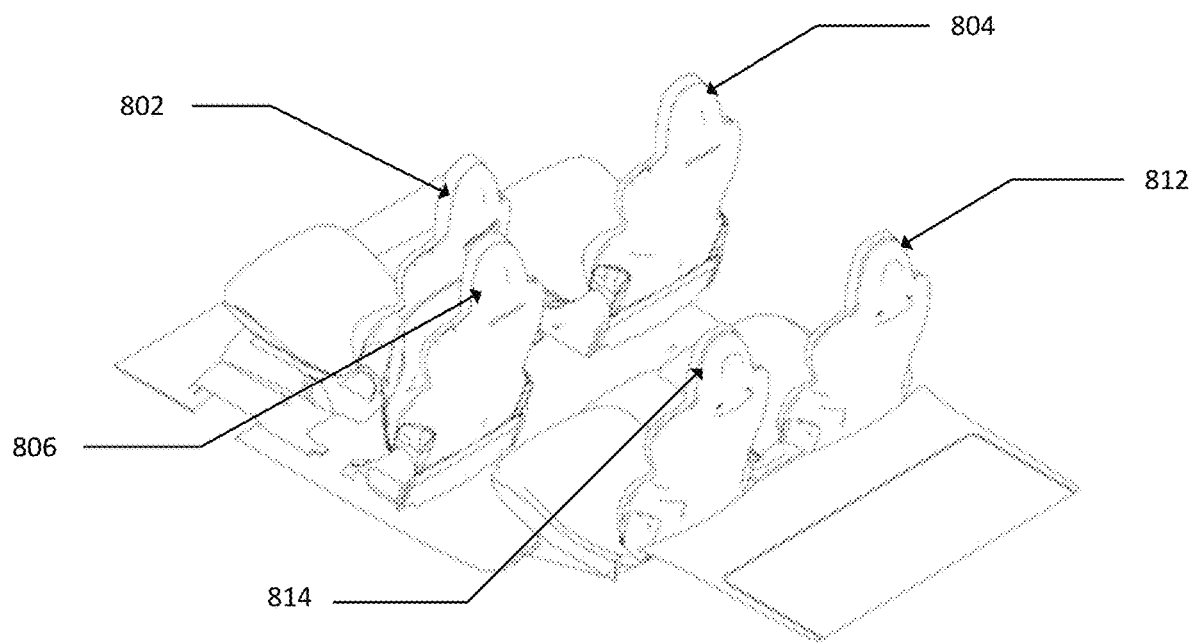
Figure 8S:
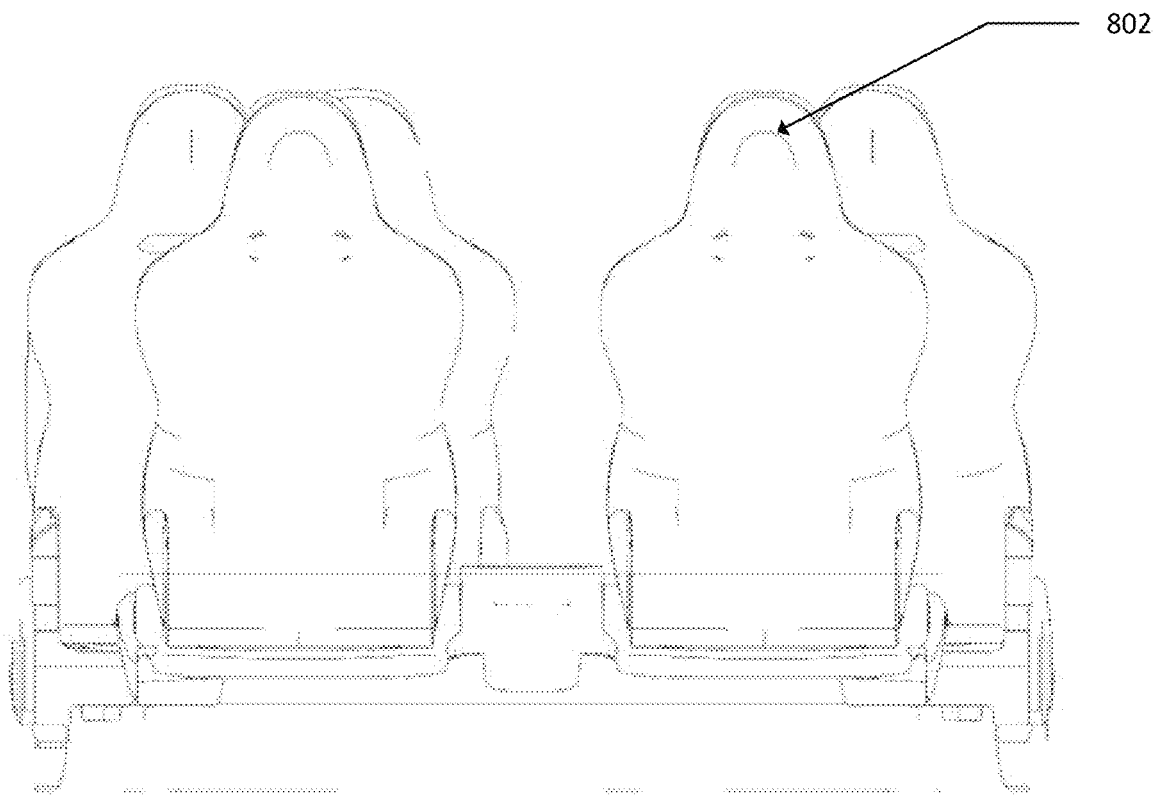
Figure 8T:
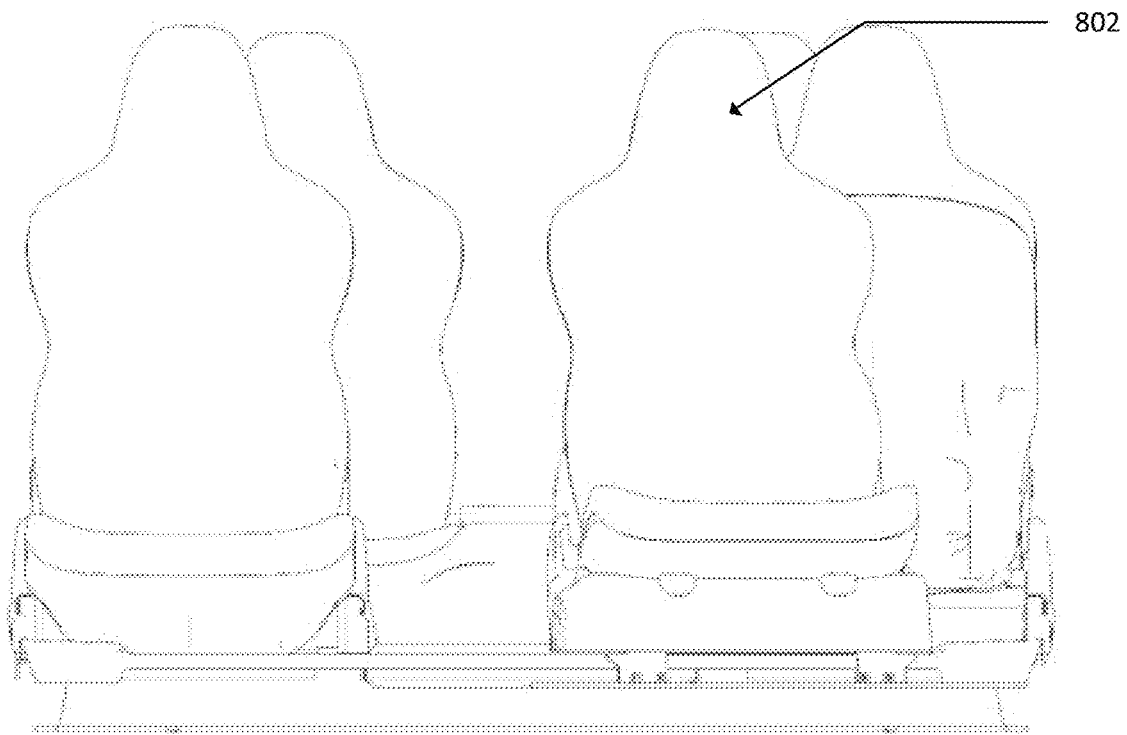
Figure 8U:
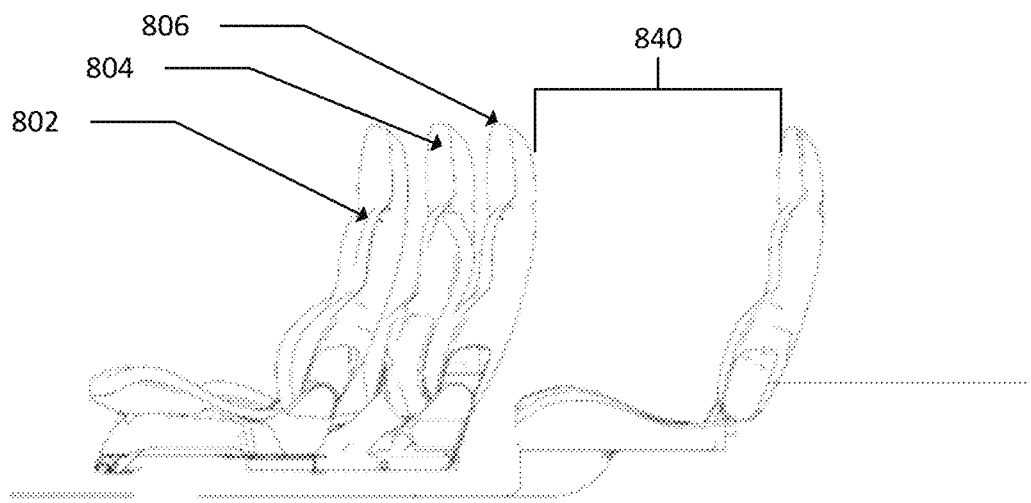
Figure 8V:
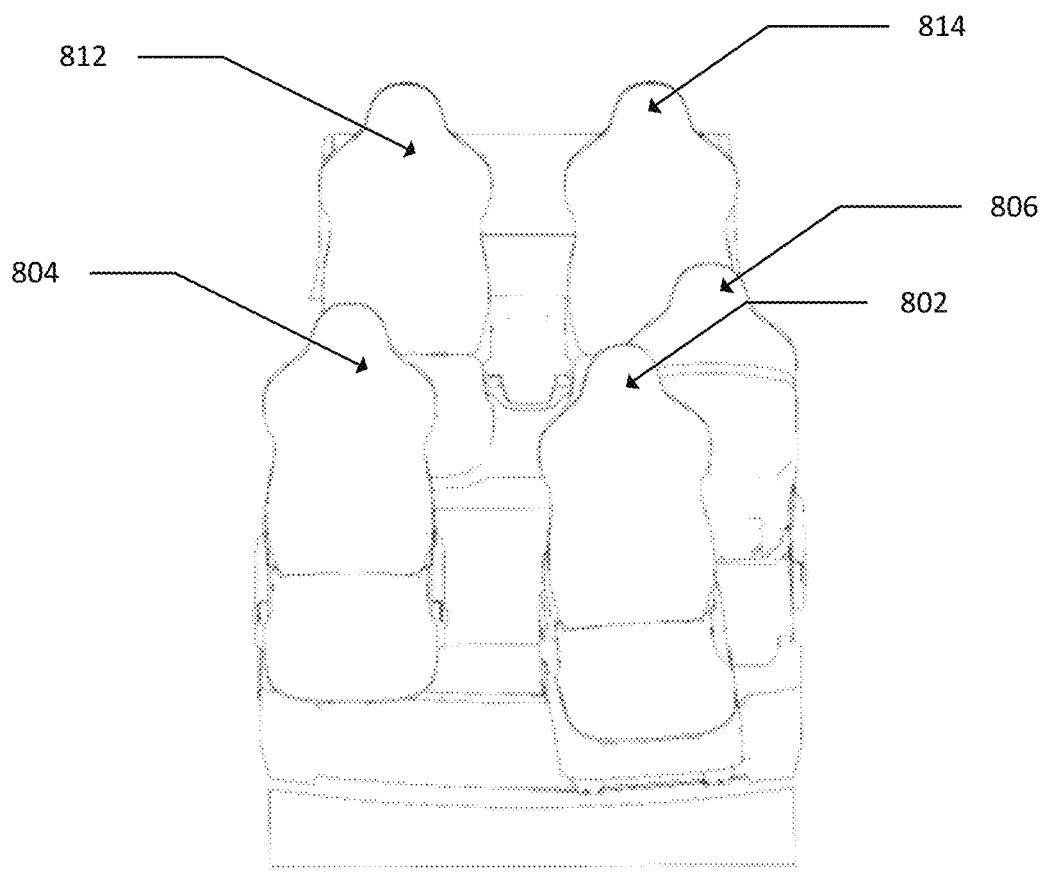
Figure 8W:
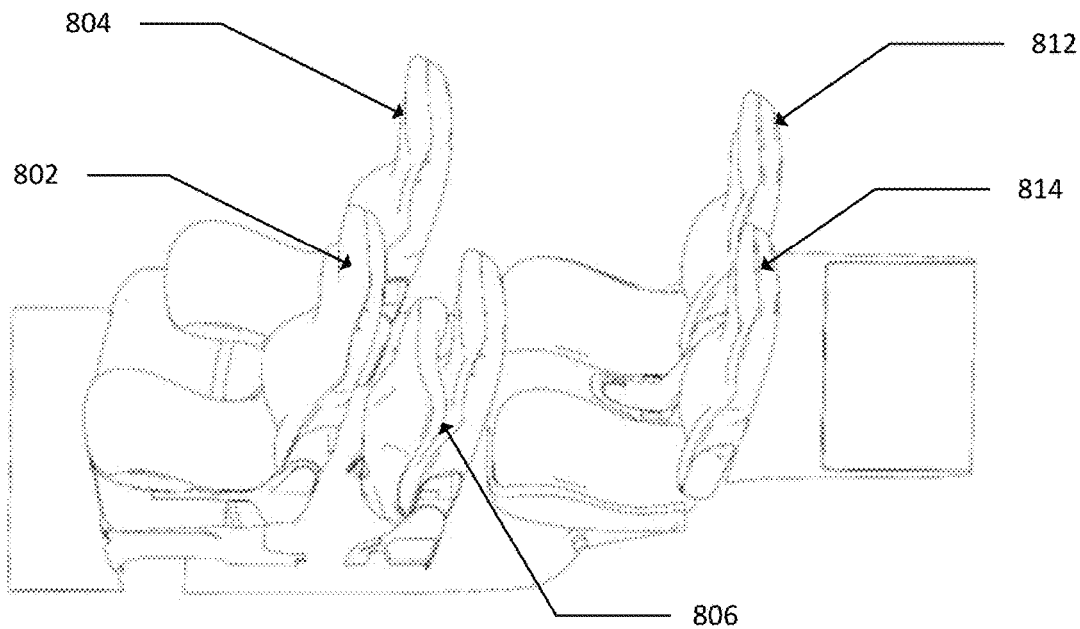
Figure 8X:
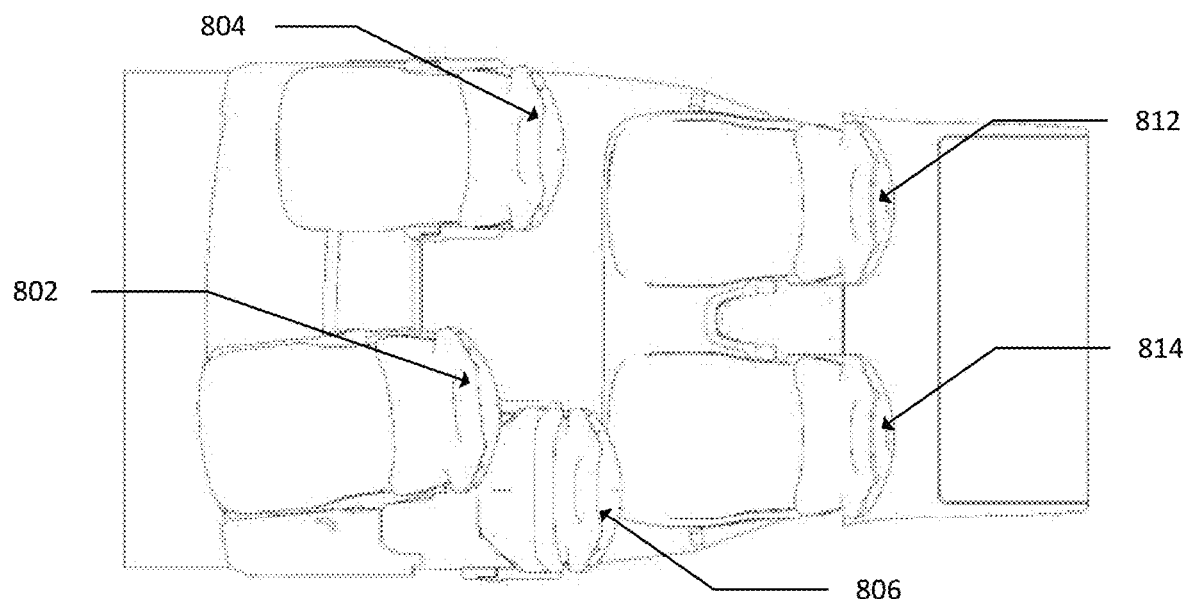

FIGS. 8A-8X illustrate various views of a seating arrangement according to one or more embodiments of the present disclosure. In various embodiments, the front row comprises three seats and two seats are in the rear two. The two rear seats and the three front seats may be bucket seats. Otherwise, the descriptions for FIGS. 8A-8X are similar to the descriptions for FIGS. 2A-2D and are not repeated herein for brevity. In various embodiments, the vehicle may comprise a front row and/or at least one additional row. In the depicted embodiments, the front row may comprise a first seat assembly 802, a second seat assembly 804, and/or a third seat assembly 806, such that, the driver may be positioned in either a center-configuration, left-hand drive configuration, or right-hand drive configuration. In various embodiments, the at least one additional row may comprise a first, second row seat assembly 812 and/or a second, second row seat assembly 814. As depicted in FIGS. 8C-8D, in various embodiments, the front row seat assemblies may be positioned, such that the first seat assembly may be disposed in a first gap 832 may allow one or more occupants in the at least one additional row have a clear line of sight. In various embodiments, the at least one additional row seat assemblies may be positioned, such that the first seat assembly 802 may be disposed in a first gap 834 and/or the second seat assembly 804 may be disposed in a second gap 834. In various embodiments, the first gap 832 and/or the second gap 834 may allow one or more occupants in the at least one additional row have a clear line of sight. In various embodiments, the first row and/or the at least one additional row may be separated by a predetermined distance 840.

FIGS. 8I-8X illustrate exemplary views of a movement process as described in more detailed with respect to FIGS. 5A-6B.

Figure 9A:
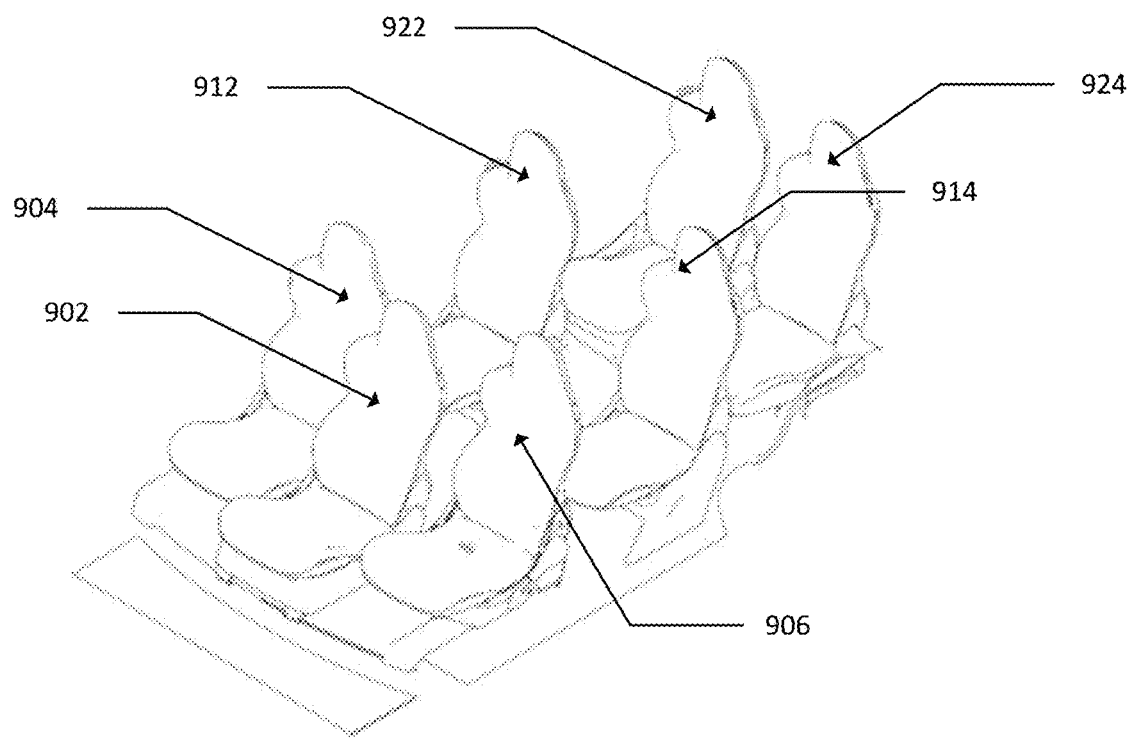
FIGS. 9A-9X are illustrations demonstrating an example seat configuration and movement in accordance with certain embodiments of the disclosed technology.
Figure 9B:
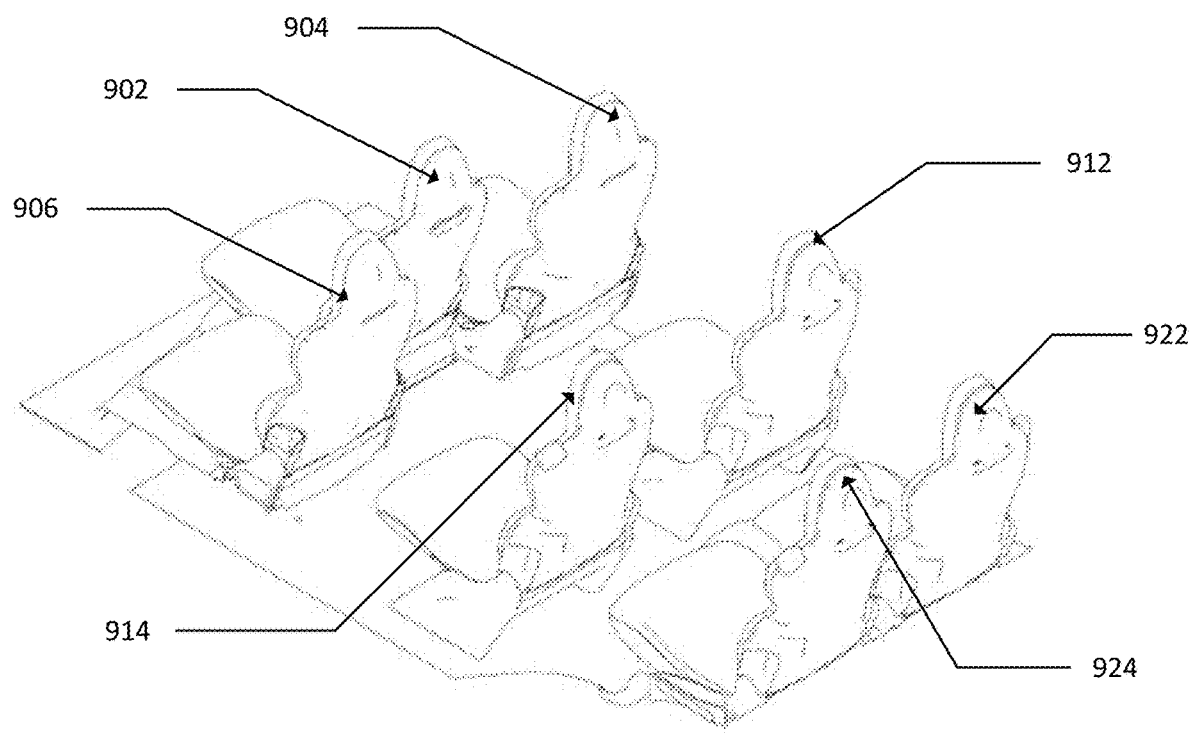
Figure 9C:
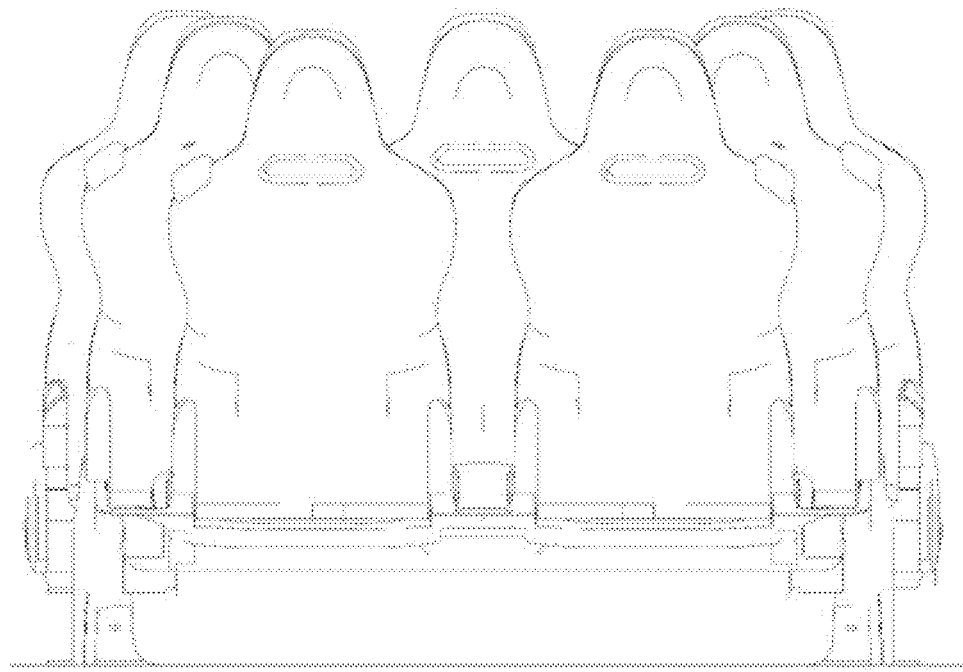
Figure 9D:
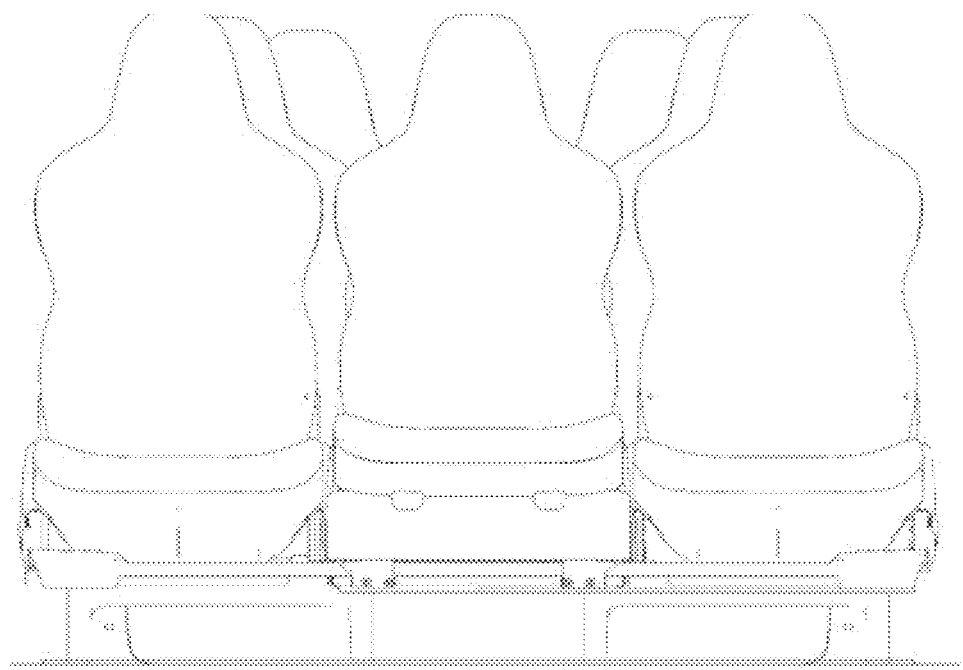
Figure 9E:
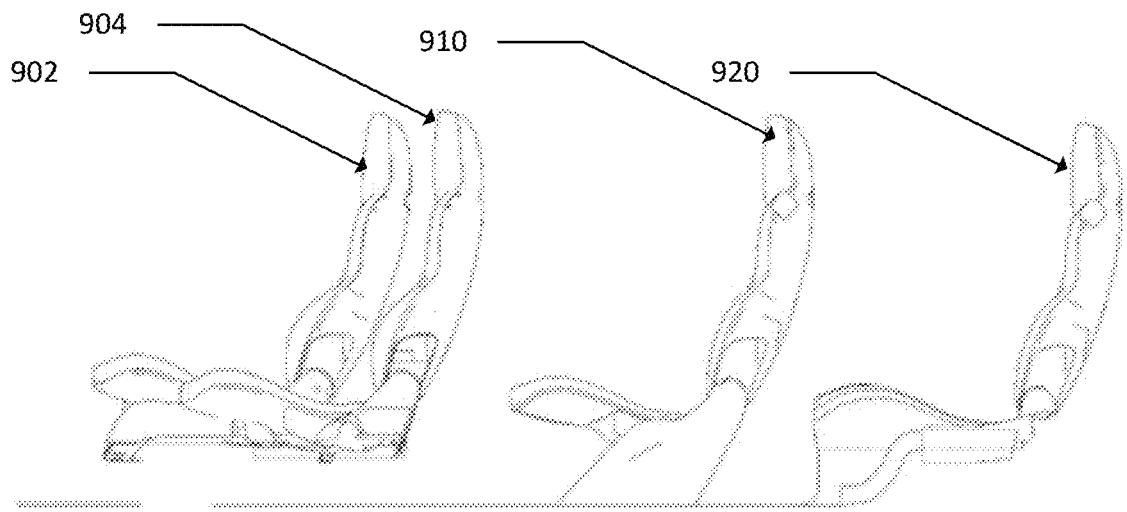
Figure 9F:
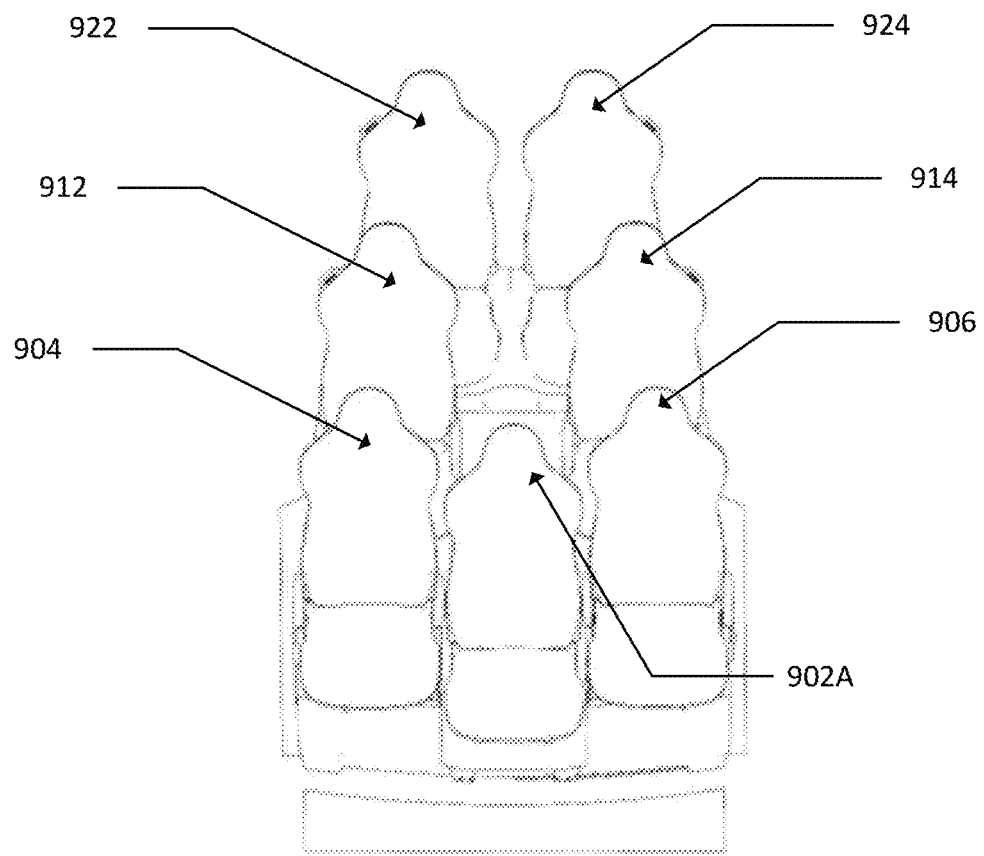
Figure 9G:
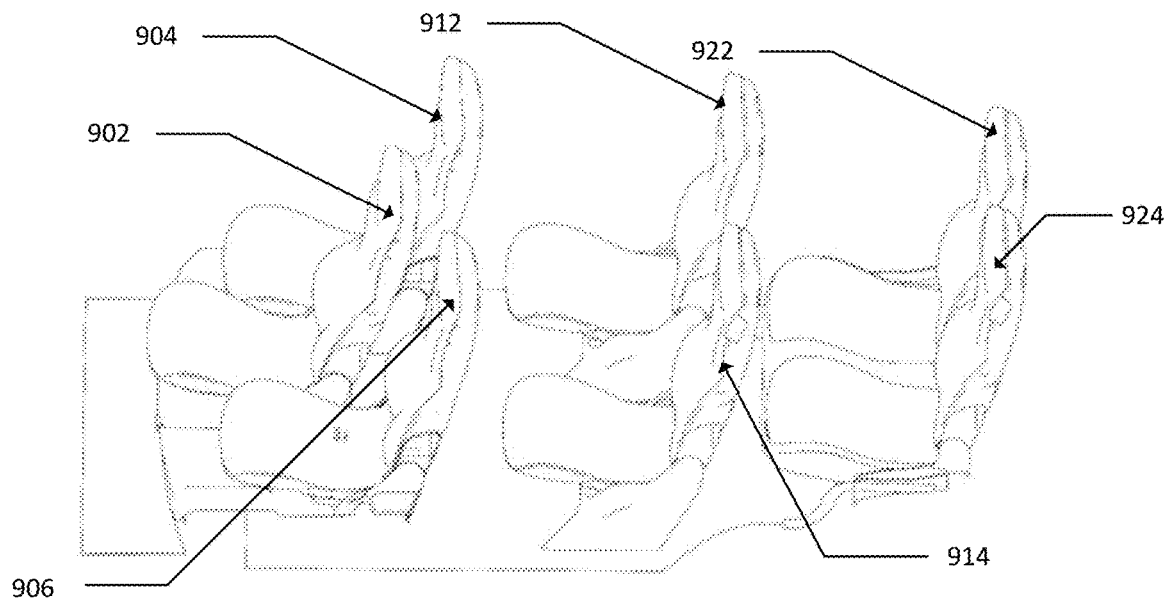
Figure 9H:
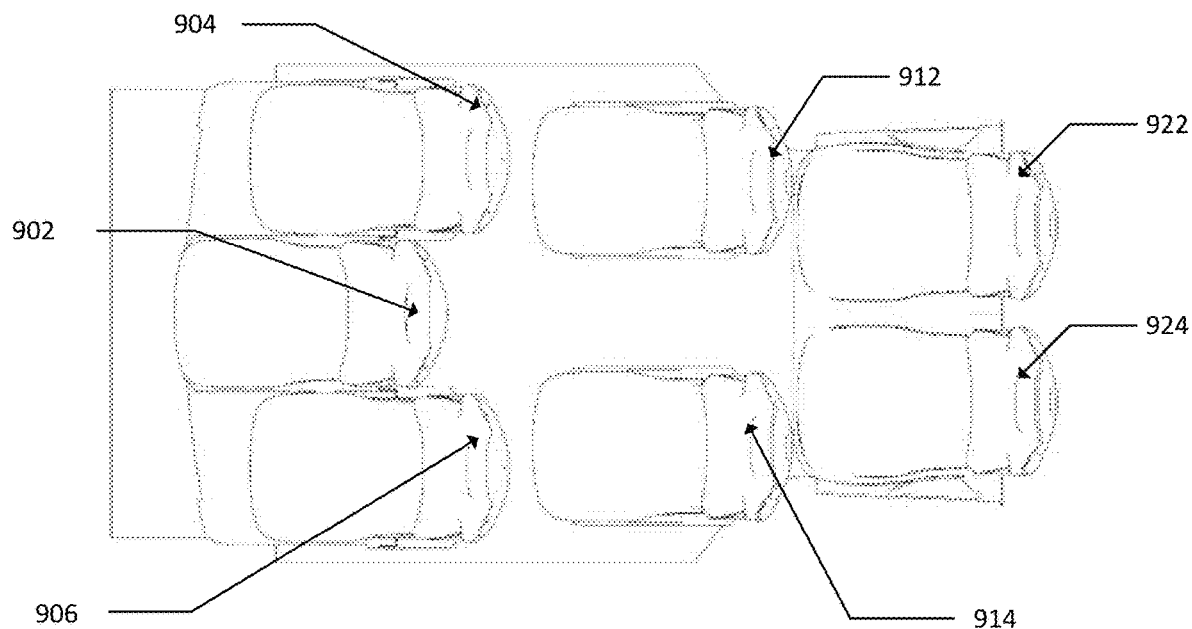
Figure 9I:
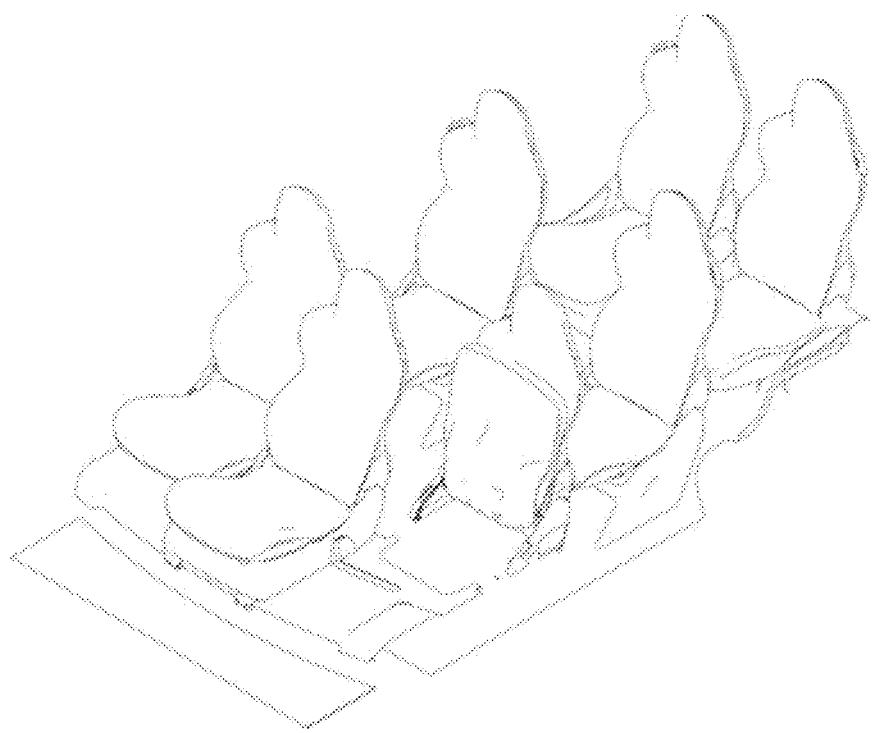
Figure 9J:
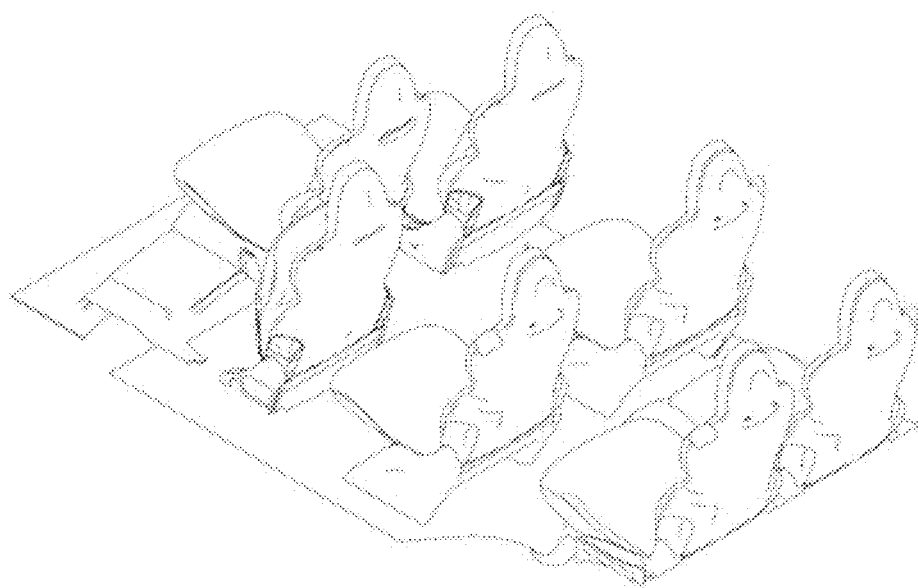
Figure 9K:
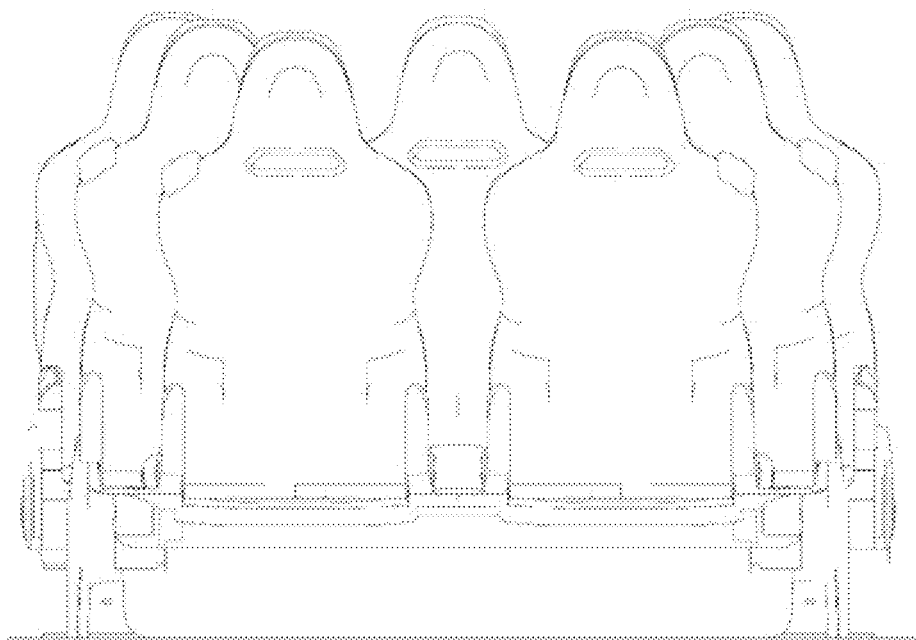
Figure 9L:
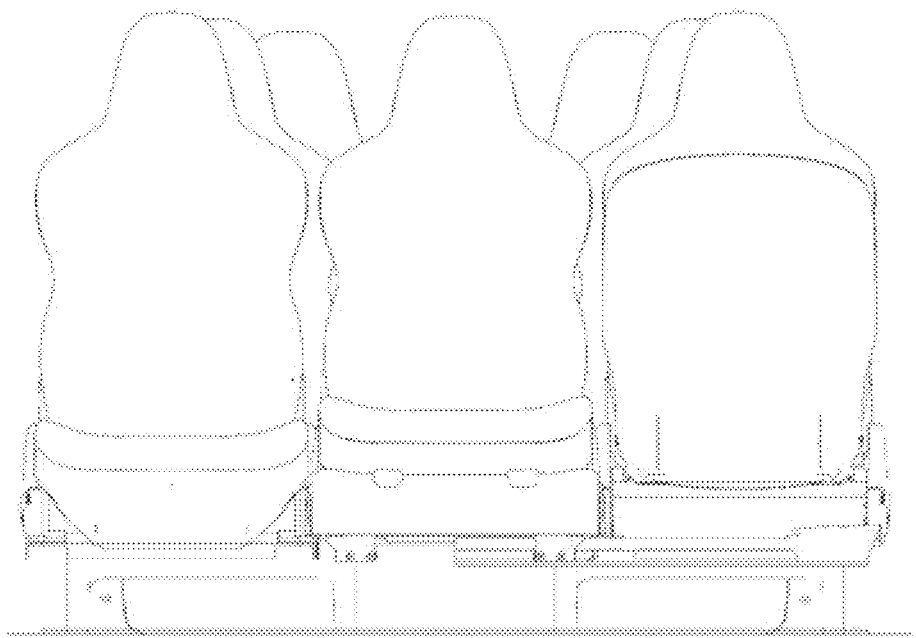
Figure 9M:
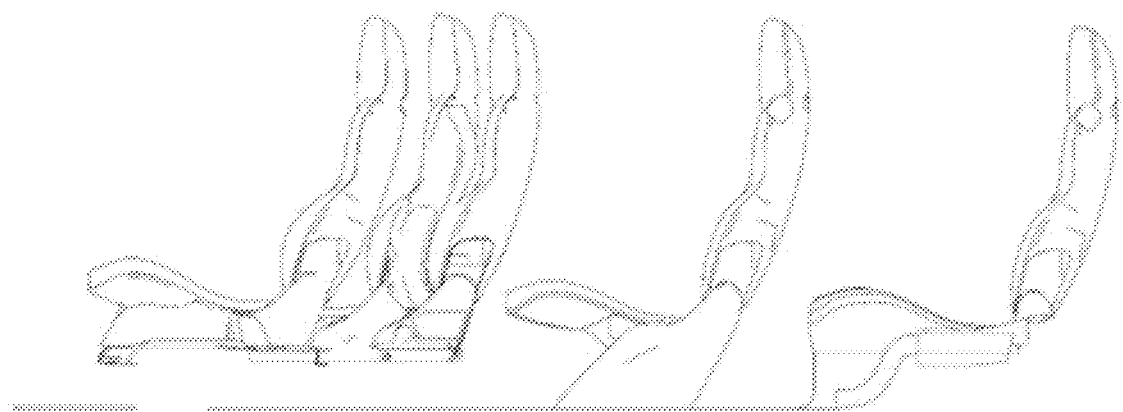
Figure 9N:
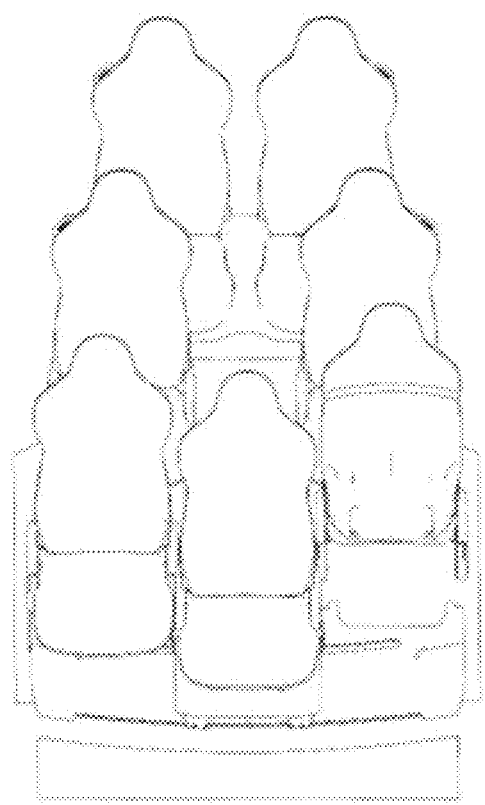
Figure 9O:
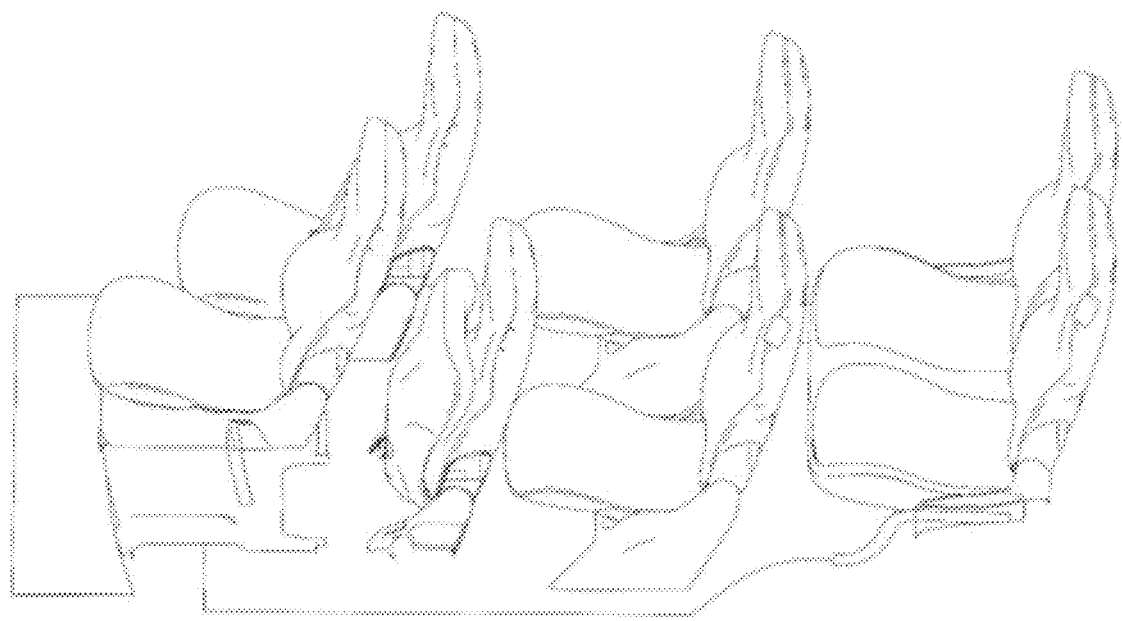
Figure 9P:
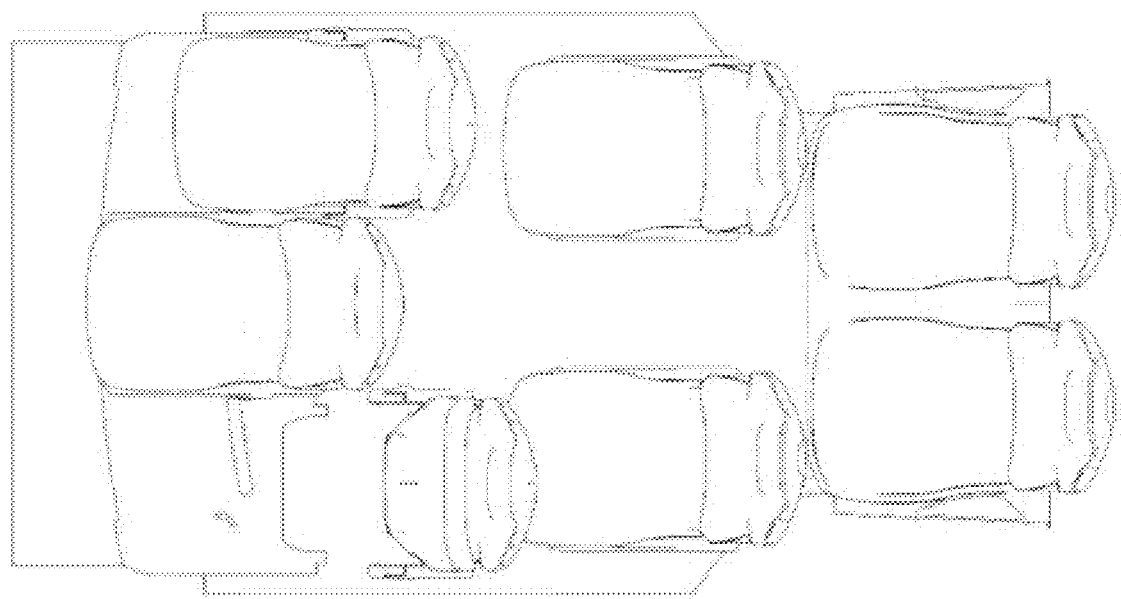
Figure 9Q:
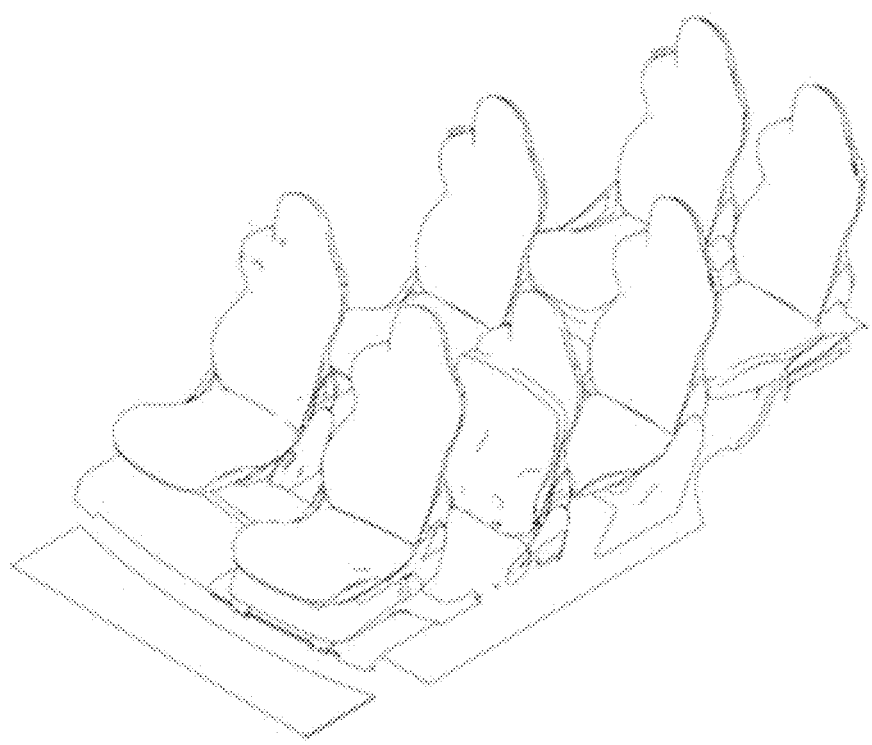
Figure 9R:
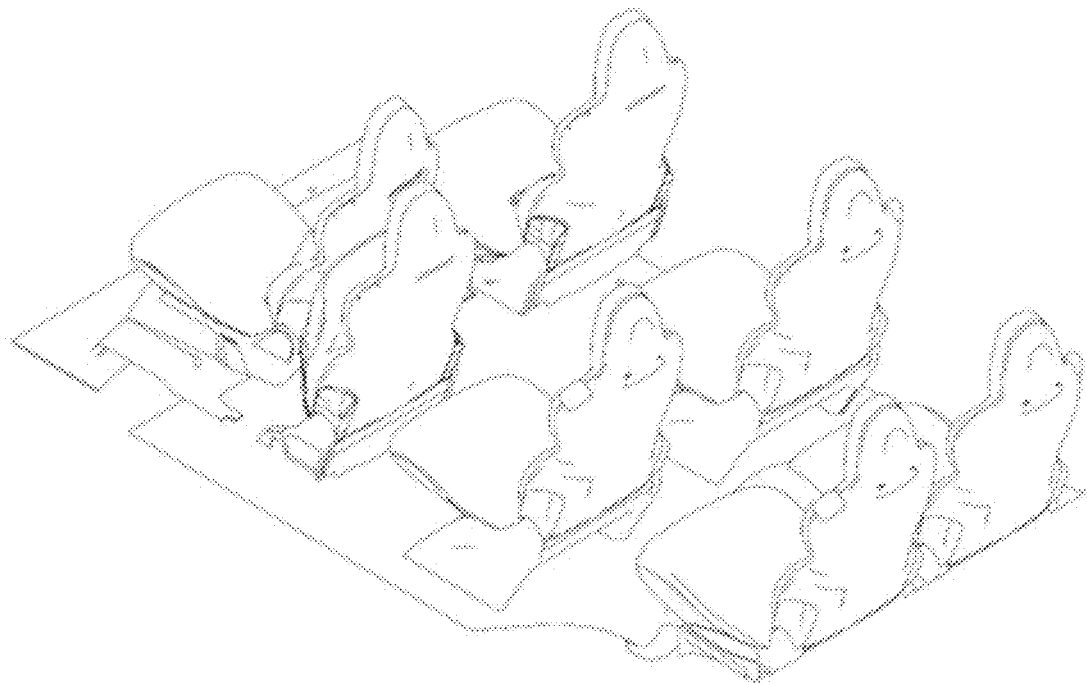
Figure 9S:
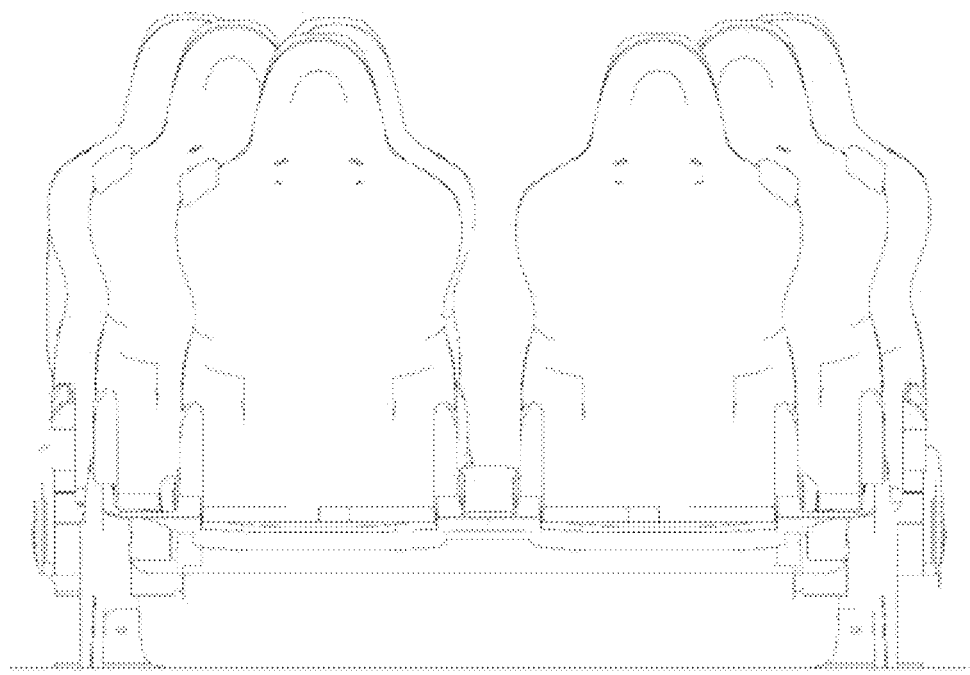
Figure 9T:
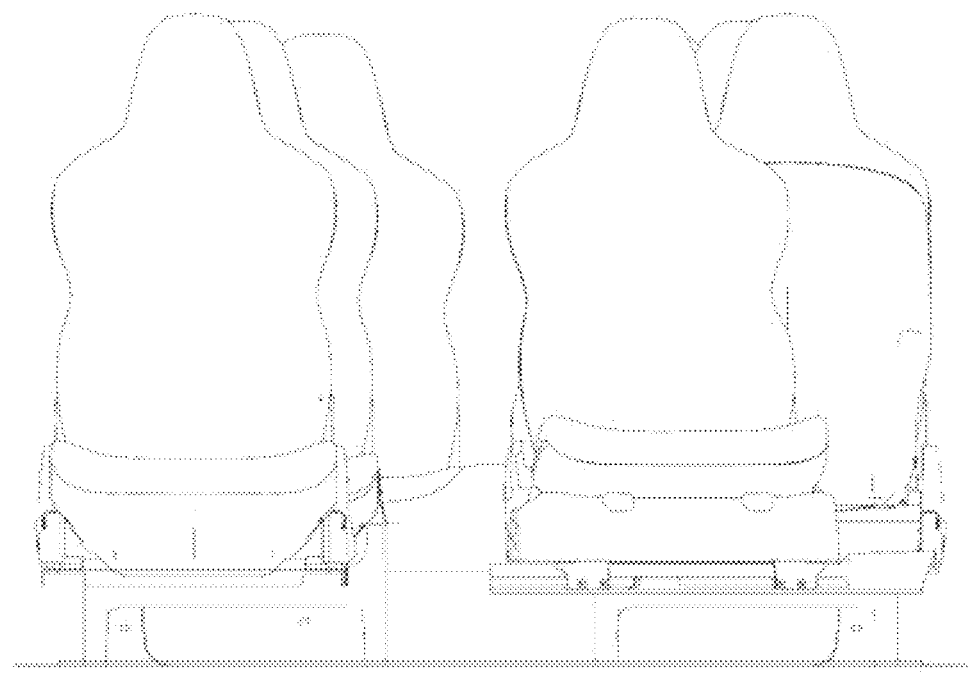
Figure 9U:
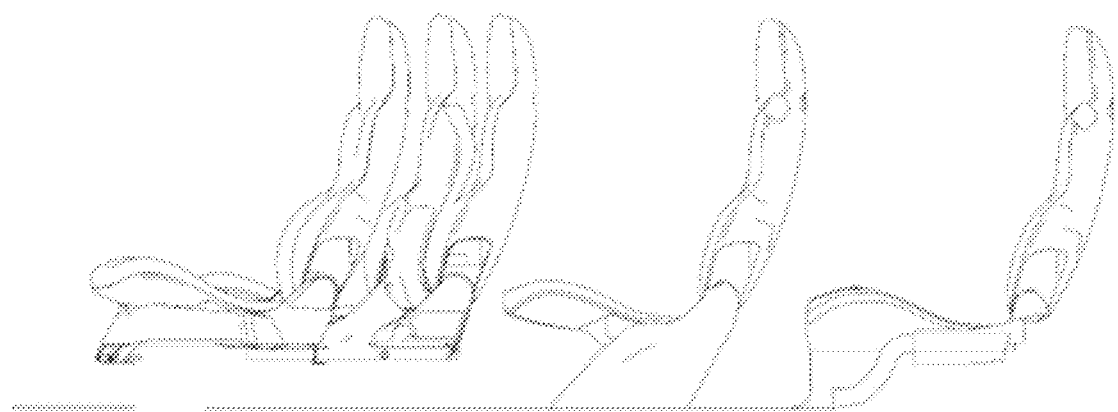
Figure 9V:
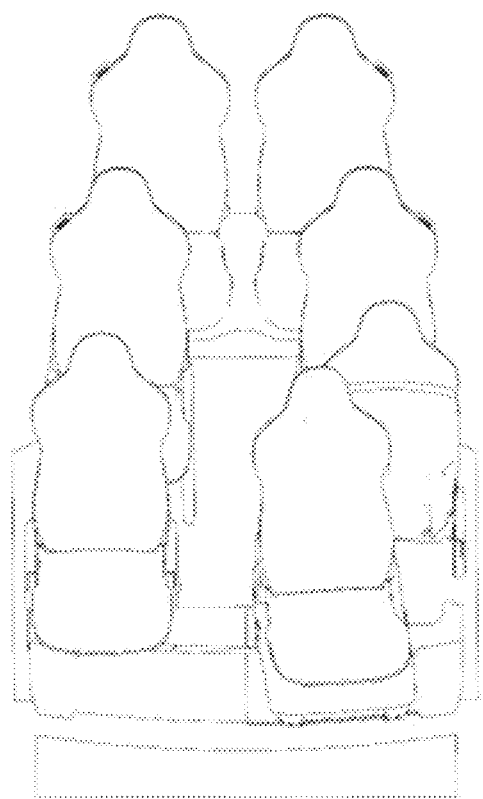
Figure 9W:
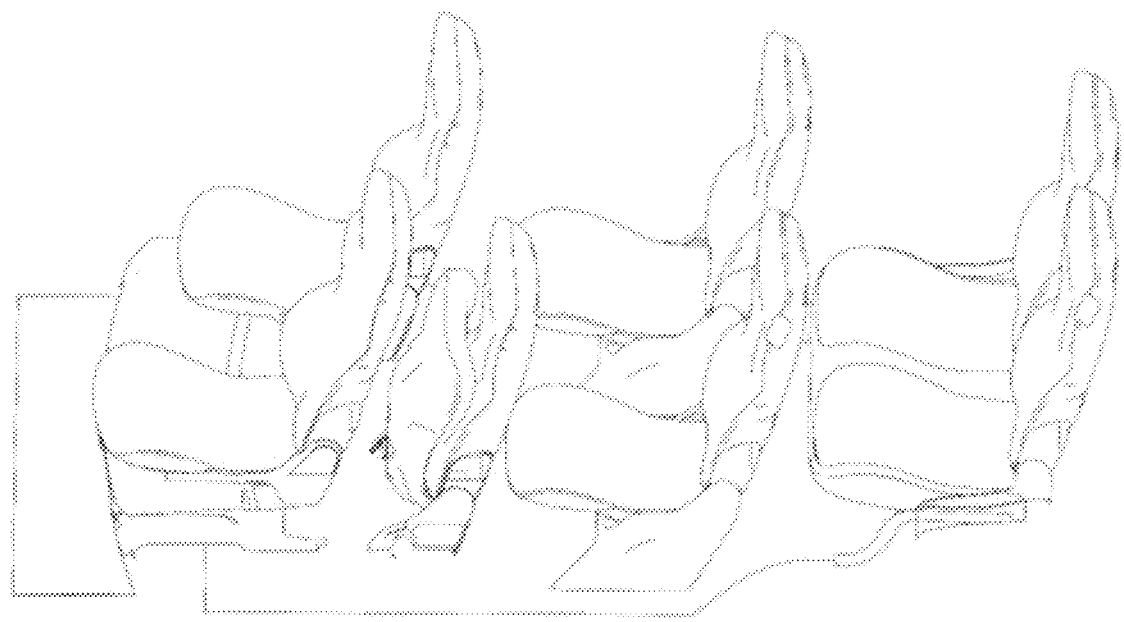
Figure 9X:
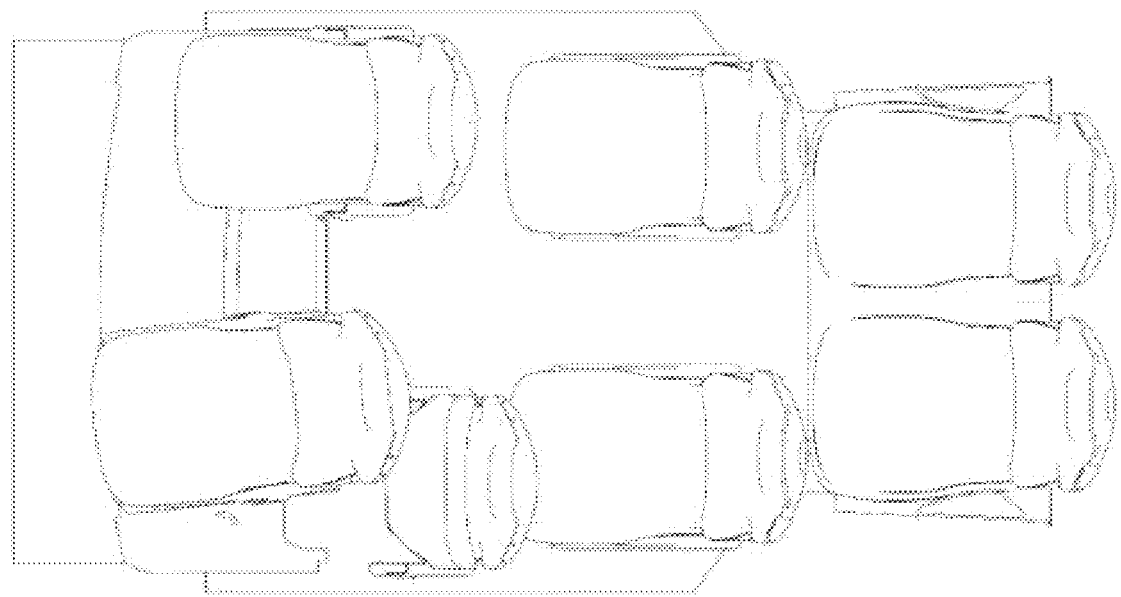
Figure 10A:
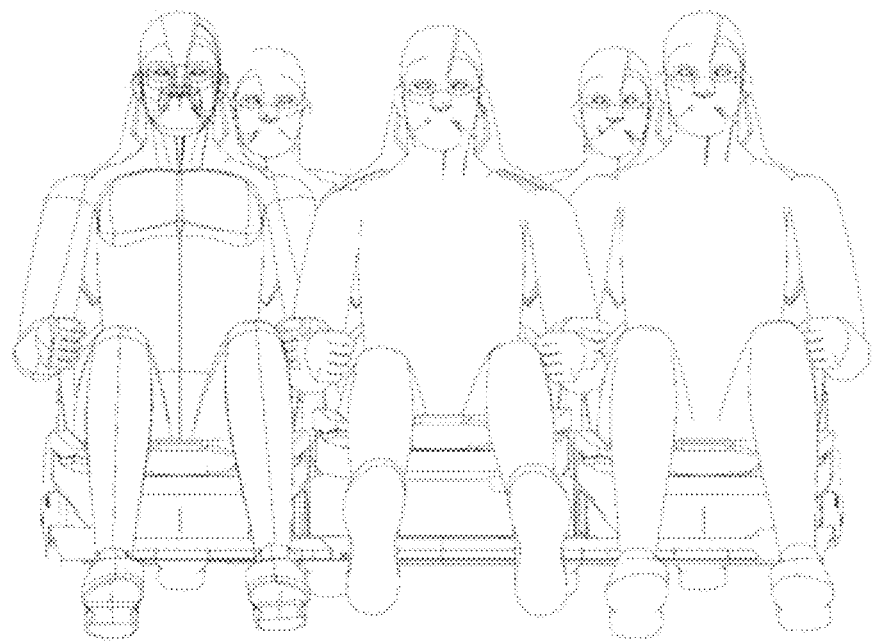
FIGS. 10A-10D are illustrations demonstrating the line-of-sight of users in example seat configurations in accordance with certain embodiments of the disclosed technology.
Figure 10B:
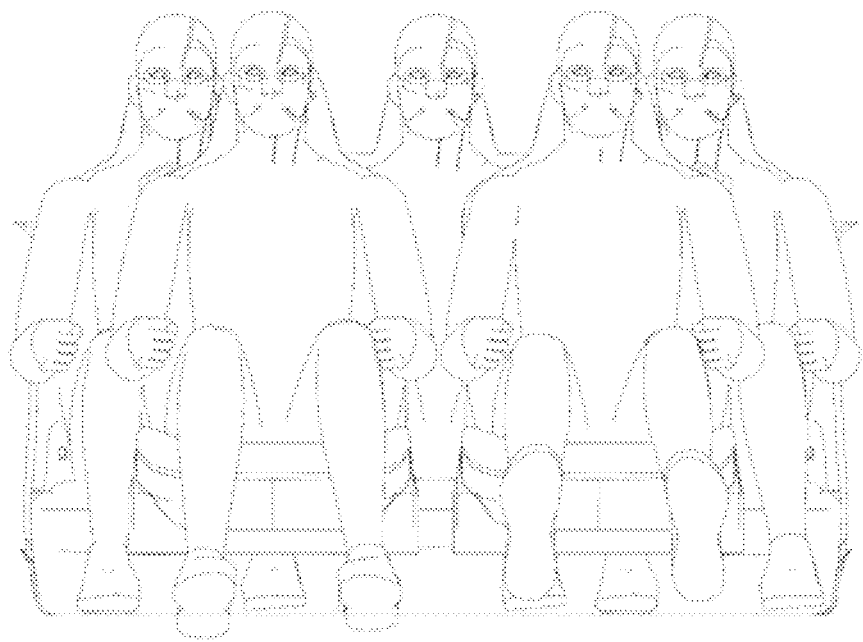
Figure 10C:
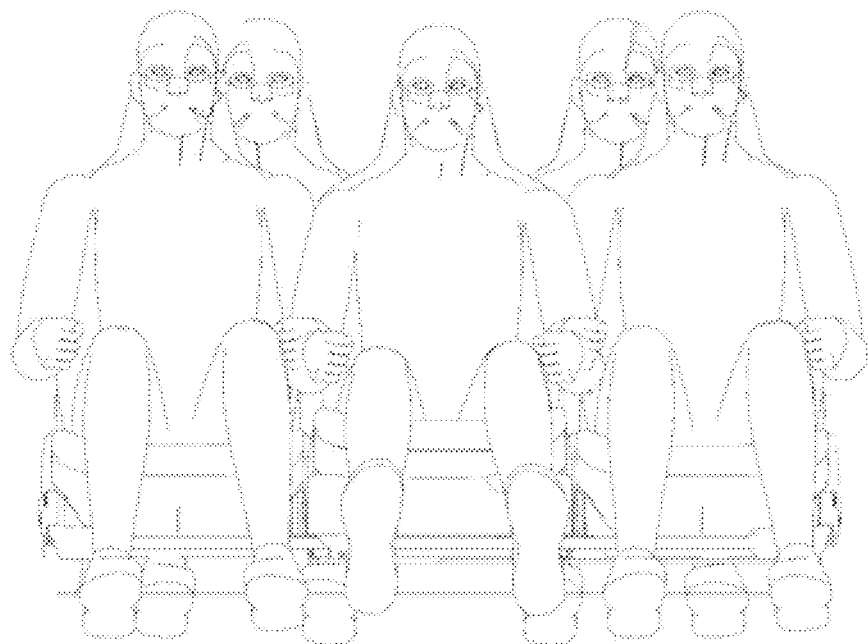
Figure 10D:
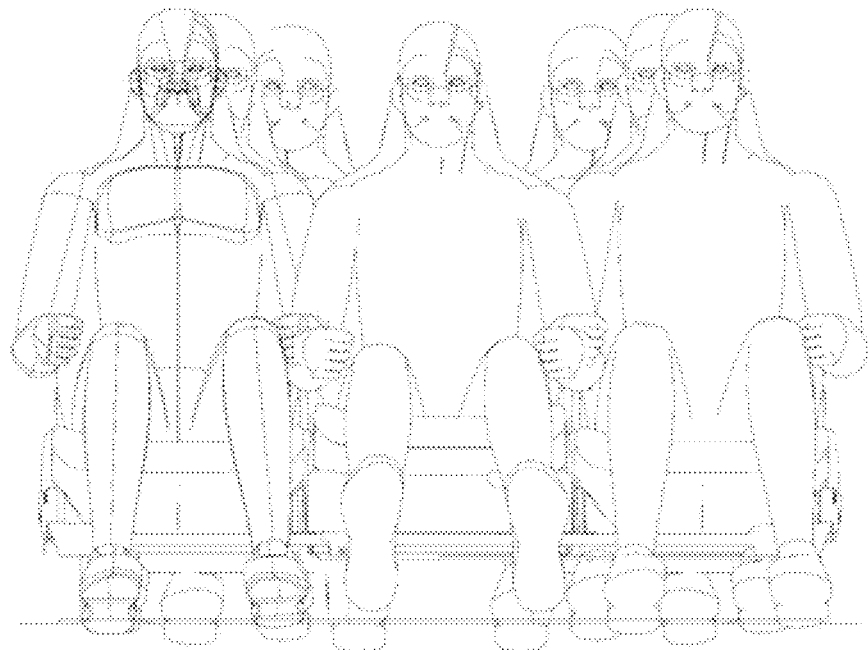

FIGS. 9A-9X illustrate various views of a seating arrangement according to one or more embodiments of the present disclosure. In various embodiments, the vehicle may comprise a front row, a second row, and/or at least one additional row. In the depicted embodiments, the front row may comprise a first seat assembly 902, a second seat assembly 904, and/or a third seat assembly 906, such that, the driver may be positioned in either a center-configuration, left-hand drive configuration, or right-hand drive configuration. In various embodiments, the second row may comprise a first, second row seat assembly 912 and/or a second, second row seat assembly 914. In various embodiments, the at least one additional row may comprise a first, third row seat assembly 922 and/or a second, third row seat assembly 924.

FIGS. 9I-8X illustrate exemplary views of a movement process as described in more detailed with respect to FIGS. 5A-6B.

FIGS. 10A-10D demonstrate the advantages of the seating arrangements of the disclosed embodiments (FIGS. 10A-10D corresponding respectively to the arrangements shown in FIGS. 2A-2D, FIGS. 7A-7H, FIGS. 8A-8X, and FIGS. 9A-9X). As depicted in FIGS. 10A-10D, in various embodiments, the seating arrangements may be configured to improve the line of sight for at least one occupant of the vehicle. As designed, the seating arrangements may allow each individual significantly improved line-of-sight. This is particularly the case for rear seat passengers sitting in the second and third rows who would normally have their views obstructed by the seats of the passengers that are in front of them. Improving passenger visibility outside the vehicle may lead to a better customer experience, which may increase the desirability of a vehicle (e.g., encouraging a potential buyer to purchase a vehicle with improved visibility over a vehicle with decreased visibility). In various embodiments, the seating configuration may allow passengers to see out of the vehicle through the windshield and maintain eye contain with the road ahead, which can be helpful in preventing motion sickness. This may be especially valuable as motor vehicles become electric and typical vehicles are capable of increased acceleration, deceleration, and lateral motion compared to conventional fossil-fuel-powered vehicles. Maintaining eye contact on outside visual cues may allow passengers to sustain increased g-forces while remaining less affected (or unaffected) by motion sickness, which may allow vehicles to accelerate, decelerate, or maintain faster speeds in turns. Therefore, vehicles with seating configurations allowing for additional passenger visibility may have additional advantages over other, more conventional designs.

Figure 11A:
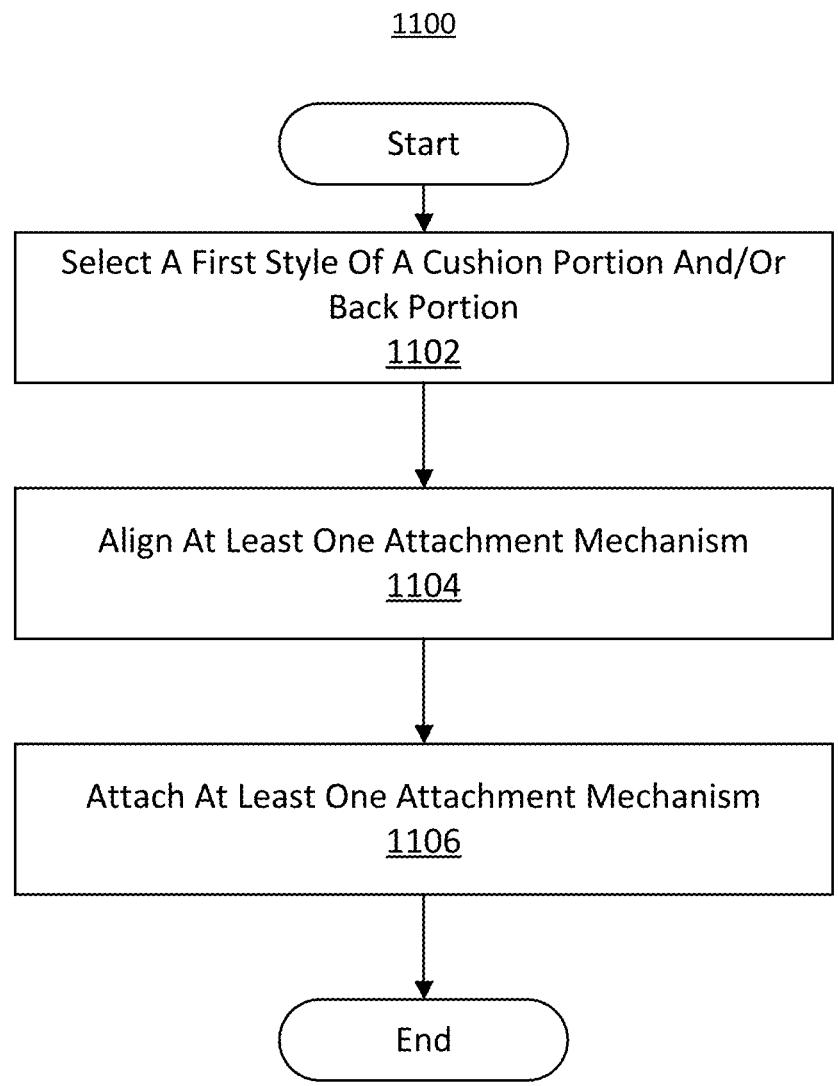
FIGS. 11A-11B are a flow diagrams of how an example system may be used to interchange seat parts according to an example implementation of the disclosed technology.

FIG. 11A is a flow diagram illustrating an exemplary method 1100 for selectively configuring at least one seat assembly in accordance with various embodiments of the present disclosure. In block 1102, a user may choose a first style of a cushion portion and/or back portion to be secured to a frame portion of the at least one seat assembly. In various embodiments, the first style may be one or more of: a comfort style, a sport style, a bucket style, a racing style, an outdoor style, or a combination thereof. In various embodiments, the cushion portion may comprise the same style as the back portion. In other embodiments, the cushion portion may comprise a different style than the back portion.

In block 1104, the user aligns at least one attachment mechanism of the cushion portion and/or back portion with at least one corresponding securing mechanism on the respective frame portion. In various embodiments, the at least one attachment mechanism is configured to be one or more of a snap, screw, clip, bolt, adhesive tape, Velcro, tether, strap, clamp, snap-on, zipper, or a combination thereof.

In block 1106, the user attaches the at least one attachment mechanism of the cushion portion and/or the at least one attachment mechanism of the back portion with at least one corresponding securing mechanism on the frame portion. In one or more embodiments, the cushion portion may be attached before the back portion. In various embodiments, the back portion may be attached before the cushion portion.

Figure 11B:
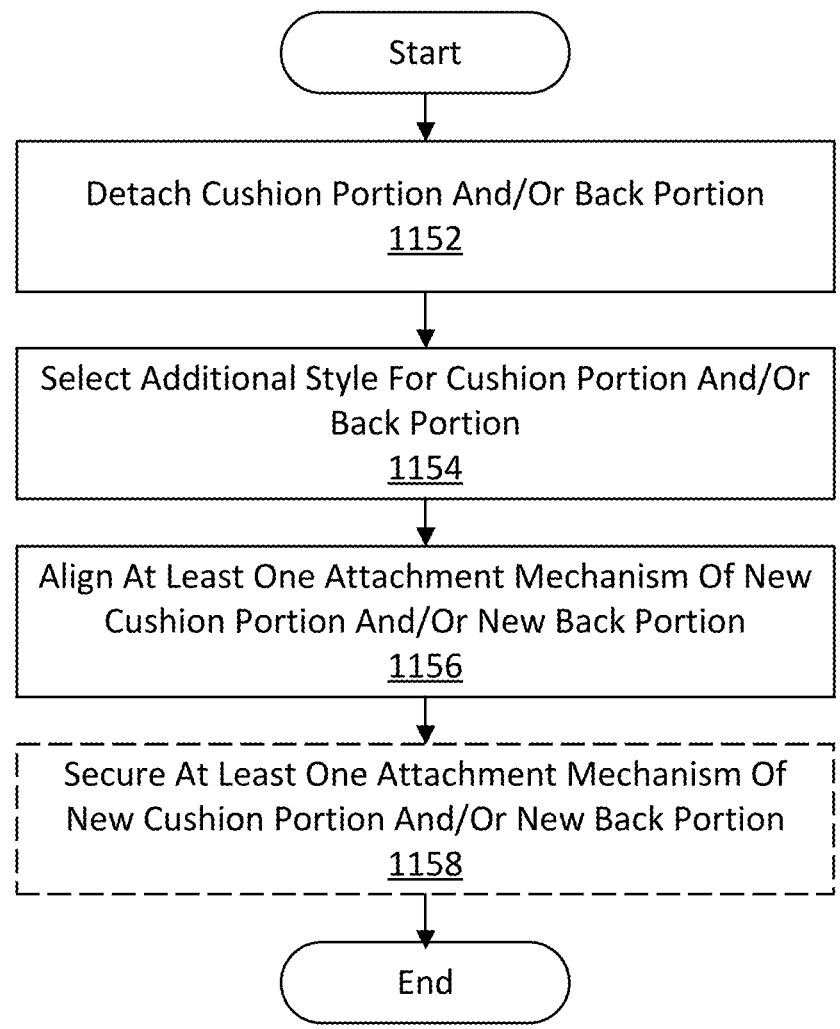

FIG. 11B is a flow diagram illustrating an exemplary method 1150 for selectively reconfiguring at least one seat assembly in accordance with various embodiments of the present disclosure. In block 1152, a user may choose to detach a cushion portion having a first style and/or a back having a first style.

In block 1154, the user may select at least one additional cushion portion comprising at least one additional style and/or at least one additional back portion comprising at least one additional style.

In block 1156, the user aligns at least one attachment mechanism of the at least one additional cushion portion and/or at least one attachment mechanism of the at least one additional back portion with at least one corresponding securing mechanism on the respective frame portion.

In block 1158, the user secures at least one attachment mechanism of the at least one additional cushion portion and/or at least one attachment mechanism of the at least one additional back portion with at least one corresponding securing mechanism on the respective frame portion. In one or more embodiments, the at least one additional cushion portion may be attached before the at least one additional back portion. In other embodiments, the at least one additional back portion may be attached before the at least one additional cushion portion. In various embodiments, the at least one additional style of the at least one additional seat portion and/or at least one additional back portion are configured to be the same. In other embodiments, the at least one additional style of the at least one additional seat portion and/or at least one additional back portion are configured to be different.

In some examples, disclosed systems or methods may involve one or more of the following clauses:

Clause 1: An automotive seat system for a vehicle comprising: a center seat assembly; one or more center seat actuators functionally coupled to the center seat assembly to move the center seat assembly in one or more directions; one or more side seat assemblies each comprising: a back portion; and a cushion portion attached to the back portion at a hinge and moveable via a first cushion actuator, one or more side seat actuators functionally coupled to the one or more side seat assemblies to move the side seat assemblies in one or more directions; one or more processors; and memory in communication with the one or more processors and storing instructions that, when executed by the one or more processors, are configured to cause the system to: transmit a first signal to the first cushion actuator to move the cushion portion of at least one of the one or more side seat assemblies from an open position to a stowed position; transmit a second signal to the one or more side seat actuators to move at least one of the one or more side seat assemblies rearwardly; and transmit a third signal to the one or more center seat actuators to move the center seat assembly from a driving position to an access position in front of the one or more side seat assemblies.

Clause 2: The automotive seat system of clause 1, wherein: the center seat assembly further comprises a center seat occupancy sensor, the one or more side seat assemblies further comprise one or more side seat occupancy sensors, and the instructions, when executed by the one or more processors, are further configured to cause the system to: determine an occupancy of the center seat assembly using the center seat occupancy sensor; determine an occupancy of at least one of the one or more side seat assemblies using the one or more side seat occupancy sensors; responsive to determining that the center seat assembly is occupied and determining that one of the one or more side seat assemblies are unoccupied, cause movement of the center seat assembly by transmitting the first signal, the second signal, and the third signal; and responsive to determining that the center seat assembly is unoccupied or determining that one of the one or more side seat assemblies are occupied, cause the center seat assembly to remain stationary.

Clause 3: The automotive seat system of clause 2, further comprising instructions that, when executed by the one or more processors, are configured to cause the system to: continuously monitor the occupancy of at least one of the one or more side seat assemblies using the side seat occupancy sensors in real-time to detect whether one of the one or more side seat assemblies become unoccupied; and responsive to detecting that one of the one or more side seat assemblies become unoccupied, cause movement of the center seat assembly by transmitting the first signal, the second signal, and the third signal.

Clause 4: The automotive seat system of clause 1, further comprising instructions that, when executed by the one or more processors, are configured to cause the system to: receive at least one initiation signal configured to initiate a center seat assembly movement process indicating at least a direction of desired movement of the center seat assembly; receive occupancy data from at least one seat occupancy sensor, wherein the occupancy data comprises information relating to a weight of a passenger occupying the center seat assembly; and modifying the third signal to the one or more center seat actuators based on the occupancy data, the modified third signal changing a force to move the center seat assembly from the driving position to the access position.

Clause 5: The automotive seat system of clause 1, further comprising instructions that, when executed by the one or more processors, are configured to cause the system to: receive one or more return initiation signals; transmit a fourth signal to the one or more center seat actuators to move the center seat assembly from the access position to the driving position; transmit a fifth signal to the one or more side seat actuators to move at least one of the one or more side seat assemblies forward; and transmit a sixth signal to the first cushion actuator to move the cushion portion of at least one of the one or more side seat assemblies from the stowed position to the open position.

Clause 6: The automotive seat system of clause 5, wherein: the one or more return initiation signals are received responsive to a signal generated from a key fob, a mobile device associated with a user, a dedicated button, a first selection on a first graphical user interface on an instrument cluster, a second selection on a second graphical user interface on a vehicle multimedia screen, or combinations thereof.

Clause 7: The automotive seat system of clause 1, further comprising: a rail system configured to direct movement of the center seat assembly, the rail system comprising a track on a floor of the vehicle, wherein the center seat assembly further comprises: one or more guides attached to a base plate of the center seat assembly and configured to be guided by the track; and one or more rollers attached to the base plate of the center seat assembly and configured to provide support to a front of the base plate; and a first center seat actuator of the one or more center seat actuators is connected to a floor of the vehicle via a first rotating joint, and actuation of the first center seat actuator moves the center seat assembly along the track.

Clause 8: The automotive seat system of clause 7, wherein: the track is at least partially in a configuration of an arc spanning proximate a width of the vehicle, the first center seat actuator is connected to a sliding member via a second rotating joint, and the sliding member is connected to the base plate of the center seat assembly along a central axis.

Clause 9: The automotive seat system of clause 8, wherein: the first center seat actuator comprises three positions such that a first actuator position corresponds to a left access position, a second actuator position corresponds to the driving position, and a third actuator position corresponds to a right access position, and the second rotating joint is offset from an axis of the sliding member.

Clause 10: The automotive seat system of clause 7, further comprising: a docking system configured to lock the center seat assembly in place comprising: a first locking actuator connected to the base plate of the center seat assembly; a first axle in selective communication with the first locking actuator; one or more first hooks attached to the first axle; and one or more first latches in the floor of the vehicle, and wherein the first locking actuator is configured to rotate the first axle causing the one or more first hooks to selectively engage with the one or more first latches.

Clause 11: The automotive seat system of clause 10, wherein the docking system further comprises: a second locking actuator attached to the floor of the vehicle; one or more pins in selective communication with the second locking actuator; and one or more pin receptors at mounted to a bottom of the base plate of the center seat assembly, and wherein the second locking actuator is configured to cause the one or more pins to move within one or more pin receptors.

Clause 12: A method for moving an automotive seat comprising: receiving a first request to move a center seat assembly from a driving position to an access position, the center seat assembly functionally coupled to one or more center seat actuators configured to move the center seat assembly in one or more directions; directing a first side seat actuator to fold a lower portion of a side seat assembly from an occupant position to a stowed position; directing a second side seat actuator to move the side seat assembly rearward; and directing the center seat actuator to move the center seat assembly from a driving position to an access position in front of the side seat assembly.

Clause 13: The method of clause 12, further comprising: receiving a second request to move the center seat assembly from the access position to a driving position; directing the center seat actuator to move the center seat assembly from the access position to the driving position; directing the second side seat actuator to move the side seat assembly forward; and directing the first side seat actuator to unfold the lower portion of the side seat assembly from the stowed position to the occupant position.

Clause 14: The method of clause 13, wherein: the first request is received responsive to a signal generated from shutting off a vehicle, placing the vehicle in a stationary gear, opening a door of the vehicle, a key fob, a mobile device associated with a user, pushing a dedicated button, a first selection on a first graphical user interface on an instrument cluster, a second selection on a second graphical user interface on a vehicle multimedia screen, or combinations thereof, and the second request is received responsive to a signal generated from opening a door of the vehicle, a key fob, a mobile device associated with a user, a dedicated button, a first selection on a first graphical user interface on an instrument cluster, a second selection on a second graphical user interface on a vehicle multimedia screen, or combinations thereof.

Clause 15: The method of clause 13, wherein: the first request and the second request indicate a direction of desired movement of the center seat assembly.

Clause 16: The method of clause 13, further comprising: receiving occupancy data from at least one seat occupancy sensor, wherein the occupancy data includes information relating to a weight of a passenger in the center seat assembly or the side seat assembly; and modifying a force used by the center seat actuator, the first side seat actuator, or the second side seat actuator based on occupancy data.

Clause 17: The method of clause 13, further comprising: directing one or more docking actuators to unlock the center seat assembly; and directing the one or more docking actuators to lock the center seat assembly into place.

Clause 18: A seat movement method for a vehicle comprising: folding a lower portion of a side seat assembly from an open position to a stowed position; moving the side seat assembly rearward along one or more side seat rails; undocking a center seat assembly; and moving the center seat assembly along one or more rails substantially perpendicular to a direction of motion of the vehicle from a driving position to an access position in front of the side seat assembly.

Clause 19: The method of clause 18, wherein: the one or more rails is configured to angle the center seat assembly toward an outside of the vehicle in the access position.

Clause 20: The method of clause 18, further comprising: moving the center seat assembly along the one or more rails from the access position to the driving position; docking the center seat assembly; moving the side seat assembly forward along the one or more side seat rails; and unfolding the lower portion of the side seat assembly from the stowed position to the open position.

Clause 21: An automotive seating system for a vehicle, the system comprising: one or more modular seat assemblies each comprising: a frame configured to selectively secure portions of the respective seat assembly to the vehicle and to interchangeably support at least a first seat configuration and a second seat configuration, the frame comprising an upper structural member and a lower structural member; a first lower cushion of the first seat configuration readily attachable to and detachable from the lower structural member of the frame, the first lower cushion being interchangeable with a second lower cushion of the second seat configuration; and a first back cushion of the first seat configuration readily attachable to and detachable from the upper structural member of the frame, the first back cushion being interchangeable with a second back cushion of the second seat configuration.

Clause 22: The automotive seating system of clause 21, wherein the one or more modular seat assemblies further comprise one or more hinges configured to move the lower structural member relative to the upper structural member.

Clause 23: The automotive seating system of clause 22, wherein: at least a first seat assembly and a second seat assembly of the one or more modular seat assemblies further comprise a movement mechanism configured to assist with the movement of the respective first and second seat assemblies in one or more directions.

Clause 24: The automotive seating system of clause 22, wherein: the lower structural member comprises one or more lower attachment mechanisms configured to selectively secure the first lower cushion to the lower structural member, and the upper structural member comprises one or more upper attachment mechanisms configured to selectively secure the first back cushion to the upper structural member.

Clause 25: The automotive seating system of clause 24, wherein the one or more lower attachment mechanisms or the one or more upper attachment mechanisms comprise a snap, a screw, a clip, a bolt, adhesive tape, Velcro, a tether, a strap, a clamp, snap-on, a zipper, or combinations thereof.

Clause 26: The automotive seating system of clause 22, wherein the first and second seat configurations are selectable from a plurality of seat configurations comprising a comfort configuration, a sport configuration, a bucket configuration, a racing configuration, an outdoor configuration, or combinations thereof.

Clause 27: The automotive seating system of clause 26, wherein: a third lower cushion is a replacement of the same configuration for the first lower cushion, and a third back cushion is a replacement of the same configuration for the first back cushion.

Clause 28: The automotive seating system of clause 26, wherein: the first seat configuration comprises a first type of material, style, color, or combinations thereof, and the second seat configuration comprises a second type of material, style, color, or combinations thereof.

Clause 29: The automotive seating system of clause 26, wherein: the lower structural member is the same shape for use with multiple configurations of the plurality of seat configurations, the upper structural member is the same shape for use with multiple configurations of the plurality of seat configurations.

Clause 30: The automotive seating system of clause 22, wherein: a first seat assembly of the one or more modular seat assemblies is positioned in a center configuration, second and third seat assemblies of the one or more modular seat assemblies are positioned on respective sides of the first seat assembly to form a first row, and the second and third seat assemblies are positioned slightly rearward from the first seat assembly.

Clause 31: The automotive seating system of clause 30, wherein: the one or more modular seat assemblies comprise a front row of multiple adjacent seat assemblies and at least one rear row of multiple adjacent seat assemblies, and the one or more rear rows of multiple adjacent seat assemblies are each positioned to have a line of sight through the front row of multiple adjacent seat assemblies to a front area of the vehicle.

Clause 32: An automotive seat for a vehicle comprising: a frame configured to selectively secure portions of the seat to the vehicle and to interchangeably support at least a first seat configuration and a second seat configuration, the frame comprising an upper structural member and a lower structural member; a first lower cushion of the first seat configuration readily attachable to and detachable from the lower structural member of the frame, the first lower cushion being interchangeable with a second lower cushion of the second seat configuration; and a first back cushion of the first seat configuration readily attachable to and detachable from the upper structural member of the frame, the first back cushion being interchangeable with a second back cushion of the second seat configuration.

Clause 33: The automotive seat of clause 32, further comprising: a movement mechanism configured to assist with the movement of first seat assembly in one or more directions; and wherein the frame further comprises one or more fixation members configured to secure the automotive seat to a floor of the vehicle.

Clause 34: The automotive seat of clause 32, wherein: the lower structural member further comprises one or more lower attachment mechanisms configured to selectively secure the first lower cushion to the lower structural member, and the upper structural member further comprises one or more upper attachment mechanisms configured to selectively secure the first back cushion to the upper structural member.

Clause 35: The automotive seat of clause 34, wherein the one or more lower attachment mechanisms or the one or more upper attachment mechanisms comprise a snap, screw, clip, bolt, adhesive tape, Velcro, tether, strap, clamp, snap-on, zipper, or combinations thereof.

Clause 36: The automotive seat of clause 32, wherein the first and second seat configurations from a plurality of seat configurations comprising a comfort configuration, a sport configuration, a bucket configuration, a racing configuration, an outdoor configuration, or combinations thereof.

Clause 37: The automotive seat of clause 36, wherein: a third lower cushion is a replacement of the same configuration for the first lower cushion, and a third back cushion is a replacement of the same configuration for the first back cushion.

Clause 38: A method for changing a configuration of a modular automotive seat of a vehicle comprising: detaching a first back cushion of a first seat configuration from a seat frame configured to selectively secure portions of the seat to the vehicle and to interchangeably support at least the first seat configuration and a second seat configuration; attaching a second back cushion of the second seat configuration to the seat frame, the second back cushion being interchangeable with the first back cushion of the first seat configuration; detaching a first lower cushion of the first seat configuration from the seat frame; and attaching a second lower cushion of the second seat configuration to the seat frame, the second lower cushion being interchangeable with the first lower cushion of the first seat configuration.

Clause 39: The method of clause 38, further comprising: aligning and securing one or more upper attachment mechanisms of the second back cushion with a complementary location on the seat frame.

Clause 40: The method of clause 38, further comprising: aligning and securing one or more lower attachment mechanisms of the second lower cushion with a complementary location of the seat frame.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or."

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An automotive seating system for a vehicle, the system comprising:
one or more modular seat assemblies each comprising:
a frame configured to selectively secure portions of the respective seat assembly to the vehicle and to interchangeably support at least a first seat configuration and a second seat configuration, the frame comprising an upper structural member and a lower structural member, the upper structural member and lower structural member each comprising a contoured edge for retaining a cushion;
a first lower cushion of the first seat configuration readily attachable to and detachable from the lower structural member of the frame, the first lower cushion being interchangeable with a second lower cushion of the second seat configuration, each lower cushion comprising a corresponding contoured surface for fitting within the contoured edge of the lower structural member; and
a first back cushion of the first seat configuration readily attachable to and detachable from the upper structural member of the frame, the first back cushion being interchangeable with a second back cushion of the second seat configuration, each back cushion comprising a corresponding contoured surface for fitting within contoured edge of the upper structural member.

2. The automotive seating system of claim 1, wherein the one or more modular seat assemblies further comprise one or more hinges configured to move the lower structural member relative to the upper structural member.

3. The automotive seating system of claim 2, wherein:
at least a first seat assembly and a second seat assembly of the one or more modular seat assemblies further comprise a movement mechanism configured to assist with the movement of the respective first and second seat assemblies in one or more directions.

4. The automotive seating system of claim 2, wherein:
the lower structural member comprises one or more lower attachment mechanisms configured to selectively secure the first lower cushion to the lower structural member, and
the upper structural member comprises one or more upper attachment mechanisms configured to selectively secure the first back cushion to the upper structural member.

5. The automotive seating system of claim 4, wherein the one or more lower attachment mechanisms or the one or more upper attachment mechanisms comprise a snap, a screw, a clip, a bolt, adhesive tape, Velcro, a tether, a strap, a clamp, snap-on, a zipper, or combinations thereof.

6. The automotive seating system of claim 2, wherein the first and second seat configurations are selectable from a plurality of seat configurations comprising a comfort configuration, a sport configuration, a bucket configuration, a racing configuration, an outdoor configuration, or combinations thereof.

7. The automotive seating system of claim 6, wherein:
a third lower cushion is a replacement of the same configuration for the first lower cushion, and
a third back cushion is a replacement of the same configuration for the first back cushion.

8. The automotive seating system of claim 6, wherein:
the first seat configuration comprises a first type of material, style, color, or combinations thereof, and
the second seat configuration comprises a second type of material, style, color, or combinations thereof.

9. The automotive seating system of claim 6, wherein:
the lower structural member is the same shape for use with multiple configurations of the plurality of seat configurations,
the upper structural member is the same shape for use with multiple configurations of the plurality of seat configurations.

10. The automotive seating system of claim 2, wherein:
a first seat assembly of the one or more modular seat assemblies is positioned in a center configuration,
second and third seat assemblies of the one or more modular seat assemblies are positioned on respective sides of the first seat assembly to form a first row, and
the second and third seat assemblies are positioned slightly rearward from the first seat assembly.

11. The automotive seating system of claim 10, wherein:
the one or more modular seat assemblies comprise a front row of multiple adjacent seat assemblies and at least one rear row of multiple adjacent seat assemblies, and
the one or more rear rows of multiple adjacent seat assemblies are each positioned to have a line of sight through the front row of multiple adjacent seat assemblies to a front area of the vehicle.

12. An automotive seat for a vehicle comprising:
a frame configured to selectively secure portions of the seat to the vehicle and to interchangeably support at least a first seat configuration and a second seat configuration, the frame comprising an upper structural member and a lower structural member, the upper structural member and the lower structural member each comprising a contoured edge for retaining a cushion;
a first lower cushion of the first seat configuration readily attachable to and detachable from the lower structural member of the frame, the first lower cushion being interchangeable with a second lower cushion of the second seat configuration, each lower cushion comprising a corresponding contoured surface for fitting within the contoured edge of the lower structural member; and
a first back cushion of the first seat configuration readily attachable to and detachable from the upper structural member of the frame, the first back cushion being interchangeable with a second back cushion of the second seat configuration, each upper cushion comprising a corresponding contoured surface for fitting within the contoured edge of the upper structural member.

13. The automotive seat of claim 12, further comprising:
a movement mechanism configured to assist with the movement of first seat assembly in one or more directions; and wherein the frame further comprises one or more fixation members configured to secure the automotive seat to a floor of the vehicle.

14. The automotive seat of claim 12, wherein:
the lower structural member further comprises one or more lower attachment mechanisms configured to selectively secure the first lower cushion to the lower structural member, and
the upper structural member further comprises one or more upper attachment mechanisms configured to selectively secure the first back cushion to the upper structural member.

15. The automotive seat of claim 14, wherein the one or more lower attachment mechanisms or the one or more upper attachment mechanisms comprise a snap, screw, clip, bolt, adhesive tape, Velcro, tether, strap, clamp, snap-on, zipper, or combinations thereof.

16. The automotive seat of claim 12, wherein the first and second seat configurations from a plurality of seat configurations comprising a comfort configuration, a sport configuration, a bucket configuration, a racing configuration, an outdoor configuration, or combinations thereof.

17. The automotive seat of claim 16, wherein:
a third lower cushion is a replacement of the same configuration for the first lower cushion, and
a third back cushion is a replacement of the same configuration for the first back cushion.

18. A method for changing a configuration of a modular automotive seat of a vehicle comprising:
detaching a first back cushion of a first seat configuration from a seat frame configured to selectively secure portions of the seat to the vehicle and to interchangeably support at least the first seat configuration and a second seat configuration, the first back cushion comprising a back contoured surface, and the seat frame comprising a corresponding contoured edge for at least partially surrounding one or more back cushions or lower cushions;
attaching a second back cushion of the second seat configuration to the seat frame, the second back cushion being interchangeable with the first back cushion of the first seat configuration, the second back cushion comprising the back contoured surface for interfacing with the corresponding contoured edge of the seat frame;
detaching a first lower cushion of the first seat configuration from the seat frame, the first lower cushion comprising a lower contoured surface; and
attaching a second lower cushion of the second seat configuration to the seat frame, the second lower cushion being interchangeable with the first lower cushion of the first seat configuration, the second lower cushion comprising the lower contoured surface for interfacing with the corresponding contoured edge of the seat frame.

19. The method of claim 18, further comprising:
aligning and securing one or more upper attachment mechanisms of the second back cushion with a complementary location on the seat frame.

20. The method of claim 18, further comprising:
aligning and securing one or more lower attachment mechanisms of the second lower cushion with a complementary location of the seat frame.

* * * * *